(12) United States Patent
Nixon et al.

(10) Patent No.: US 6,868,538 B1
(45) Date of Patent: Mar. 15, 2005

(54) OBJECT-ORIENTED PROGRAMMABLE CONTROLLER

(75) Inventors: Mark J. Nixon, Round Rock, TX (US); Dennis L. Stevenson, Round Rock, TX (US); Michael G. Ott, Austin, TX (US); Stephen G. Hammack, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 120 days.

(21) Appl. No.: 09/563,212

(22) Filed: May 2, 2000

Related U.S. Application Data

(63) Continuation of application No. 09/025,202, filed on Feb. 18, 1998, now Pat. No. 6,078,320, which is a continuation of application No. 08/631,863, filed on Apr. 12, 1996, now Pat. No. 5,838,563.

(51) Int. Cl.[7] ............................. G06F 9/44; G05B 15/00
(52) U.S. Cl. ......................................... 717/100; 700/83
(58) Field of Search .................... 717/1, 2, 3, 100–109; 700/83, 86, 17

(56) References Cited

U.S. PATENT DOCUMENTS

| | | | |
|---|---|---|---|
| 3,665,172 A | 5/1972 | Spaargaren et al. ...... 235/150.1 |
| 4,006,464 A | 2/1977 | Landell ..................... 340/172.5 |
| 4,302,820 A | 11/1981 | Struger et al. .............. 364/900 |
| 4,413,314 A | 11/1983 | Slater et al. ................. 364/188 |
| 4,443,861 A | 4/1984 | Slater ......................... 364/900 |
| 4,639,852 A | 1/1987 | Motomiya ................... 364/138 |
| 4,641,269 A | 2/1987 | Japenga et al. ............. 364/473 |
| 4,663,704 A | 5/1987 | Jones et al. ................. 364/188 |
| 4,672,530 A | 6/1987 | Schuss ........................ 364/133 |
| 4,682,158 A | 7/1987 | Ito et al. ...................... 340/679 |
| 4,704,676 A | 11/1987 | Flanagan et al. ........... 364/146 |
| RE33,162 E | 2/1990 | Yoshida et al. ............. 364/492 |

(List continued on next page.)

FOREIGN PATENT DOCUMENTS

WO     WO 95/04314     2/1995

OTHER PUBLICATIONS

Beestermöller et al., "An online and offline programmable Multiple–Loop Controller for Distributed Systems," *IEEE*, pp. 15–20 (1994).
Duffey et al., "High–Level Control Language Customizes Application Programs," *IEEE* Computer Application in Power, pp. 15–18 (Apr., 1991).
Gyorki, John R., "PLCs drive standard buses," *Machine Design*, pp. 83–90 (May 11, 1995).
Lyons, Robert R., "New Telemacanique Programmable Controllers Feature Multiple Programming Languages," *Telemacanique*, Arlington Heights, IL (Feb. 11, 1995).
Moore Products Co., "Control System," *Power*, 139(4):114 (Apr., 1995).
Moore Products Co., "Apacs Control System," *Power*, 139(6):81 (Jun., 1995).
Peshek et al.. "Recent Development and Future Trends in PLC Programming Languages and Programming Tools for Real–Time Control," *IEEE* Cement Industry Technical Conference, pp. 219–230 (May, 1993).

*Primary Examiner*—Wei Zhen
(74) *Attorney, Agent, or Firm*—Marshall, Gerstein & Borun LLP

(57) ABSTRACT

An apparatus having a programmable processor and a memory for performing a plurality of user-selectable control functions includes a database for storing a plurality of items associated with each of the control functions. The items include, for each function, at least one procedure for performing an action associated with the control function and a specification of at least one state associated with the control function. The apparatus further includes software routines stored on the memory and adapted to be executed by the processor that facilitate selection of a procedure in the database, that access the database and cause performance of the selected procedure to achieve the state specified therein, and that monitor at least one resource associated with the action of the procedure and, based thereon, determine whether the specified state has been achieved.

15 Claims, 46 Drawing Sheets

U.S. PATENT DOCUMENTS

| | | |
|---|---|---|
| 5,121,318 A | 6/1992 | Lipner et al. ............... 364/146 |
| 5,124,908 A | 6/1992 | Broadbent .................. 364/188 |
| 5,129,087 A | 7/1992 | Will .......................... 395/650 |
| 5,140,677 A | 8/1992 | Fleming et al. ............. 395/159 |
| 5,164,894 A | 11/1992 | Cunningham -Reid et al. .................. 364/131 |
| 5,168,441 A | 12/1992 | Onarheim et al. .......... 364/146 |
| 5,202,961 A | 4/1993 | Mills et al. ................. 395/159 |
| 5,251,125 A | 10/1993 | Karnowski et al. ......... 364/189 |
| 5,307,346 A | 4/1994 | Fieldhouse ................. 370/85.1 |
| 5,309,556 A | 5/1994 | Sismilich .................... 395/161 |
| 5,371,895 A | 12/1994 | Bristol ....................... 395/800 |
| 5,377,315 A | 12/1994 | Leggett ...................... 395/140 |
| 5,384,910 A | 1/1995 | Torres ......................... 395/156 |
| 5,392,389 A | 2/1995 | Fleming ..................... 395/159 |
| 5,394,522 A | 2/1995 | Sanchez-Frank et al. ... 395/159 |
| 5,408,603 A | 4/1995 | Van de Lavoir et al. ... 395/161 |
| 5,420,977 A | 5/1995 | Sztipanovits et al. ....... 395/160 |
| 5,426,732 A | 6/1995 | Boies et al. ................. 395/161 |
| 5,428,734 A | 6/1995 | Haynes et al. .............. 395/159 |
| 5,432,711 A | 7/1995 | Jackson et al. ............. 364/514 |
| 5,437,007 A | 7/1995 | Bailey et al. ............... 395/159 |
| 5,444,851 A | 8/1995 | Woest ...................... 395/200.1 |
| 5,452,201 A | 9/1995 | Pieronek et al. ............ 364/188 |
| 5,459,825 A | 10/1995 | Anderson et al. ............ 395/133 |
| 5,461,710 A | 10/1995 | Bloomfield et al. ......... 395/161 |
| 5,467,264 A | 11/1995 | Rauch et al. ................ 364/141 |
| 5,475,856 A | 12/1995 | Kogge ......................... 395/800 |
| 5,481,741 A | 1/1996 | McKaskle et al. ........... 395/800 |
| 5,485,620 A | 1/1996 | Sadre et al. ................. 395/700 |
| 5,491,791 A | 2/1996 | Glowny et al. ......... 395/183.13 |
| 5,500,934 A | 3/1996 | Austin et al. ................ 395/755 |
| 5,504,672 A | 4/1996 | Hardiman et al. .......... 364/165 |
| 5,504,902 A | 4/1996 | McGrath et al. ............ 395/700 |
| 5,513,095 A | 4/1996 | Pajonk ........................ 364/131 |
| 5,519,605 A | 5/1996 | Cawlfield .................... 364/151 |
| 5,530,643 A | 6/1996 | Hodorowski ................ 364/191 |
| 5,549,137 A | 8/1996 | Lenz et al. ................... 137/486 |
| 5,550,980 A | 8/1996 | Pascucci et al. ........ 395/200.05 |
| 5,559,691 A | 9/1996 | Monta et al. ................ 364/188 |
| 5,566,320 A | 10/1996 | Hubert ........................ 395/474 |
| 5,576,946 A | 11/1996 | Bender et al. ............... 364/146 |
| 5,594,858 A | 1/1997 | Blevins ....................... 395/326 |
| 5,621,871 A | 4/1997 | Jaremko et al. ............. 395/141 |
| 5,812,394 A | 9/1998 | Lewis et al. ................... 700/17 |
| 5,838,563 A | 11/1998 | Dove et al. .................. 364/188 |
| 5,920,479 A | 7/1999 | Sojoodi et al. .............. 364/191 |
| 5,950,006 A * | 9/1999 | Crater et al. ................. 395/705 |

* cited by examiner

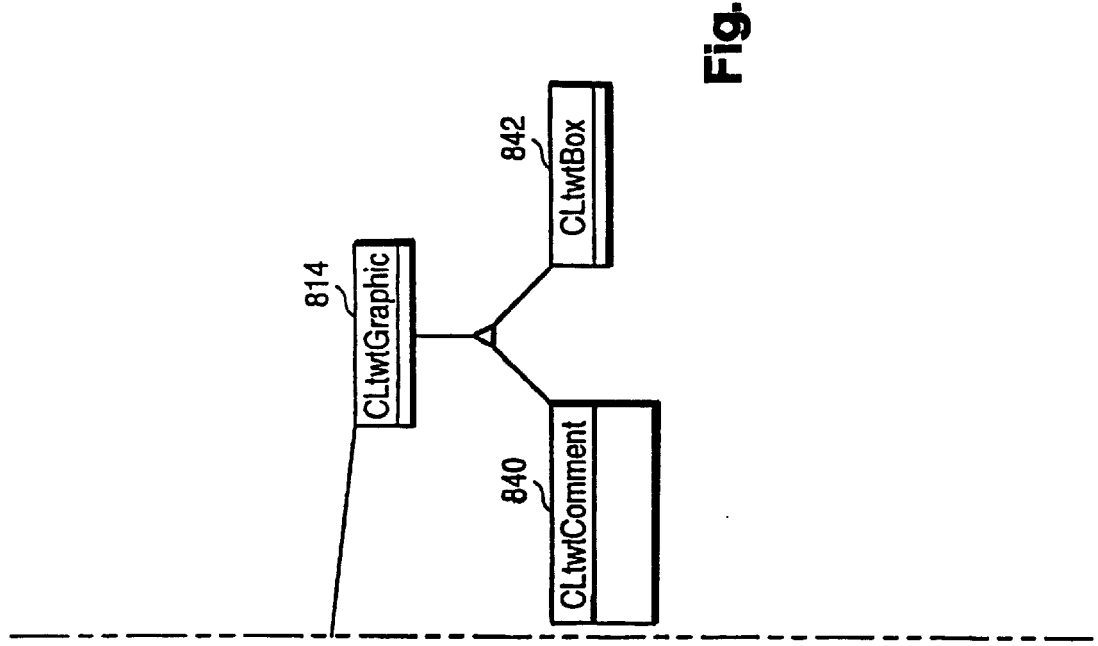

OBJECT-ORIENTED PROGRAMMABLE CONTROLLER

CROSS-REFERENCE TO RELATED APPLICATIONS AND PATENTS

This application is a continuation of U.S. patent application Ser. No. 09/025,202, filed on Feb. 18, 1998, now U.S. Pat. No. 6,078,320 entitled "System for Configuring a Process Control Environment," which application is hereby incorporated by reference in its entirety, including any appendices and references thereto, which in turn is a continuation of U.S. patent application Ser. No. 08/631,863, filed on Apr. 12, 1996, entitled "System for Configuring a Process Control Environment," now issued as U.S. Pat. No. 5,838,563 to Dove et al.

This application is related to U.S. Pat. No. 5,828,851 to Nixon et al., entitled "Process Control System Using Standard Protocol Control of Standard Devices and Nonstandard Devices," which patent is hereby incorporated by reference in its entirety, including any appendices and references thereto.

This application is related to U.S. Pat. No. 6,032,208 to Nixon et al., entitled "Process Control System for versatile Control of Multiple Process Devices of Various Device Types," which patent is hereby incorporated by reference in its entirety, including any appendices and references thereto.

This application is related to U.S. Pat. No. 5,995,916 to Nixon et al., entitled "Process Control System for Monitoring and Displaying Diagnostic Information of Multiple Distributed Devices," which patent is hereby incorporated by reference in its entirety, including any appendices and references thereto.

This application is related to copending U.S. patent application Ser. No. 08/631,519, filed on Apr. 12, 1996, entitled "Process Control System Including Automatic Sensing and Automatic Configuration of Devices," which application is hereby incorporated by reference in its entirety, including any appendices and references thereto.

This application is related to U.S. Pat. No. 5,801,942 to Nixon et al., entitled "Process Control System User Interface Including Selection of Multiple Control Languages," which patent is hereby incorporated by reference in its entirety, including any appendices and references thereto.

This application is related to U.S. Pat. No. 5,940,294 to Dove, entitled "System for Assisting Configuring a Process Control Environment," which patent is hereby incorporated by reference in its entirety, including any appendices and references thereto.

This application is related to U.S. Pat. No. 5,862,052 to Nixon et al., entitled "Process Control System using a Control Strategy implemented in a Layered Hierarchy of Control Modules," which patent is hereby incorporated by reference in its entirety, including any appendices and references thereto.

This application is related to U.S. Pat. No. 5,909,368 to Nixon et al., entitled "Process Control System using a Process Control Strategy Distributed Among Multiple Control Elements," which patent is hereby incorporated by reference in its entirety, including any appendices and references thereto.

BACKGROUND OF THE INVENTION

1. Field of the Invention

This invention relates to process monitoring and control systems. More specifically, the present invention relates to programmable controllers for operating and monitoring processes and equipment.

2. Description of the Related Art

Present-day process control systems use instruments, control devices and communication systems to monitor and manipulate control elements, such as valves and switches, to maintain at selected target values one or more process variables, including temperature, pressure, flow and the like. The process variables are selected and controlled to achieve a desired process objective, such as attaining the safe and efficient operation of machines and equipment utilized in the process. Process control systems have widespread application in the automation of industrial processes such as, for example, the processes used in chemical, petroleum, and manufacturing industries.

Control of the process is often implemented using microprocessor-based controllers, computers or workstations which monitor the process by sending and receiving commands and data to hardware devices to control either a particular aspect of the process or the entire process as a whole. The specific process control functions that are implemented by software programs in these microprocessors, computers or workstations may be individually designed, modified, or changed through programming while requiring no modifications to the hardware. For example, an engineer might cause a program to be written to have the controller read a fluid level from a level sensor in a tank, compare the tank level with a predetermined desired level, and then open or close a feed valve based on whether the fluid level reading is lower or higher than the predetermined, desired level. The parameters are easily changed by displaying a selected view of the process and then by modifying the program using the selected view. The engineer typically changes parameters by displaying and modifying an engineer's view of the process.

In addition to executing control processes, software programs also monitor and display a view of the processes, providing feedback in the form of an operator's display or view regarding the status of particular processes. The monitoring software programs also signal an alarm when a problem occurs. Some programs display instructions or suggestions to an operator when a problem occurs. The operator who is responsible for the control process needs to view the process from his point of view. A display or console is typically provided as the interface between the microprocessor-based controller or computer performing the process control function and the operator and also between the programmer or engineer and the microprocessor-based controller or computer performing the process control function.

Systems that perform monitor, control, and feedback functions in process control environments are typically implemented by software written in high-level computer programming languages such as Basic, Fortran or C and executed on a computer or controller. These high-level languages, although effective for process control programming, are not usually used or understood by process engineers, maintenance engineers, control engineers, operators and supervisors. Higher level graphical display languages have been developed for such personnel, such as continuous function block and ladder logic. Thus, each of the engineers, maintenance personnel, operators, lab personnel and the like, require a graphical view of the elements of the process control system that enables them to view the system in terms relevant to their responsibilities.

For example, a process control program might be written in Fortran and require two inputs, calculate the average of the inputs and produce an output value equal to the average of the two inputs. This program could be termed the AVERAGE function and may be invoked and referenced through a graphical display for the control engineers. A typical graphical display may consist of a rectangular block having two inputs, one output, and a label designating the block as AVERAGE. A different program may be used to create a graphical representation of this same function for an operator to view the average value. Before the system is delivered to the customer, these software programs are placed into a library of predefined user selectable features and are identified by function blocks. A user may then invoke a function and select the predefined graphical representations to create different views for the operator, engineer, etc. by selecting one of a plurality of function blocks from the library for use in defining a process control solution rather than having to develop a completely new program in Fortran, for example.

A group of standardized functions, each designated by an associated function block, may be stored in a control library. A designer equipped with such a library can design process control solutions by interconnecting, on a computer display screen, various functions or elements selected with the function blocks to perform particular tasks. The microprocessor or computer associates each of the functions or elements defined by the function blocks with predefined templates stored in the library and relates each of the program functions or elements to each other according to the interconnections desired by the designer. Ideally, a designer can design an entire process control program using graphical views of predefined functions without ever writing one line of code in Fortran or other high-level programming language.

One problem associated with the use of graphical views for process control programming is that existing systems allow only the equipment manufacturer, not a user of this equipment, to create his own control functions, along with associated graphical views, or modify the predefined functions within the provided library. New process control functions are designed primarily by companies that sell design systems and not by the end users who may have a particular need for a function that is not a part of the standard set of functions supplied by the company. The standardized functions are contained within a control library furnished with the system to the end user. The end user must either utilize existing functions supplied with the design environment or rely on the company supplying the design environment to develop any desired particular customized function for them. If the designer is asked to modify the parameters of the engineer's view, then all other views using those parameters have to be rewritten and modified accordingly because the function program and view programs are often developed independently and are not part of an integrated development environment. Clearly, a such procedure is very cumbersome, expensive, and time-consuming.

Another problem with existing process control systems is a usage of centralized control, typically employing a central controller in a network, executing a program code that is customized for specialized user-defined control tasks. As a result, the process control systems are typically constrained to a particular size and difficult to adapt over time to arising needs. Similarly, conventional process control systems are inflexible in configuration, often requiring a complete software revision for the entire system when new devices are incorporated. Furthermore, the conventional process control systems tend to be expensive and usually perform on the functions initially identified by a user or a system designer that are only altered or reprogrammed to perform new functions by an expert who is familiar with the entire control system configuration and programming.

What is needed is a uniform or universal design environment that can easily be used, not only by a designer or manufacturer but also a user, to customize an existing solution to meet his specific needs for developing process control functions. What is further needed is a personal computer-based process control system that is easily implemented within substantially any size process and which is updated by users, without the aid of the control system designer, to perform new and different control functions.

SUMMARY OF THE INVENTION

In accordance with one aspect of the invention, an apparatus having a programmable processor and a memory for performing a plurality of user-selectable control functions includes a database for storing a plurality of items associated with each of the control functions. The items may include, for each function, at least one procedure for performing an action associated with the control function and may further include a specification of at least one state associated with the control function. The apparatus may additionally include a first software routine stored on the memory and adapted to be executed by the processor for facilitating selection of a procedure in the database, a second software routine stored on the memory and adapted to be executed by the processor that responds to the selection for accessing the database and causing performance of the selected procedure to achieve the state specified therein, and a third software routine stored on the memory and adapted to be executed by the processor for monitoring at least one resource associated with the action of the procedure and, based thereon, determining whether the specified state has been achieved.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIGS. 28A and 28B illustrate a block diagram of the class hierarchy of control studio object lightweight classes that descend from class CObject;

DETAILED DESCRIPTION OF THE PREFERRED EMBODIMENTS

Figure 1:
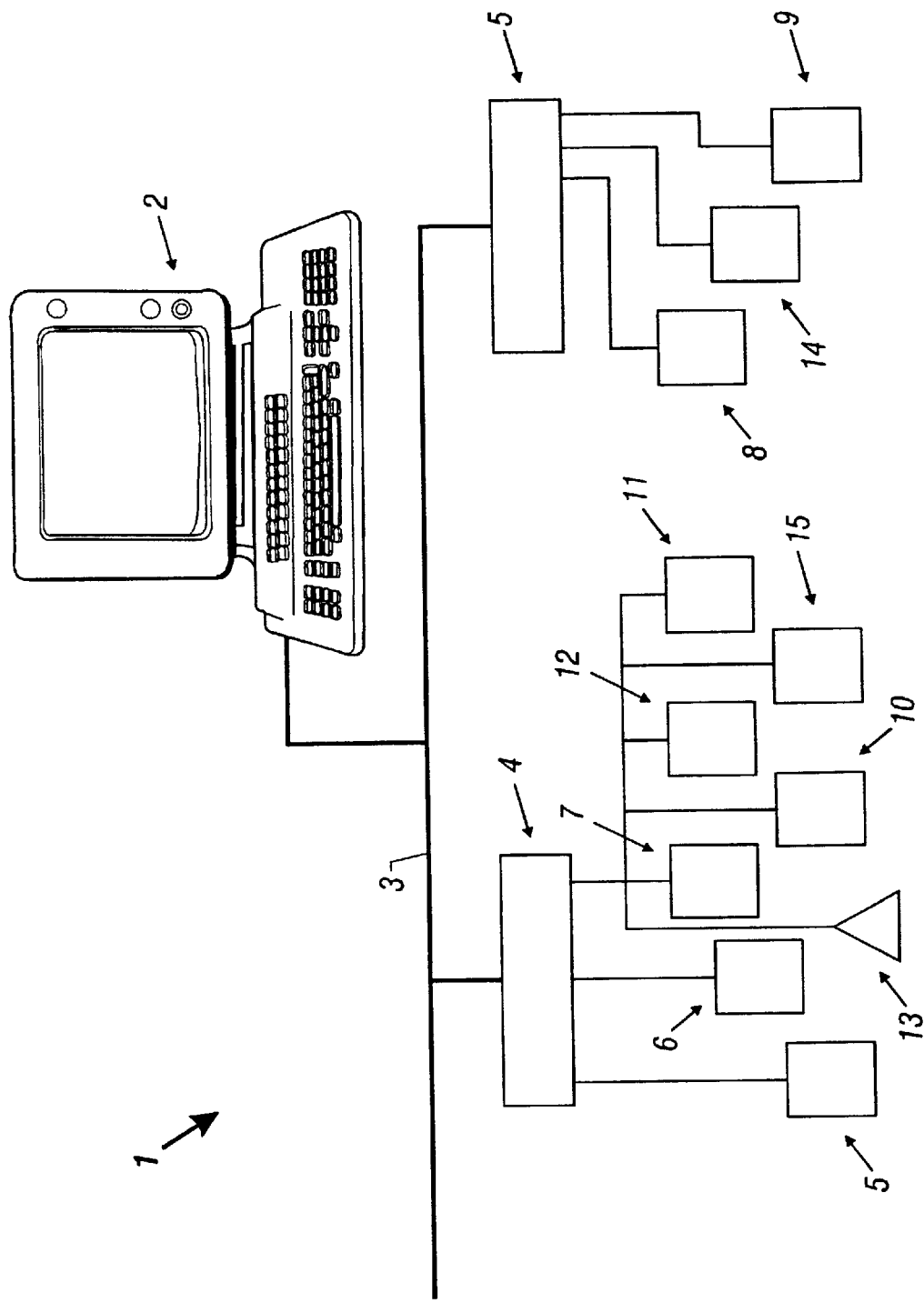
FIG. 1 is a diagrammatic view of a process control system.

Referring to FIG. 1, a control system 1 is shown. In general, the system 1 includes a main processing device, such as personal computer 2, that is connected to a local area network (LAN) 3 via a local area network card. Although any local area network protocol may be used, a non-proprietary ethernet protocol is beneficial in many applications because it allows for communications with the local area network 3. The local area network 3 is dedicated to carrying control parameters, control data and other relevant information within the process control system 1. As such, the LAN 3 may be referred to as an area controlled network (ACN) 3. The ACN 3 may be connected to other LANs for sharing information and data via a hub or gateway without affecting the dedicated nature of ACN 3. In accordance with standard ethernet protocol, a plurality of physical devices may be connected to the ACN 3 at various "nodes." Each physical device connected to the ACN 3 is connected at a node and each node is separately addressable according the LAN protocol used to implement ACN 3.

To establish a redundant system, it may be desirable to construct the ACN 3 from two or more ethernet systems so that the failure of a single ethernet or LAN system will not result in the failure of the entire system. When such redundant ethernets are used, the failure of one ethernet LAN can be detected and an alternate ethernet LAN can be mapped in to provide for the desired functionality of the ACN 3.

The main personal computer 2 (PC) forms a node on the ACN 3. The PC 2 may, for example, be a standard personal computer running a standard operating system such as Microsoft's Window NT system. The PC 2 is configured to generate, in response to user input commands, various control routines that are provided via the ACN 3 to one or more local controllers identified as elements 4 and 5, which implement the control strategy defined by the control routines selected and established in the PC 2. The PC 2 may also be configured to implement direct control routines on field devices such as pumps, valves, motors and the like via transmission across the ACN 3, rather than through local controllers 4 and 5.

Local controllers 4 and 5 receive control routines and other configuration data through the ACN 3 from the PC 2. The local controllers 4 and 5 then send signals of various types to various field devices (such as pumps, motors, regulator valves, etc.) 6 through 15, which implement and perform physical steps in the field to implement the control system established by the routines provided by the PC 2.

Two types of field devices may be connected to local controllers 4 and 5, including field devices 6 through 10 which are responsive to specific control protocol such as Fieldbus, Profibus and the like. As those in the art will appreciate, there are standard control protocols (e.g., Fieldbus) according to which specific protocol instructions are provided to protocol-friendly field devices (e.g., Fieldbus field devices) that will cause a controller located within the field device to implement a specific function corresponding to the protocol function. Accordingly, field devices 6 through 11 receive protocol specific (e.g., Fieldbus) control commands from either the local controllers 4 and 5 or the PC 2 to implement a field device specific function.

Also connected to local controllers 4 and 5 are non-protocol field devices 12 through 15, which are referred to as non-protocol devices because they do not include any local processing power and respond to direct control signals. Accordingly, field devices 12 through 15 are not capable of implementing functions that are defined by specific control protocols such as the Fieldbus control protocol.

Functionality is supplied to allow the non-protocol field devices 12 through 15 to operate as protocol-friendly (e.g., Fieldbus specific) devices 6 through 11. Additionally, this same functionality allows for the implementation of the protocol-specific control routines to be distributed between the local field devices 6 through 11, the local controllers 4 and 5 and the PC 2.

Figure 2:
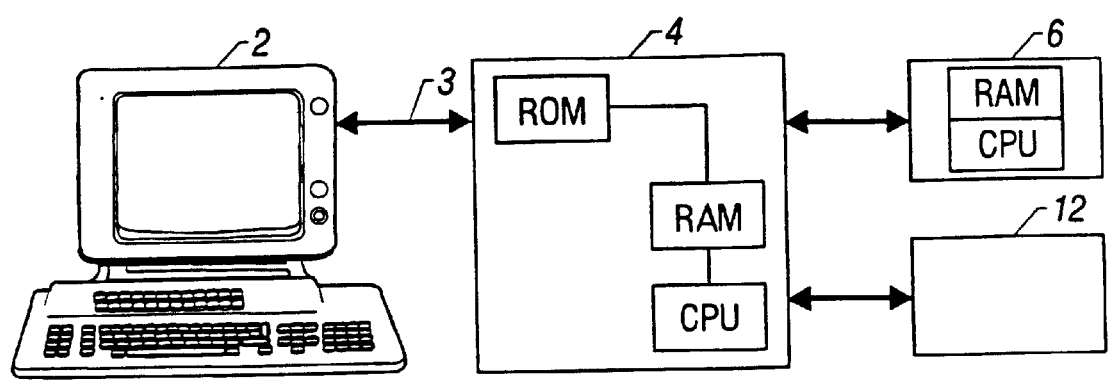
FIG. 2 is a schematic block diagram illustrating in greater detail a portion of the process control system of FIG. 1.

The distribution of protocol-specific control routines is illustrated in more detail in FIG. 2. FIG. 2 refers to one portion of the system shown in FIG. 1, specifically the PC 2, the ethernet 3, the local controller 4, a smart field device 6 and a non-smart field device 12, in greater detail.

The PC 2 includes program software routines for implementing standard functional routines of a standard control protocol such as the Fieldbus protocol. Accordingly, the PC 2 is programmed to receive Fieldbus commands and to implement all of the functional routines that a local field device having Fieldbus capabilities could implement. The ability and steps required to program the PC 2 to implement Fieldbus block functionality will be clearly apparent to one of ordinary skill in the art.

The local controller 4 is connected to the PC 2 by the ethernet 3. The local controller 4 includes a central processing unit connected to a random access memory, which provides control signals to configure the central processing unit to implement appropriate operational functions. A read only memory is connected to the random access memory and is programmed to include control routines that can configure the central processing unit to implement all of the functional routines of a standard control protocol such as Fieldbus. The PC 2 sends signals through the ethernet 3 to the local controller 4, which causes one, more or all of the programmer routines in the read only memory to be transferred to the random access memory to configure the CPU to implement one, more or all of the standard control protocol routines (such as the Fieldbus routines). The smart field device 6 includes a central processing unit that implements certain control functions, and if the smart field device 6 is, for example, a Fieldbus device, then the central processing unit associated with the smart field device 6 is capable of implementing all of the Fieldbus functionality requirements.

Because the local controller 4 has the ability to implement Fieldbus specific controls, the local controller 4 operates so that the non-protocol device 12 acts and is operated as a Fieldbus device. For example, if a control routine is running either in the PC 2 or on the CPU of the local controller 4, that control routine can implement and provide Fieldbus commands to the smart field device 6 and to the non-protocol device 12, which operate as a Fieldbus device. If the smart field device 6 is a Fieldbus device, then the smart field device 6 receives these commands and thereby implements the control functionality dictated by those commands. The non-protocol device 12, however, works in conjunction with the central processing unit of the local controller 4 to implement the Fieldbus requirements so that the local controller 4 in combination with the non-protocol field device 12 implements and operates Fieldbus commands.

In addition to allowing the non-protocol device 12 to act and operate as a Fieldbus device, the described aspect allows for the distribution of Fieldbus control routines throughout the system 1. For example, to the extent that a control routine initially requests the smart field device 6 to implement more than one Fieldbus control routine, the system 1 allows for control to be divided between the local controller 4 and the local controller 5 so that a portion of the Fieldbus control routines are implemented by local controller 5 and other Fieldbus routines are implemented by the use of the Fieldbus routines stored on local controller 4. The division of Fieldbus routine implementation may allow for more sophisticated and faster control and more efficient utilization of the overall processing power of the system 1. Still further, the fact that the PC 2 has the ability to implement Fieldbus control routines, the Fieldbus routines are further distributed between the local controller 4 and the PC 2. In this manner, the system 1 allows the PC 2 to implement one or all of the Fieldbus routines for a particular control algorithm. Still further, the system 1 allows for the implementation of Fieldbus controls within a non-Fieldbus device connected directly to the ethernet 3 through use of the Fieldbus control routines stored on the PC 2 in the same manner that Fieldbus routines are implemented within the non-Fieldbus device 12 through use on the Fieldbus routines stored on the local controller 4.

Figure 3:
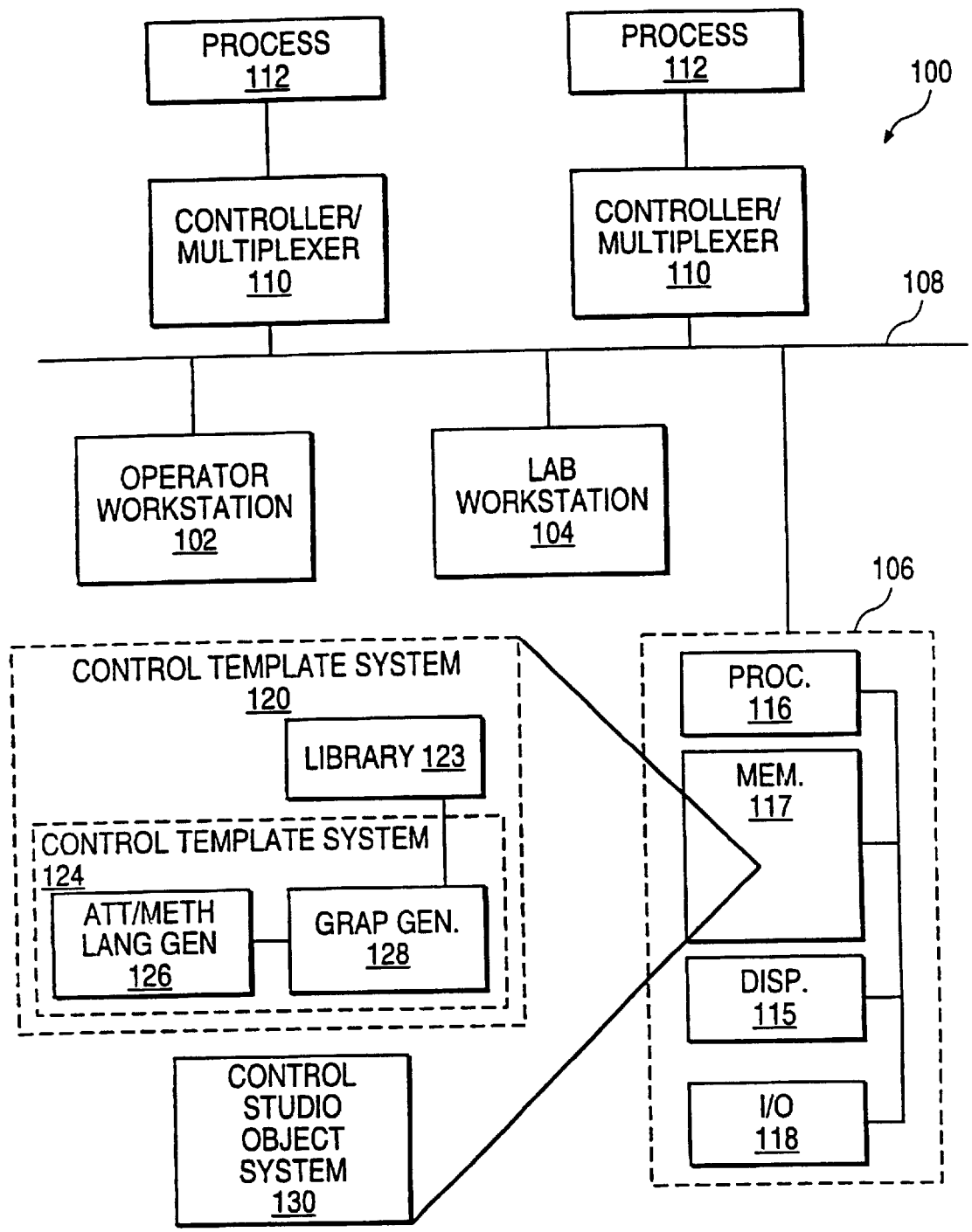
FIG. 3 is a schematic block diagram illustrating a workstation that provides the capability to create a new control template and the capability to modify an existing control.

FIG. 3 illustrates a process control environment 100 for implementing a digital control system, process controller or the like. The process control environment 100 includes an operator workstation 102 and an engineering workstation 106 electrically interconnected by a local area network (LAN) 108, or other known communication link, that transfers and receives data and control signals among the various workstations, and a plurality of controller/multiplexers 110. The workstations 102 and 106 are, for example, computers that conform to the IBM compatible architecture and are shown connected by the LAN 108 to a plurality of the controller/multiplexers 110, which electrically interface between the workstations 102 and 106 and a plurality of processes 112. The LAN 108 may include a single workstation connected directly to a controller/multiplexer 110 or, alternatively, may include a plurality of workstations, for example the two workstations 102 and 106, and many controller/multiplexers 110 depending upon the purposes and requirements of the process control environment 100. In some embodiments, a single process controller/multiplexer 110 controls several different processes 112 or, alternatively, may control a portion of a single process.

In the process control environment 100, a process control strategy is developed by creating a software control solution on the engineering workstation 106, for example, and transferring the solution via the LAN 108 to the operator workstation 102, lab workstation 104, and to the controller/multiplexer 110 for execution. The operator workstation 102 supplies interface displays to the control/monitor strategy implemented within the controller/multiplexer 110 and communicates to one or more of the controller/multiplexers 110 to view the processes 112 and to change control attribute values according to the requirements of the designed solution. The processes 112 are formed from one or more field devices, which may be smart field devices or conventional (non-smart) field devices. In addition, the operator workstation 102 communicates visual and audio feedback to the operator regarding the status and conditions of the controlled processes 112.

The engineering workstation 106 includes a processor 116, a display 115, and one or more input/output or user-interface device 118 such as a keyboard, light pen and the like. The engineering workstation 106 also includes a memory 117, which includes both volatile and non-volatile memory. The memory 117 includes a control program that executes on the processor 116 to implement control operations and functions of the process control environment 100 and also includes a control template system 120 and a control studio object system 130. The operator workstation 102, and other workstations (not shown) within the process control environment 100, include at least one central processing unit (not shown) which is electrically connected to a display (not shown) and a user-interface device (not shown) to allow interaction between a user and the processor.

The process control environment 100 also includes a template generator 124 and a control template library 123 which, in combination, form the control template system 120. A control template is defined as a grouping of attribute functions that are used to control a process and the methodology used for a particular process control function.

The control template system 120 includes the control template library 123, which communicates with the template generator 124 and which contains data representing sets of predefined or existing control template functions for use in process control programs. The control template functions are the templates that generally come with the system from the system designer to the user. The template generator 124 is an interface that advantageously allows a user to create new control template functions or modify existing control template functions. The created and modified template functions are selectively stored in the control template library 123.

The template generator 124 includes an attributes and methods language generator 126 and a graphics generator 128. The attributes and methods language generator 126 supplies display screens that allow the user to define a plurality of attribute functions associated with the creation of a new control template function or modification of a particular existing control template function, such as inputs, outputs, and other attributes, as well as providing display screens for enabling the user to select methods or programs that perform the new or modified function for the particular control template. The graphics generator 128 furnishes a user capability to design graphical views to be associated with particular control templates. A user utilizes the data stored by the attributes and methods language generator 126 and the graphics generator 128 to completely define the attributes, methods, and graphical views for a control template. The data representing the created control template function is generally stored in the control template library 123 and is subsequently available for selection and usage by an engineer for the design of process control solutions.

The control studio object system 130 provides a user friendly interface that allows a user to create, modify, use, and delete basic building blocks of a diagram, called stencil items, palette items or templates. The control studio object system 130 may be understood by a user who has no previous experience in manipulating the basic building blocks of the template generator 124. The control studio object system 130 and, specifically, the stencil portion of the control studio object system 130 interacts with the template generator 120.

The process control environment 100 is implemented using an object-oriented framework. An object-oriented framework uses object-oriented concepts such as class hierarchies, object states and object behavior. These concepts, which are discussed below, are well known in the art. The present object-oriented framework is written using the object-oriented C++ programming language, which is also well-known in the art.

The building block of an object-oriented framework is an object. An object is defined by a state and a behavior. The state of an object is set forth by fields of the object and the behavior of an object is set forth by methods of the object. Each object is an instance of a class, which provides a template for the object. A class defines zero or more fields and zero or more methods.

Fields are data structures that contain information defining object data or a portion of the state of an object. Objects that are instances of the same class have the same fields. However, the particular information contained within the fields of the objects can vary from object to object. Each field can contain information that is direct, such as an integer value, or indirect, such as a reference to another object.

A method is a collection of computer instructions which can be executed in the processor 116 by computer system software. The instructions of a method are executed, i.e., the method is performed, when software requests that the object for which the method is defined perform the method. A method can be performed by any object that is a member of the class that includes the method. The particular object performing the method is the responder or the responding object. When performing the method, the responder consumes one or more arguments, i.e., input data, and produces zero or one result, i.e., an object returned as output data. The methods for a particular object define the behavior of that object.

Classes of an object-oriented framework are organized in a class hierarchy. In a class hierarchy, a class inherits the fields and methods that are defined by the superclasses of that class. Additionally, the fields and methods defined by a class are inherited by any subclasses of the class. That is, an instance of a subclass includes the fields defined by the superclass and can perform the methods defined by the superclass. Accordingly, when a method of an object is called, the method that is accessed may be defined in the class of which the object is a member or in any one of the superclasses of the class of which the object is a member. When a method of an object is called, process control environment 100 selects the method to run by examining the class of the object and, if necessary, any superclasses of the object.

A subclass may override or supersede a method definition which is inherited from a superclass to enhance or change the behavior of the subclass. However, a subclass may not supersede the signature of the method. The signature of a method includes the method's identifier, the number and type of arguments, whether a result is returned and, if so, the type of the result. The subclass supersedes an inherited method definition by redefining the computer instructions which are carried out in performance of the method.

Classes which are capable of having instances are concrete classes. Classes which cannot have instances are abstract classes. Abstract classes may define fields and methods which are inherited by subclasses of the abstract classes. The subclasses of an abstract class may be other abstract classes; however, ultimately, within the class hierarchy, the subclasses are concrete classes.

All classes disclosed herein, except for mix-in classes which are described below, are subclasses of a class, Object. Thus, each class that is described herein and which is not a mix-in class inherits the methods and fields of class Object, which is a base class within the Microsoft Foundation class framework.

Figure 4:
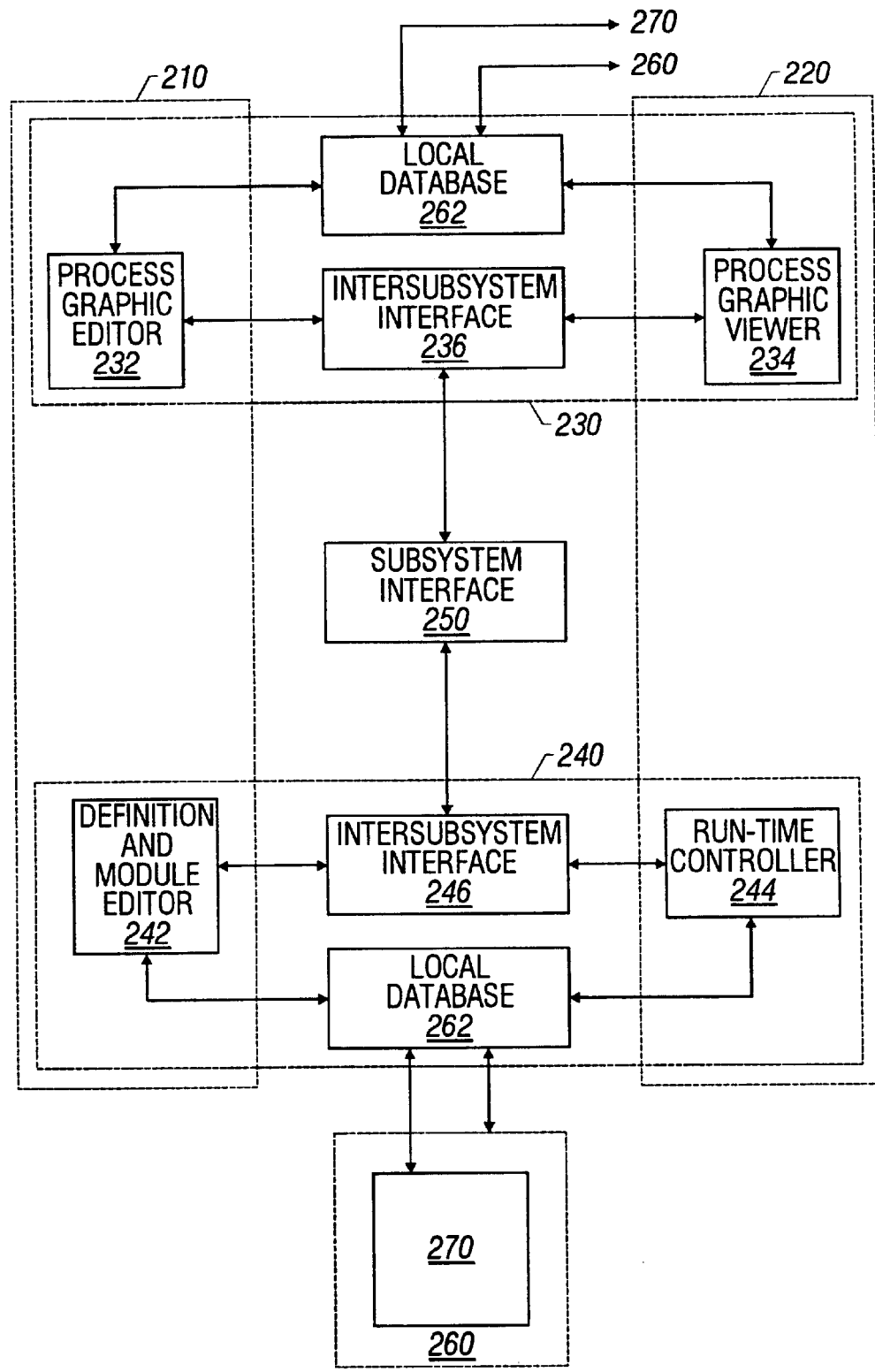
FIG. 4 is a schematic block diagram illustrating the process control environment in a configuration implementation and a run-time implementation.

The process control environment 100 exists in a configuration model or configuration implementation 210 and a run-time model or run-time implementation 220 shown in FIG. 4. In the configuration implementation 210, the component devices, objects, interconnections and interrelationships within the process control environment 100 are defined. In the run-time implementation 220, operations of the various component devices, objects, interconnections and interrelationships are performed. The configuration implementation 210 and the run-time implementation 220 are interconnected through an ASCII based download language. The download language creates system objects according to definitions supplied by a user and creates instances (described in detail below) from the supplied definitions.

Specifically, a completely configured device table relating to each device is downloaded to all Workstations on startup and when the device table is changed. Device Tables are elements of the configuration database that are local to devices and, in combination, define part of the configuration implementation 210. A device table contains information associated with a device within the process control environment 100. Information items in a device table include a device ID, a device name, a device type, a process control network (PCN) network number, an area control network (ACN) segment number, a simplex/redundant communication flag, a controller media access control (MAC) address, a comment field, a primary internet protocol (IP) address, a primary subnet mask, a secondary IP address and a secondary subnet mask.

For controller/multiplexers 110, a downloaded device table only includes data for devices for which the controller/multiplexer 110 is to initiate communications based on remote module data configured and used in the specific controller/multiplexer 10. The device table is downloaded to the controller/multiplexer 110 when other configuration data is downloaded. In addition to downloading definitions, the download language also uploads instances and instance values. The configuration implementation 210 is activated to execute in the run-time implementation 220 using an installation procedure.

The process control environment 100 includes multiple subsystems with several of the subsystems having both a configuration and a run-time implementation. For example, a process graphic subsystem 230 supplies user-defined views and operator interfacing to the architecture of the process control environment 100. The process graphic subsystem 230 has a process graphic editor 232, a part of the configuration implementation 210, a process graphic viewer 234, and a portion of the run-time implementation 220. The process graphic editor 232 is connected to the process graphic viewer 234 by an intersubsystem interface 236 in the download language. The process control environment 100 also includes a control subsystem 240, which configures and installs control modules and equipment modules in a definition and module editor 242 and which executes the control modules and the equipment modules in a run-time controller 244. The definition and module editor 242 operates within the configuration implementation 210 and the run-time controller 244 operates within the run-time implementation 220 to supply continuous and sequencing control functions. The definition and module editor 242 is connected to the run-time controller 244 by an intersubsystem interface 246 in the download language. The multiple subsystems within the process control environment 100 are interconnected by a subsystem interface 250.

The configuration implementation 210 and the run-time implementation 220 interface to a master database 260 to support access to common data structures. Various local (non-master) databases 262 interface to the master database 260, for example, to transfer configuration data from the master database 260 to the local databases 262 as directed by a user. Part of the master database 260 is a persistent database 270 which is an object that transcends time so that the database continues to exist after the creator of the database no longer exists and transcends space so that the database is removable to an address space that is different from the address space at which the database was created. The entire configuration implementation 210 is stored in the persistent database 270. The master database 260 and the local databases 262 are accessible so that documentation of configurations, statistics and diagnostics are available for documentation purposes.

The run-time implementation 220 interfaces to the persistent database 270 and the local databases 262 to access data structures formed by the configuration implementation 210. In particular, the run-time implementation 220 fetches selected equipment modules, displays and the like from the local databases 262 and the persistent database 270. The run-time implementation 220 interfaces to other subsystems to install definitions, thereby installing objects that are used to create instances when the definitions do not yet exist, instantiating run-time instances, and transferring information from various source to destination objects.

Figure 5:
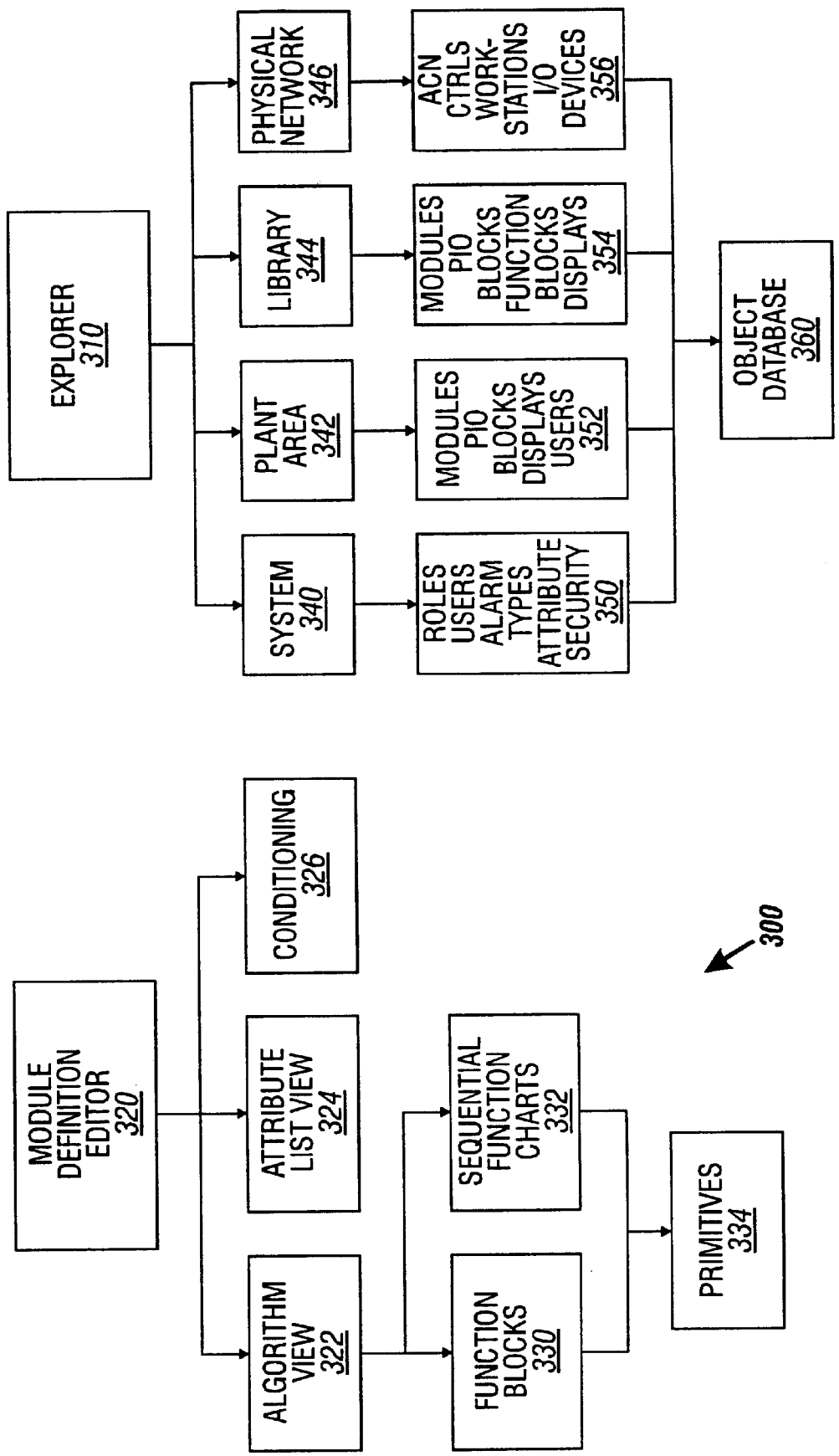
FIG. 5 is a block diagram illustrating a user interface that may be used with both configuration and run-time models of the process control environment of FIG. 4.

Referring to FIG. 5, a block diagram illustrates a user interface 300 that may be used with both the configuration and run-time models of the process control environment 100. Part of the user interface 300 is the Explorer™ 310, which is an interfacing program defined under the Windows NT™ operating system and which features a device-based configuration approach. Another part of the user interface 306 is a module definition editor 320 for interfacing to the process control environment 100.

The Explorer™ 310 is operated by a user to select, construct and operate a configuration. In addition, the Explorer™ 310 supplies an initial state for navigating across various tools and processors in a network. A user controls the Explorer™ 310 to access libraries, areas, process control equipment and security operations. FIG. 5 illustrates the relationship between various tools that may be accessed by a task operating within the process control environment 100 and the relationship between components of the process control environment 100 such as libraries, areas, process control equipment and security. For example, when a user selects a "show tags" function from within an area, a "tag list builder" is displayed, showing a list of control and I/O flags. From the tag list builder, the user can use an "add tag" function to add a module to a list, thereby invoking a "module editor."

Figure 6:
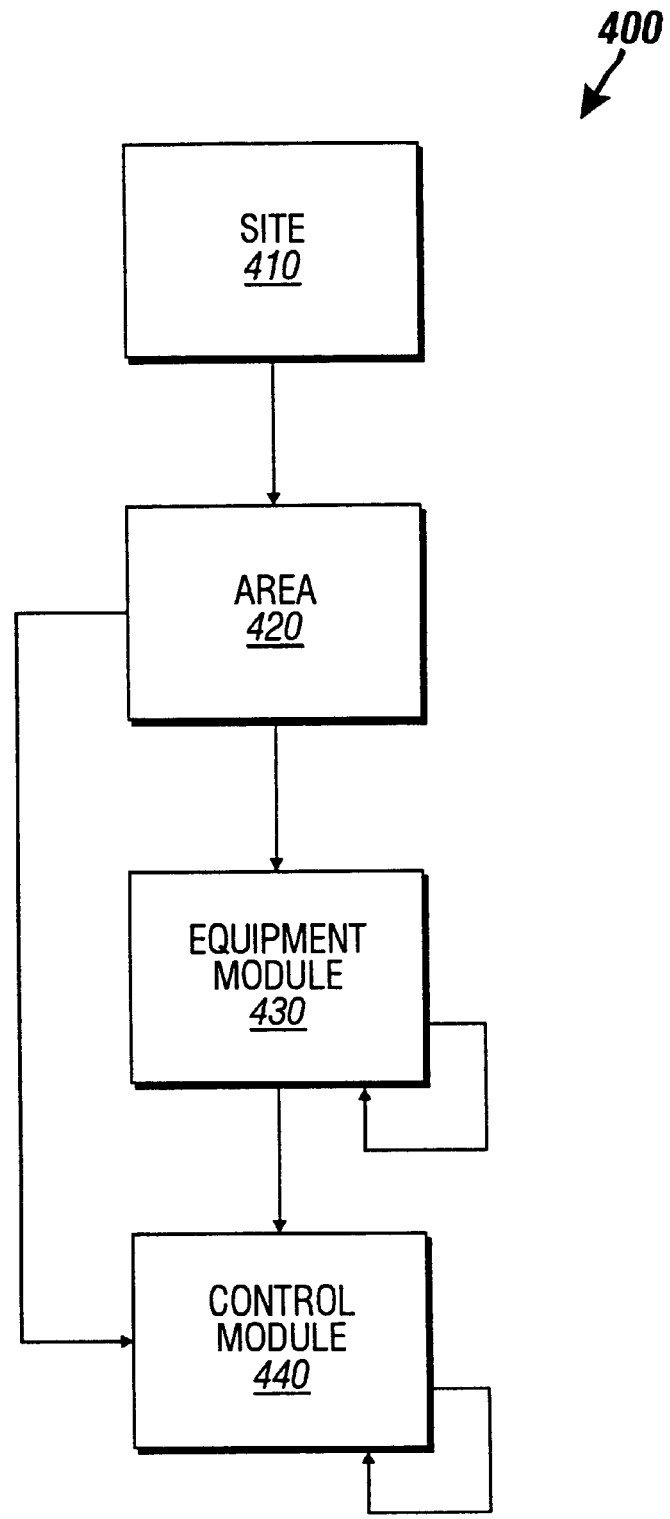
FIG. 6 is a block diagram depicting a hierarchical relationship among system objects of a configuration model.

Referring to FIG. 6, a schematic block diagram illustrates a hierarchical relationship among system objects of a configuration model 400. The configuration model 400 includes many configuration aspects including control, I/O, process graphics, process equipment, alarms, history and events. The configuration model 400 also includes a device description and network topology layout.

The configuration model hierarchy 400 may be used by a particular set of users to visualize system object relationships and locations and to communicate or navigate maintenance information among various system objects. For example, one configuration model hierarchy 400, specifically a physical plant hierarchy, may be used by maintenance engineers and technicians to visualize physical plant relationships and locations and to communicate or navigate maintenance information among various instruments and equipment in a physical plant. An embodiment of a configuration model hierarchy 400 that forms a physical plant hierarchy supports a subset of the SP88 physical equipment standard hierarchy and includes a configuration model site 410, one or more physical plant areas 420, equipment modules 430 and control modules 440.

The configuration model hierarchy 400 is defined for a single process site 410, which is divided into one or more named physical plant areas 420 that are defined within the configuration model hierarchy 400. The physical plant areas 420 optionally contain tagged modules, each of which is uniquely instantiated within the configuration model hierarchy 400. A physical plant area 420 optionally contains one or more equipment modules 430 and each equipment module 430 optionally contains other equipment modules 430 control modules 440 and function blocks. An equipment module 430 includes and is controlled by a control template that is created according to one of a number of different graphical process control programming languages including continuous function block, ladder logic, or sequential function charting (SFC). The configuration model hierarchy 400 optionally contains one or more control modules 440. A control module 440 is contained in an object such as a physical plant area 420, an equipment module 430 or another control module 440. A control module 440 optionally contains objects such as other control modules 440 or function blocks.

The system objects that are implemented in the multiple hierarchical systems are arranged into a plurality of subsystems including control, process I/O, control system hardware, redundancy management, event/alarm management, history services, process graphics, diagnostics presentation, user environment, management organization and field management system (FMS) subsystems. The control subsystem includes routines for configuring, installing and executing control modules and equipment modules. The process I/O subsystem is a uniform interface to devices including HART (highway addressable remote transducer), Fieldbus, conventional I/O and other input/output systems. The control system hardware subsystem defines a control system topology, devices within the topology and capabilities and functions of the devices. The control system hardware subsystem also includes objects and data structures for accessing device level information indicative of status and diagnostics.

Figure 7:
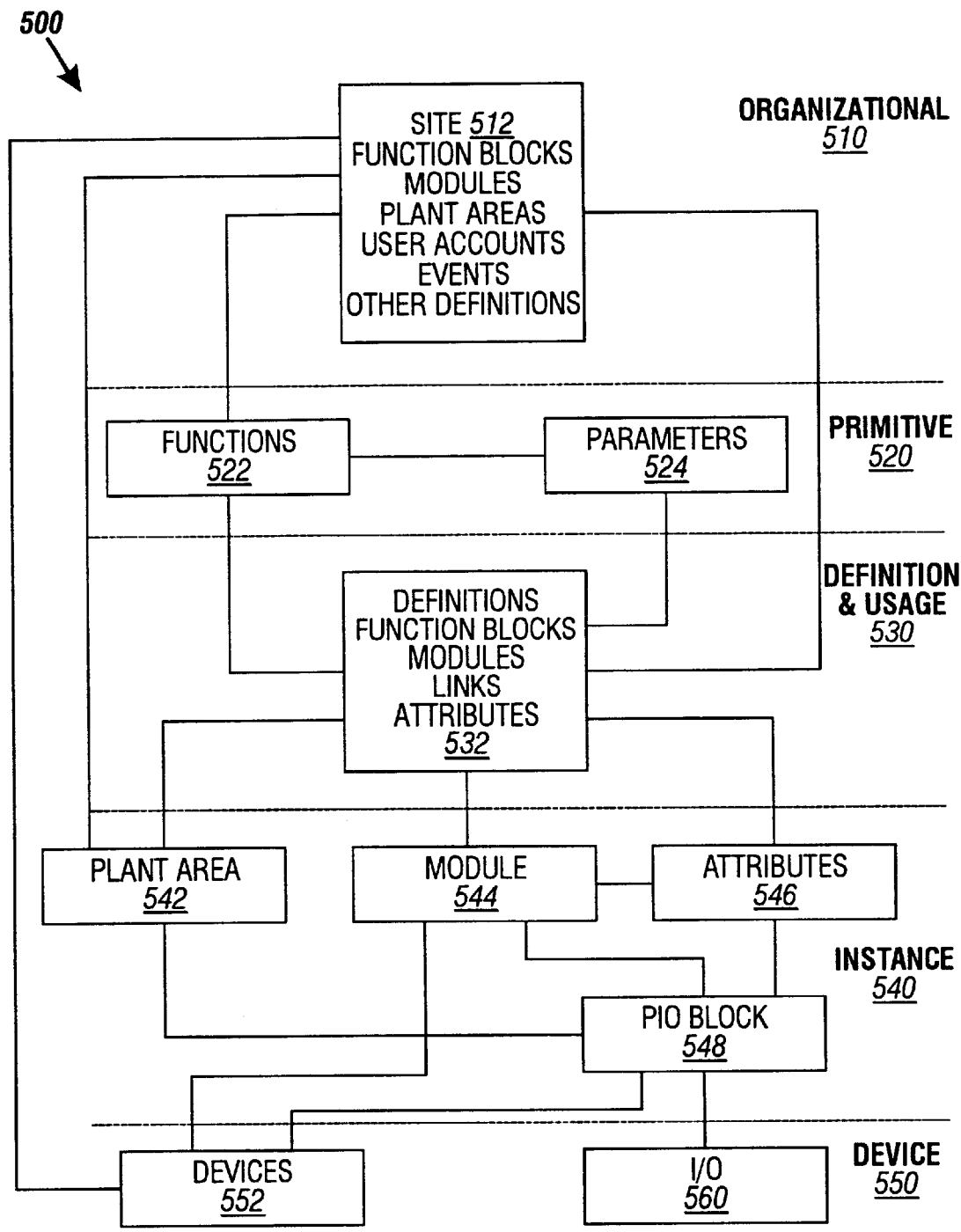
FIG. 7 is a block diagram depicting a configuration architecture that operates within the hierarchical relationship illustrated in FIG. 6.

Referring to FIG. 7, a schematic block diagram shows a configuration architecture 500 that operates within the configuration model hierarchy 400 illustrated in FIG. 6. The configuration architecture 500 includes several objects and classes at multiple levels of abstraction. At an organizational level of abstraction 510, the configuration architecture 500 includes a site class 512 which contains "named" objects and classes within the configuration architecture 500; Named objects and classes are definitions, display components such as screens and graphics, and other items. The named objects and classes include function blocks, user accounts, modules, plant areas, events, libraries and other site-wide information. Examples of named items are block definitions, equipment module definitions, control module definitions, plant area names and the like.

At a primitive level of abstraction 520, the configuration architecture 500 includes primitives that define the interfaces to functions within the configuration architecture 500, including hard-coded functions such as "+." The primitive level of abstraction 520 includes the classes of functions 522 and parameters 524. The functions 522 are operational functions at the lowest level of abstraction in the configuration architecture 500 and are typically coded in the C or C++ languages. In one embodiment of the configuration architecture 500, the full set of implemented function blocks 522 are primitives. Objects and classes at the primitive level of abstraction 520 are defined throughout the site class 512. The parameters 524 are classes and objects at the lowest level of abstraction in the configuration architecture. The parameters 524 include integer numbers, real numbers, vectors, arrays and the like. Attribute values are mapped into the parameters 524 for usage within the function blocks 522. In one embodiment, the function blocks 522 at the primitive level of abstraction 520 include the function block primitives listed in TABLE 1, as follows:

TABLE I

| | Function Blocks |
|---|---|
| Action | Handles simple assignment statements using a defined expression capability |
| ADD | Simple Add function with extensible inputs |
| AI | FF Standard Analog Input |
| AI Lite | A scaled back version of the FF analog input |
| AI HART | The FF Standard Analog Input with some extra ability to handle HART devices |
| AND | Simple And function with extensible inputs |
| AO | FF Standard Analog Output (From FF standard specification) |
| Arithmetic | FF Standard Arithmetic Block (From FF standard specification) |
| BDE_TRIGGER | Simple bi-directional edge trigger |
| BIASGAIN | FF Standard Bias/Gain (From FF standard specification) |
| CALC/LOGIC | Advanced calculation and logic block that has its own language as well as the ability to handle simple ST (1131). It has extensible inputs, extensible outputs, and the ability to create temporary variables |
| Condition | Handles simple condition statements using a defined expression capability |
| Counter | Simple up/down counter that handles several different Accumulation methods |
| CTLSEL | FF Standard Control Selector (From FF standard specification) |
| DI | FF Standard Discrete Input (From FF standard specification) |
| DI Lite | A scaled back version of the FF discrete input |
| DIVIDE | Simple Divide |
| DO | FF Standard Discrete Output (From FF standard specification) |
| DT | FF Standard Deadtime with advanced control research implemented (From FF standard specification) |
| DtoI | A boolean fan in that converts up to 16 discrete inputs to a 16-bit integer value and that has some special abilities for capturing input patterns |
| FILT | Simple filter |
| H/L MON LIMIT | Simple high/low signal monitor and limiter |
| INTEGRATOR | FF Standard Integrator block (From FF standard specification) |
| ItoD | Boolean fan-out that takes a 16-bit integer and translates it into 16 discrete outputs |
| L/L | FF Standard Lead-Lag with 2 additional types of equations to select (From FF standard specification) |
| LOOP | An I/O and control block with the abilities of AI, PID, and AO rolled into one block |
| LOOPD | An I/O and control block with the abilities of DI, Device Control, and DO rolled into one block |
| MAN | FF Standard Manual Loader (From FF standard specification) |
| MULTIPLEX | Simple multiplexor with extensible inputs |
| MULTIPLY | Simple multiply with extensible inputs. |
| NDE_TRIGGER | Simple negative edge trigger |
| NOT | Simple not |
| OFF_DELAY | Simple off-delay timer |
| ON_DELAY | Simple on-delay timer |
| OR | Simple logical or with extensible inputs |
| P/PD | FF Standard P/PD (From FF standard specification) |
| PDE_TRIGGER | Simple positive directional edge trigger |

TABLE I-continued

Function Blocks

| | |
|---|---|
| PERIOD | Simple monitor that triggers when an input is true for a specified period |
| PI | FF Standard Pulse Input (From FF standard specification) |
| PID | FF Standard PID with many additions including the ability to choose algorithm type, form, and structure (From FF standard specification) |
| RAMP | Simple ramp generator |
| RATELIM | Simple rate limiter generator |
| RATIO | FF Standard Ratio block (From FF standard specification) |
| RETENTIVE | Simple retentive timer |
| RS | Simple reset dominant flip-flop |
| RUNAVE | Simple running average calculator |
| SCALER | Simple scaler |
| SIGGEN | Generates square waves, sine waves, random waves, or any combination of the three |
| SIGNALCHAR | FF Standard Signal Characterizer (From FF standard specification) |
| SIGSEL | Simple signal selector |
| SPLITTER | FF Standard Splitter (From FF standard specification) |
| SR | Simple set dominant flip-flop |
| SUBTRACT | Simple subtract block |
| TP | Simple timed pulse block |
| TRANSFER | Simple transfer block |
| XOR | Simple exclusive or block |

At a definition and usage level of abstraction 530, the configuration architecture 500 includes definitions 532 and usages. The definitions 532 and usages, in combination, define the algorithm and the interface for objects including function blocks, control modules, equipment modules, links and attributes. The definitions 532 define algorithms and interfaces for function blocks, modules, links and attributes. Usages are objects and classes at the definition and usage level of abstraction 530 that represent the usage of one definition within another.

At an instance level of abstraction 540, the configuration architecture 500 includes instances, which are "tagged" items within the configuration. Plant areas 542, modules 544, attributes 546, and process input/output (PIO) blocks 548 are tagged instances. Instances are defined according to the definitions 532. Each of the plant areas 542 represents a geographical or logical segmentation of a process site class 512. All objects and classes at the instance level of abstraction 540 are defined throughout the plant area level so that all module instances have a 0 or 1 association with one of the plant areas 542. To be installed in a run-time system, the module instances must have a 1 association, meaning that the module is viewed as being contained by or scoped in this context of a plant area. A module instance 544 is an installable object that is associated with a specific object of plant equipment. An attribute instance 546 is a visible parameter in a module instance 544, a plant area instance 542 or other device. An attribute instance 546 may be used for an input signal, an output signal, data storage or the like.

At a device level of abstraction 550, the configuration architecture 500 includes devices 552 such as controllers, smart devices and consoles, and input/output (IO) devices 560 such as a PIO block, and the like, which represent physical process control equipment in the physical plant. A PIO block is an abstraction that represents various high density and low density conventional I/O devices including Hart, Fieldbus and other I/O devices that are interfaced with the configuration architecture 500. High or low density relates to the number of channels on an I/O card. For example, 8 channels are typical on a low density card while a high density card may have 32 channels. The devices 552 are process control equipment in the configuration architecture 500 and include objects such as controllers, I/O devices, consoles and the like. The I/O devices 560 are the physical PIO devices in the configuration architecture 500.

A smart device is a field device that can transmit and receive digital data pertaining to the device, including data relating to device calibration, configuration, diagnostics and maintenance. Typically, the smart device is also adapted to transmit a standard analog signal that is indicative of information including, for example, a process value measured by a field device. Examples of smart field devices include field devices which follow a HART protocol, a Fieldbus protocol, a Modbus protocol and a device net protocol.

Various hierarchical relationships among system objects are implemented to facilitate navigation through the process control environment 100 by different users and to accomplish different tasks. Four different hierarchical relationships are defined including control, control system, operations and physical plant hierarchies. A specific system object may be implemented in multiple hierarchical systems.

The control hierarchy is a subset of a standard SP88 hierarchy and has system objects including site, physical area, equipment module, control module and control element objects. The control hierarchy is used to organize control operations and to define the scope of named objects. A user interacts with the control hierarchy on the basis of a site instance, equipment module definitions, control module definitions, a plant area instance, equipment module instances, control module instances, display module instances, and PIO module/block instances having signal tags.

The control system hierarchy includes operator/configuration stations, host computers, controllers, I/O devices, smart devices, gateways and the like, which are associated using various network standards including ACN, PCN and other I/O network standards. In one embodiment, the ACN hardware includes standard 10-base-T ethernet communication ports and a workstation contains standard Ethernet 10-base-T interface cards and software drivers. A user interacts with the control system hierarchy on the basis of a defined site instance, a network definition, a defined network instance, devices, and subsystems such as files, cards, channels, controllers, operation stations, and Fieldbus segments.

The ACN includes communication functionality at two levels, a remote object communications (ROC) level and a low level communications level. ROC level controls the interface between the programmed applications and the ACN communications system. The low level communications support the interface with the TCP/IP sockets and the actual transmission of messages.

ROC are system operations supporting communication of objects in the process control environment 100 and, particularly, supporting communication between objects whether the objects reside in the same device or in remote devices. The ROC communication level supports communications message services including request/response, unsolicited reporting, event/alarm reporting and broadcast message service.

Request/response is a service by which applications send messages to a remote device and receive a response from the device. Unsolicited reporting is a service for periodically sending updated data to a remote device. Unchanged data is not reported. Event/alarm reporting is a guaranteed delivery message service which is used for the transmission of events, alarms and other vital information for delivery to a remote device. The broadcast message service is used to send messages to all programmed application devices on the communications network. The ROC level also sets communications policies for the communications subsystem. This means that it is responsible for managing what messages are sent and when as well as how incoming messages are processed. Communications flow control is also the responsibility of the ROC.

Low level communications support is included for device connection management, ACN redundancy and communications systems diagnostics. Device connection management establishes a communications connection between two devices and manages the transmission of messages between the two devices. ACN Redundancy handles the detection of communications link failures, controls the switch from one link to another and tracks the status of communication links between a host device and connected remote devices. Communications subsystem diagnostics tracks communication integrity and statistical information and responds to requests for communications diagnostic data.

Device connection management in an ACN communications system supports both user datagram protocol (UDP) and TCP type device connections. UDP connections are used for normal real time data transfers between devices and TCP connections are used for special applications using a streaming protocol such as file transfers, device flash downloads, and the like. Communications between devices is managed by a device connection object. The device connection object transmits data and maintains the status of the communications links between two communicating devices.

All normal device connection message traffic is directed through a single UDP communications port. A device connection object starts the communications system by creating the communication socket associated with this UDP port as well as creating the queues needed for management of the device connection message traffic. The device connection object receives all incoming messages on a device connection communications socket and routes messages to the proper device connection instance for processing. The device connection object handles timing functions of device connections, including notifying device connection instances when messages time out waiting to be acknowledged, when communications link checks are due and when device connection resyncs have timed out.

UDP type communications are used for the transfer of real-time data among devices. The ROC subsystem passes messages to a UDP device connection for transmission to a destination device. A pool of message buffers is created on startup of each device. The message pool is used for all data transferred between devices to prevent the communications subsystem from exhausting memory and ensuring that no other task exhausts memory, thereby preventing the communication subsystem from running. Communication flow control is implemented in the Device Connection Object. If the number of message buffers in the communications buffer pool reaches a predefined low level, all remote devices are inhibited from sending messages until the low buffer problem is resolved in the affected device preventing loss of messages.

TCP-type communications are used for applications using a streaming-type protocol such as file transfers and device flash downloads. TCP-type connections are temporary connections established for the duration of the applications needs and terminated once the application has completed a communications task. For reasons of interoperability, compatibility, and availability, a TCP/IP protocol stack is employed. The TCP/IP stack supplies a connection-oriented byte stream protocol (e.g., TCP) and a connectionless message oriented protocol (e.g., UDP). The device connection supports request/response messages, unsolicited data, and event and alarm data between devices. The communication system maintains the device connection through one of two available communications links in the event of a single communications failure, such as cable fault. Detection of a fault and switching to an alternate communications path transpires in a short deterministic time span, which may be less than about one second.

The operations hierarchy is defined for a particular set of users, specifically operators and maintenance engineers, generally for the purpose of accessing displays, reports, and other informational items. A user interacts with the operations hierarchy on the basis of a site instance, user group definitions, a plant area instance, equipment module instances, control module instances, display instances, and report instances.

The physical plant hierarchy is defined for a particular set of users, specifically maintenance engineers and technicians, typically for the purpose of determining physical relationships among objects and navigating maintenance information between plant instruments and equipment. A user interacts with the physical plant hierarchy on the basis of a site instance, a maintenance area instance, a plant area instance, room instances, cabinet instances, node/device instances and display instances.

The system objects that are implemented in the multiple hierarchical systems are arranged into a plurality of subsystems including control, process I/O, control system hardware, redundancy management, event/alarm management, history services, process graphics, diagnostics presentation, user environment, management organization and field management system (FMS) subsystems. The control subsystem includes routines for configuring, installing and executing control modules and equipment modules. The process I/O subsystem is a uniform interface to devices including HART, Fieldbus, conventional I/O and other input/output systems. The control system hardware subsystem defines a control system topology, devices within the topology, and capabilities and functions of the devices. The control system hardware subsystem also includes objects and data structures for accessing device level information indicative of status and diagnostics.

The redundancy management subsystem establishes a redundant context between primary and secondary control applications and manages switching in context between the primary and secondary control applications. The redundancy management subsystem also maintains and monitors redundant context diagnostic information including state information and data latency information. Network redundancy is accomplished using two separate Ethernet communications links or networks. The primary communication link is the preferred communications path. The secondary link is only used if the primary link has failed. Communications switchovers are performed on a per device basis. For example, if device A is communicating with devices B and C and the primary link to device C fails, device A continues to communicate with device B on the primary link but switches to the secondary link to communicate with device C. Each Ethernet link is a separate dedicated network having a dedicated set of IP addresses and a subnet mask.

The device connection object manages redundant communications including controlling when to switch to the secondary link and when to switch back to the primary link. Each device in the process control system tracks the communication status of all current links to remote devices by periodically sending link test messages when no other communication is occurring, to check the status of the communication links to each device. Redundancy switchovers are performed on a device connection basis.

The event/alarm management subsystem configures, monitors, and supplies notification of significant system states, acknowledgments and priority calculations. The history services subsystem stores and retrieves process and event information. The process graphics subsystem supplies user-defined views for display and operator interfacing to the defined system architecture. The diagnostics presentation subsystem furnishes displays of diagnostic information, typically at the request of a user. The user environment subsystem supplies a user interface, allowing a user to enter commands to control operation of the process control environment 100. The management organization subsystem sets an organizational structure of the process control environment 100 including specification of site, area, primitives, access to user libraries, and location of defined objects and instances. The FMS supplies user interfaces, views, and organization structure for the configuration, installation and monitoring of HART and Fieldbus devices.

A Fieldbus device implements localized control of a process within the process, in contrast to the more conventional approach of controlling device functions from a main or centralized digital control system. A Fieldbus device achieves localized control by including small localized controller/multiplexers 110 which are closely associated with field devices within the Fieldbus device. The small localized controllers of a Fieldbus implement standardized control functions or control blocks which operate on the field devices within the Fieldbus device and which also operate on other smart field devices that are connected to the Fieldbus device. Thus, the process control environment 100 implements smart field device standards, such as the Fieldbus H1 standard, Profibus standard, CAN standard and other bus-based architecture standards so that communications and control among devices, particularly Fieldbus devices, are performed so that Fieldbus-type control operations are transparent to a user. The process control environment 100 allows attachment to a substantially unlimited number and type of field devices including smart devices, such as Fieldbus and HART devices, and conventional non-smart devices. Control and communication operations of the various numbers and types of devices are advantageously performed simultaneously and in parallel. The process control environment 100 implements and executes a standard set of function blocks or control functions defined by a standard Fieldbus protocol, such as the Fieldbus H1 standard, so that Fieldbus-type control is achieved with respect to non-Fieldbus-type devices. In addition, the process control environment 100 enables Fieldbus devices to implement the standard set of function blocks and control functions. Advantageously, the process control environment 100 implements an overall strategy as if all connected devices are Fieldbus devices. This implementation is achieved, in part, by the usage of a function block as a fundamental building block for control structures. These function blocks are defined to create control structures for all types of devices.

The process control environment 100 implements an overall user-developed control strategy through the definition of function blocks and control modules by downloading or installing specific portions of the control strategy into smart devices and non-smart devices. Thereafter, the smart devices automatically perform the downloaded portions of the overall strategy independent of other control system operations. For example, the portions of the control strategy downloaded or installed into the devices operate independently of and in parallel with the control operations of the controller/multiplexers 110 and the workstations, while other control operations manage the smart devices and implement other portions of the control strategy. In effect, the process control environment 100 implements a control strategy using the controller/multiplexers 110 within the smart devices.

Figure 8:
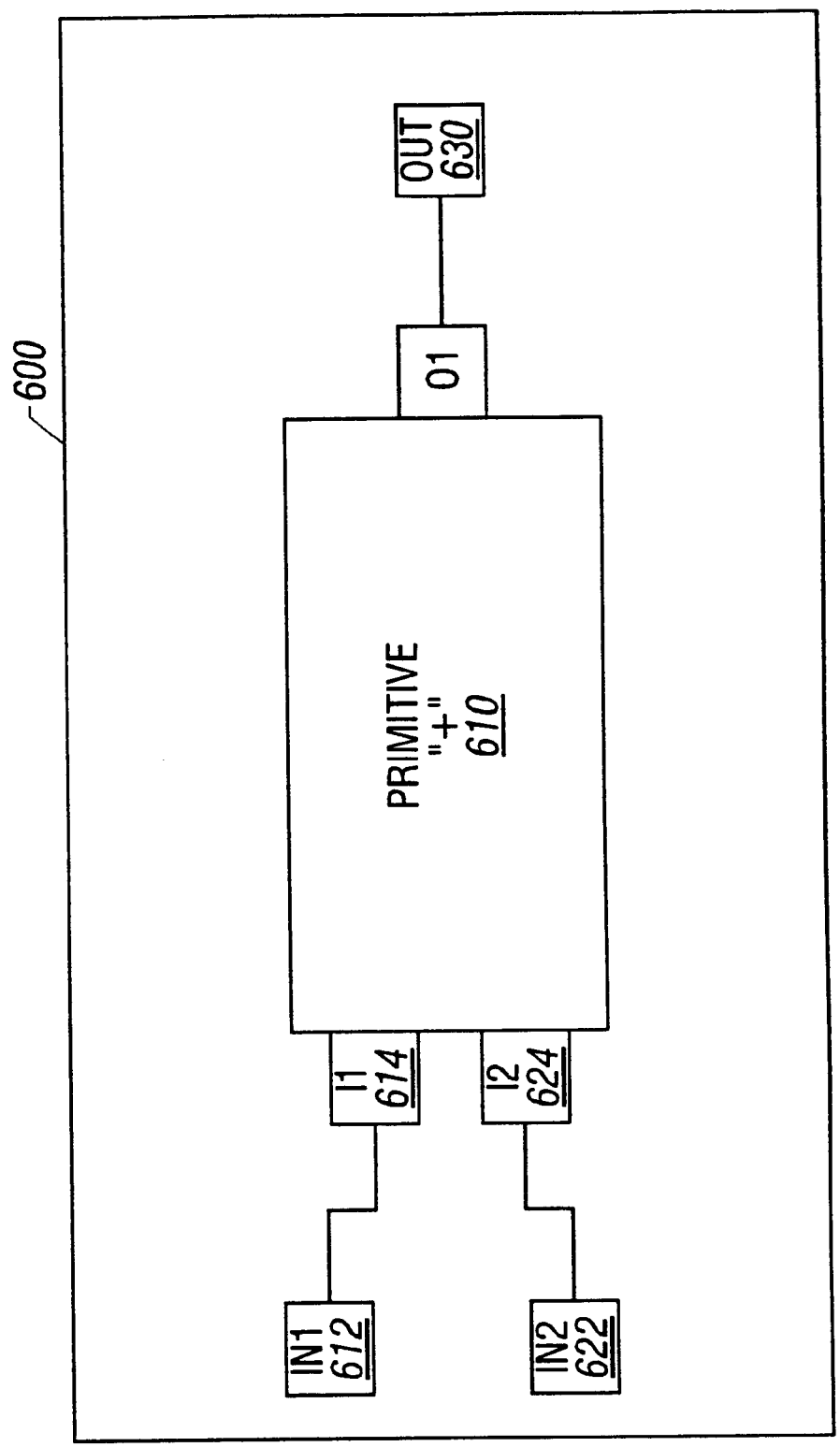
FIG. 8 is a block diagram illustrating an example of an elemental function block.

An example of a block diagram defining a function block 522 is illustrated in FIG. 8. Specifically, FIG. 8 depicts an elemental function block definition 600 that is defined to contain only primitive objects. The elemental function block definition 600 defines a sum function and includes a "+" primitive 610, a first input attribute 612, which is a first parameter 614 applied to the primitive 610, and a second input attribute 622, which is a second parameter 624 applied to the primitive 610. The primitive 610 produces a result that is supplied as an output attribute 630. In this example, the elemental function block definition 600 is a block definition that is created and named SUM.

Figure 9:
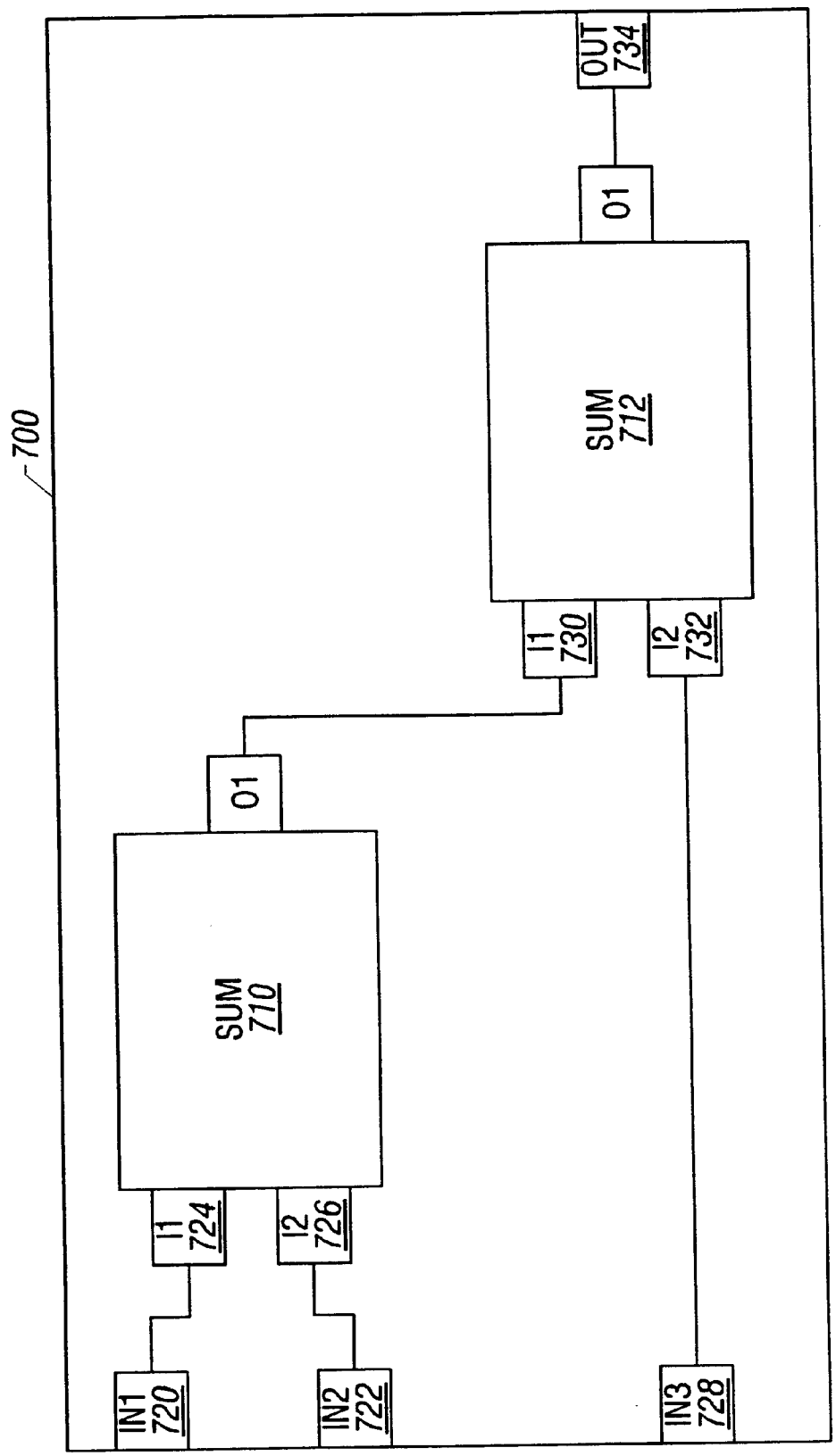
FIG. 9 is a block diagram illustrating an example of a composite function block.

A second example of a block diagram defining a function block 522 is illustrated in FIG. 9. Specifically, FIG. 9 depicts a composite function block definition 700 that is defined to contain one or more elemental function blocks 600 and, optionally, one or more primitive objects. The composite function block definition 700 defines a composite sum function and includes a first SUM elemental function block 710 and a second SUM elemental function block 712, each of which is the same as the SUM elemental function block 600 illustrated in FIG. 8. The composite function block 700 has a first input attribute 720 and a second input attribute 722, which are respective first and second parameters 724 and 726 applied to the first SUM elemental function block 710. The first elemental function block 710 produces a result that is applied to the second SUM elemental function block 712 as a first parameter 730. The composite function block 700 has a third input attribute 728 that is a second parameter 732 applied to the second SUM elemental function block 712. The second SUM elemental function block 712 produces a result that is supplied as an output attribute 734. In this example, the composite function block definition 700 is a block definition that is created and named SUM3.

Figure 10:
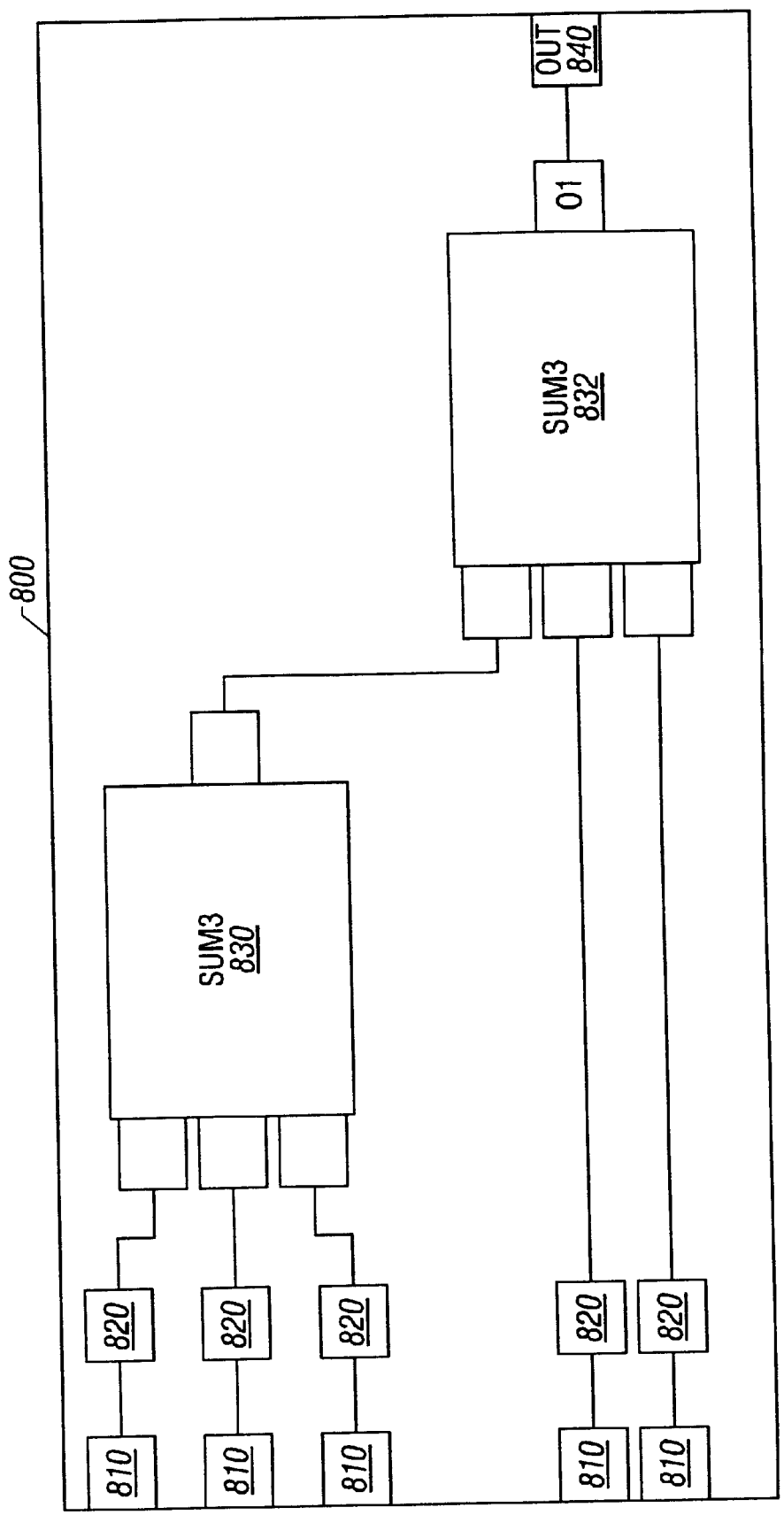
FIG. 10 is a block diagram illustrating an example of a control module.

An example of a block diagram defining a control module 440 is illustrated in FIG. 10. Specifically, FIG. 10 depicts a control module definition 800 that contains various input attributes 810, elemental function blocks 820, a first SUM3 composite function block 830 and a second SUM3 composite function block 832. The exemplary control module 800 includes five input attributes 810, which are connected to five respective elemental function blocks 820, three of which are parameters applied to the first SUM3 composite function block 830. The first SUM3 composite function block 830 produces a result that is supplied as a parameter to the second SUM3 composite function block 832 in combination with parameters supplied by the remaining two elemental function blocks 820. The second SUM3 composite function block 832 produces a result that is supplied as an output attribute 840. In this example, the control module 800 is a control module definition that is created and named CM1.

Figure 11:
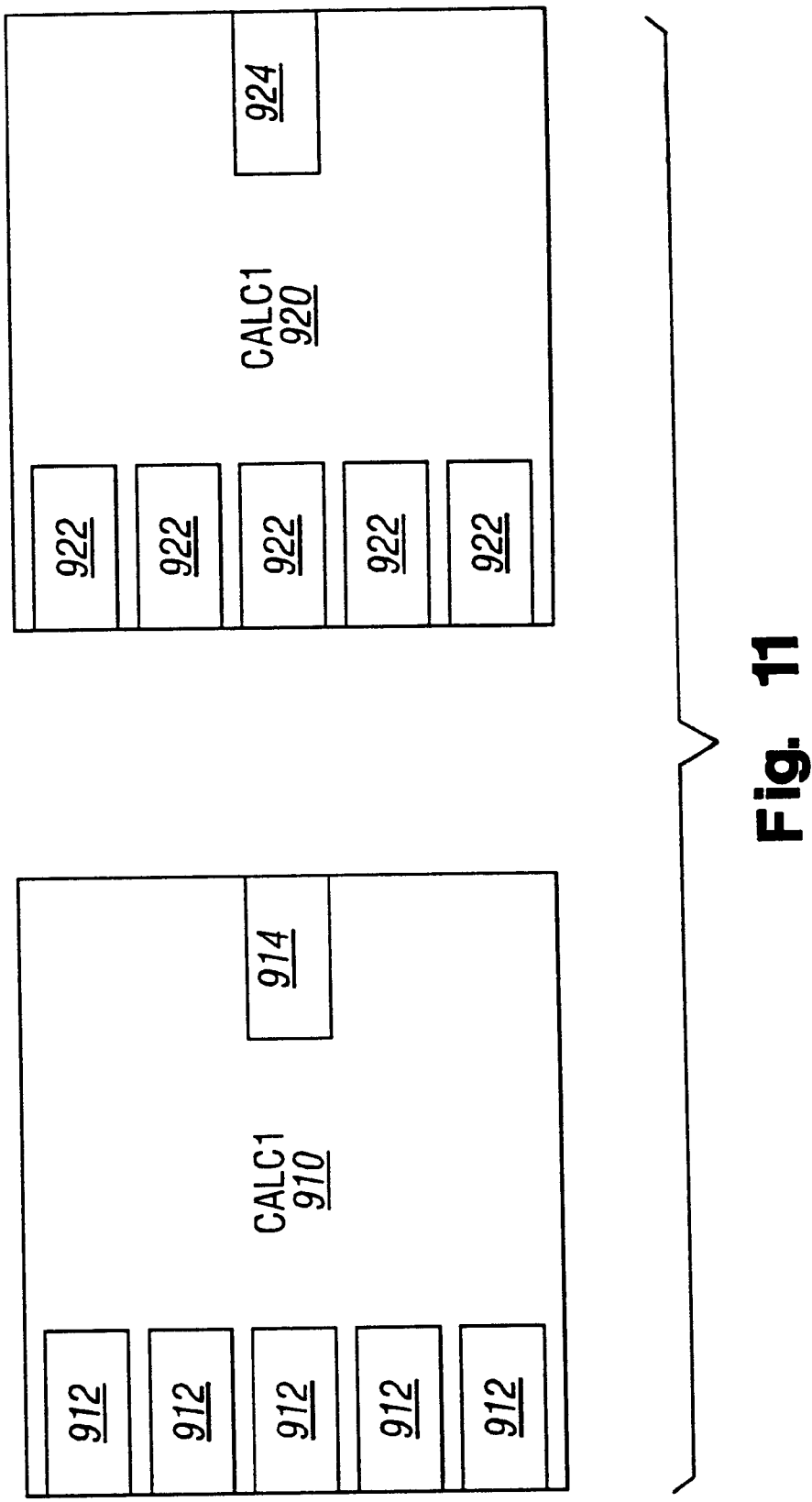
FIG. 11 is a block diagram illustrating a control module instance created in accordance with the control module depicted in FIG. 10.

Examples of a module instance of the module instances 544, specifically a control module instance, are illustrated in FIG. 11. Control module instances 910 and 920 are created in accordance with the CM1 control module definition so that each of the control module instances 910 and 920 includes five input attributes 912 and 922, respectively, that correspond to the five input attributes 810 illustrated in FIG. 10. Each of the control module instances 910 and 920 also includes one output attribute 914 and 924, respectively, that corresponds to the output attribute 840 shown in FIG. 10. In this example, the control module instances 910 and 920 are control module instances that are created and tagged CALC1 and CALC2, respectively.

Using a definition editor, a system user creates and names definitions, such as the SUM elemental function block definition, the SUM3 composite function block definition and the CM1 control module definition. Then, using a module editor, the system user creates and tags instances, such as the CALC1 and CALC2 control module instances.

Figure 12:
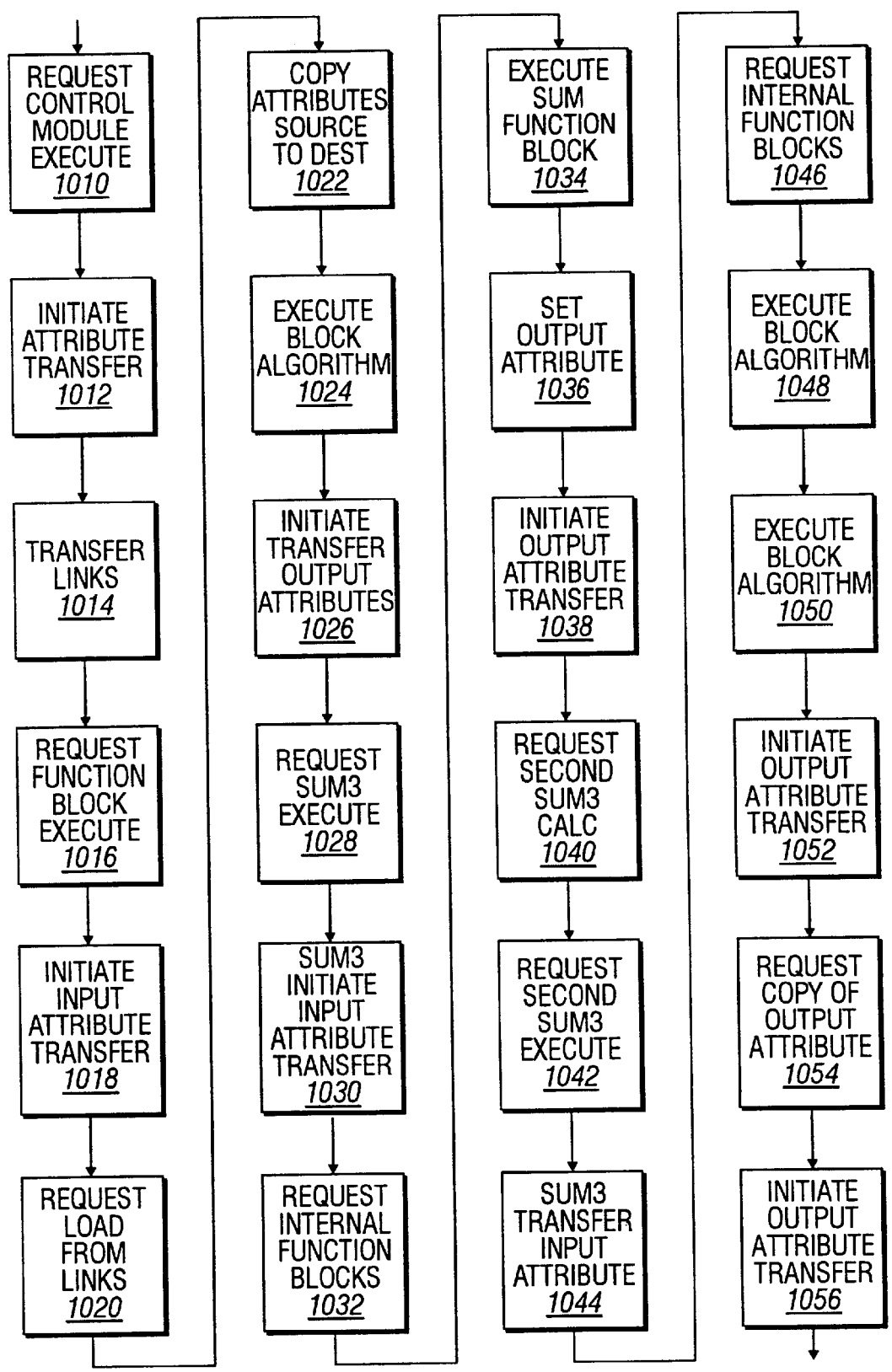
FIG. 12 is a flow diagram depicting an example of execution of a control module at run-time.

Referring to FIG. 12, a flow diagram illustrates an example of control module execution at run-time. A run-time program includes a scheduler routine. Scheduler routines are well-known in the computing arts. In step 1010, the scheduler routine requests execution of a composite control module such as, for example, the composite control module 440 with tag CM1 illustrated in FIG. 10. In step 1012, the CM1 composite control module 440 initiates transfer of the input attributes 820, causing any associated links or attribute associations to transfer in a step 1014. A database definition typically refers to associations while a runtime definition relates to links. In steps 1016 through 1056, the CM1 composite control module 440 requests each elemental function block 820, first SUM3 composite function block 830 and second SUM3 composite block 832, to execute in turn.

Specifically, in step 1016, the CM1 composite control module 440 requests each elemental function block 820 to execute. In step 1018, the elemental function blocks 820 initiate transfer of input attributes such as, for example, the first input attribute 612 shown in FIG. 8. In step 1020, the input attributes of the elemental function blocks 820 request loading of values from the links transferred in step 1014. In step 1022, the links copy values from source attributes to destination attributes and in step 1024 the elemental function blocks 820 execute block algorithms. Upon completion of block algorithm execution, the elemental function blocks 820 initiate transfer of output attributes in step 1026 such as, for example, output attribute 630 shown in FIG. 8.

In step 1028, the CM1 composite control module 440 requests first SUM3 composite function block 830 to execute and in step 1030, first SUM3 composite function block 830 initiates transfer of input attributes such as, for example, input attributes 722, 724 and 726 shown in FIG. 9, from the elemental function blocks 820. In step 1032, first SUM3 composite function block 830 requests internal function blocks such as, for example, the first SUM elemental function block 710 and the second SUM elemental function block 712 shown in FIG. 9, to execute in turn. First SUM elemental function block 710 reads input attributes, executes a block algorithm and sets an output attribute in step 1034. Second SUM elemental function block 712 reads input attributes, executes a block algorithm and sets an output attribute in step 1036. First SUM3 composite function block 830 initiates transfer of output attributes in step 1038, and the output attribute of first SUM3 composite function block 830 requests an associated link to copy the value from the output attribute in step 1040.

In step 1042, the CM1 composite control module 440 requests second SUM3 composite function block 832 to execute. In step 1044, second SUM3 composite function block 832 initiates transfer of input attributes from the links connected to the first SUM3 composite function block 830 output attributes. In step 1046, second SUM3 composite function block 832 requests internal function blocks, for example, the first SUM elemental function block 710 and the second SUM elemental function block 712 shown in FIG. 9, to execute in turn. First SUM elemental function block 710 reads input attributes, executes a block algorithm and sets an output attribute in step 1048. Second SUM elemental function block 712 reads input attributes, executes a block algorithm and sets an output attribute in step 1050. Second SUM3 composite function block 832 initiates transfer of output attributes in step 1052, and the output attribute of second SUM3 composite function block 832 requests an associated link to copy the value from the output attribute in step 1054.

In step 1056, the CM1 composite control module 440 initiates transfer of output attributes and output attribute 840 requests a link from second SUM3 composite function block 832 to copy the value of the second SUM3 composite function block 832 output attributes. In some embodiments, output function blocks push output values to a user-configured PIO block attribute (not shown). Thus, PIO attributes are pulled by function blocks while output function blocks push output values to PIO Block attributes. Similarly, input function blocks pull input attribute values from PIO Block attributes.

A user defines a module control strategy by specifying function blocks that make up control modules and determine the control strategy. The user modifies or debugs a module control strategy by adding, modifying and deleting function blocks, configuring parameters associated with the function blocks and creating a view to new attributes.

By defining function blocks and control modules, a user-defined control strategy, application program or diagnostic program is represented as a set of layers of interconnected control objects identified as modules. A layer of the control strategy includes a set of modules which are interconnected in a user-specified manner. A module typically includes an algorithm for performing a specific function and display components which are used to display information to a user. A module is optionally represented to include a set of input and output connections for connecting to other modules and may be considered to be a black box which performs a specified function and that is connected to other modules via specified input and output connections.

Figure 13:
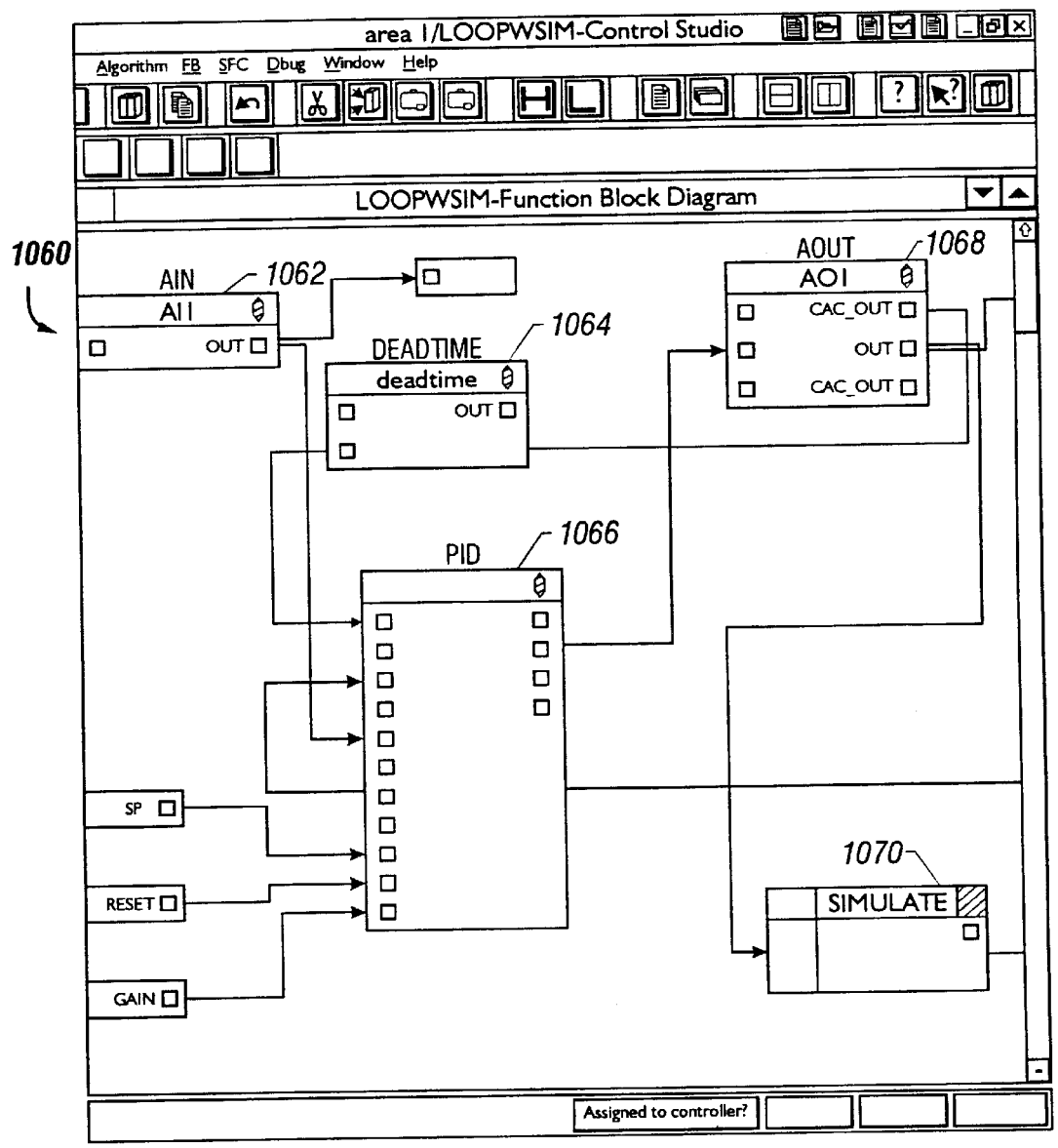
FIG. 13 is a flow diagram depicting an example of a module at a highest layer of a control structure.

Referring to FIG. 13, a display screen serves as a flow chart which illustrates an example of a module or application program LOOPSIM 1060 at a highest layer of a control structure. The illustrated layer of the LOOPSIM 1060 application program includes an input attribute (AIN) module 1062 called AI1, a deadtime module 1064, a proportional, integral, differential (PID) control module 1066, an output attribute (AOUT) module 1068 and a simulate module 1070. Each of the illustrative modules includes named input connections and output connections that are connected to the other modules via lines. The set of modules, the input connections and the output connections of the set of modules, and the interconnections between modules define the operation of the LOOPSIM 1060 application.

At a lowest level, a module is a set of interconnected function blocks. At higher levels, a module is a set of interconnected submodules which, in turn, may include a further set of submodules. For example, the PID control module 1066 is typically a set of interconnected submodules which perform the different functions included in a PID functionality. The input and output connections of the PID module 1066 are an input connection and an output connection of one or more of the submodules within a next lower layer of the PID module 1066. The submodules in the PID module 1066 optionally include other input and output connections sufficient to define the interconnections between the submodules.

An application, a module or a submodule, at any module level, is optionally modified by a user to perform a slightly different function or to perform the same function in a different manner. Thus, a user optionally modifies the module, thereby modifying the control structure, in a desired manner. Specifically, a user optionally adds input and output connections to modules and extends the input and output connections of a module to a higher level module to customize modules for various applications. For example, a user may optionally add a new input connection or output connection to the PID module 1066, which causes the input connection and output connection to appear as input and output connections to the PID module 1066.

The process control environment facilitates the definition and modification of the control structure by furnishing editing operations in a plurality of control languages including IEC-1131 standard languages such as Field Blocks, Sequential Function Charts (SFC), Ladder Logic and Structured Text. Accordingly, different types of users, from different control backgrounds use the different languages to write different modules for implementing the same or different applications.

Control modules are specified to have several advantageous characteristics. Some control modules allow direct access to attributes. For example, some attributes, such as heavy attributes, support direct (maximum performance) communications. Direct communications are advantageously used for connecting function blocks and control modules, supporting event/alarm detection, and high performance trending, for example. Some attributes are created automatically upon definition of a control module with a user having the option to promote or force a parameter to be exposed as an attribute of a control module. Other parameters are made accessible through a module, such as a control module, an equipment module, a PIO block, or a device, which contains the parameter but direct communications performance of the attributes does not warrant the overhead incurred in supplying-this performance. These parameters are advantageously accessed to supply information relating to control system tuning, debugging and maintenance. In some embodiments, these parameters are accessed by a general purpose parameter browser applications, which use services provided by tagged containers to reveal attributes, invokeable services, and subcomponents within the containers.

Figure 14:
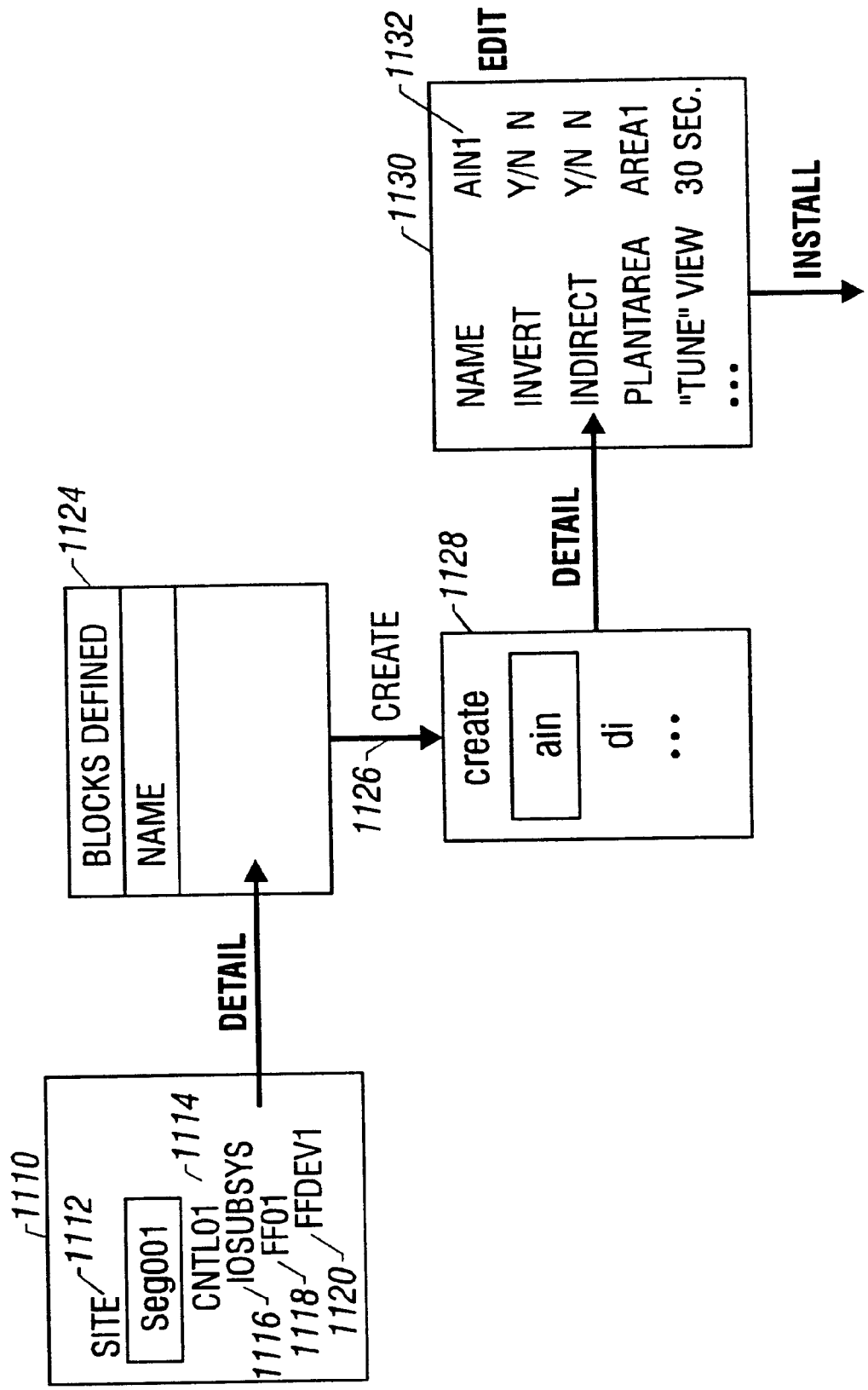
FIG. 14 is a block diagram depicting an object-oriented method for installing a process input/output (I/O) attribute block into a process input/output PIO device.

Referring to FIG. 14, a block diagram illustrates an object-oriented method for installing a PIO attribute block into a PIO 1120 device through the operation of the control subsystem. A block of defined objects 1110 includes a site object 1112, a controller device 1114, a controller I/O subsystem 1116, a PIO interface device 1118 and the PIO device 1120. Prior to installation of the PIO device 1120, the controller I/O subsystem 1116 is previously created. The PIO device 1120 is also previously created, either by installation or downloading. The block of defined objects 1110 directs a detail pointer 1122 to a list of block definitions 1124 to specify a particular type of object to be created by a create pointer 1126 that directs the operation of a create block 1128. The block definitions 1124 includes a PIO input attributes (AIN) block definition, either as hardwired or by previous installation. Attributes of the specified object are set by a user through the operation of an editor 1130. Prior to installation of the PIO device 1120, an input attribute (AIN) block 1132 does not exist. Prior to installing the AIN block 1132, a user creates the PIO device 1120 then sets up initial values for AIN block attributes using the editor 1130. The user also sets a period for view parameter acquisition. The AIN block 1132 is saved and then installed.

Figure 15:
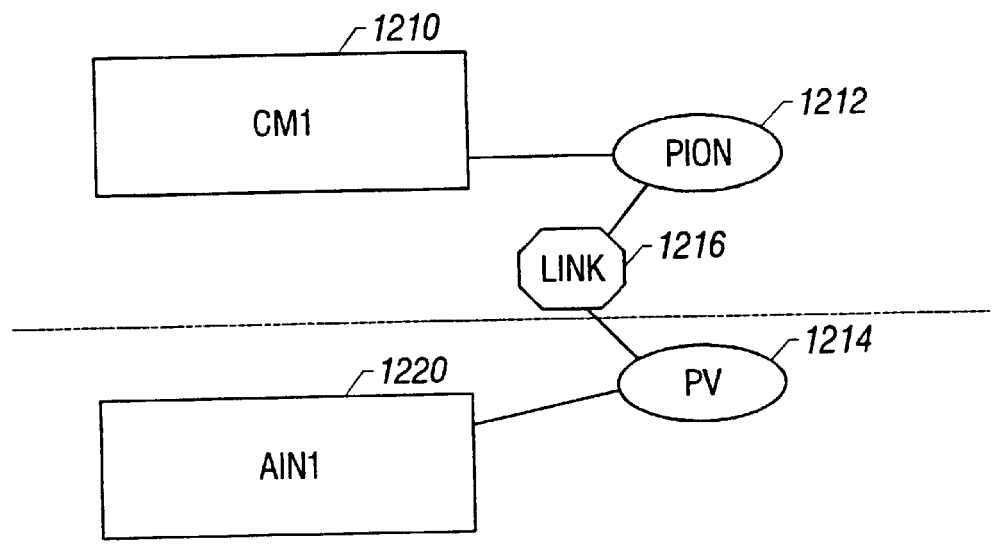
FIG. 15 is a block diagram depicting an object-oriented method for linking a control module input attribute to a PIO attribute.

Referring to FIG. 15, a block diagram illustrates an object-oriented method for linking a control module input attribute to a PIO attribute. Prior to linking of the control module input attribute to the PIO attribute, the PIO block AIN 1220 is previously installed and the control module 1210 is also installed. The user specifies that a PIOIN attribute 1212 of the control module 1210 is connected to an attribute input process variable PV 1214 and requests that a link be made. A link 1216 is made as the control module finds the PIOIN attribute and returns a corresponding attribute index, locates PIO AIN in a plant area, finds the process variable PV attribute and returns a corresponding attribute index, instructs the run-time linker 1216 to create a link with a source at the process variable (PV) 1214 and a destination at the PIOIN attribute 1212, and creates the link and connects the link 1216. At end of a download, links are resolved by the linked objects.

Figure 16:
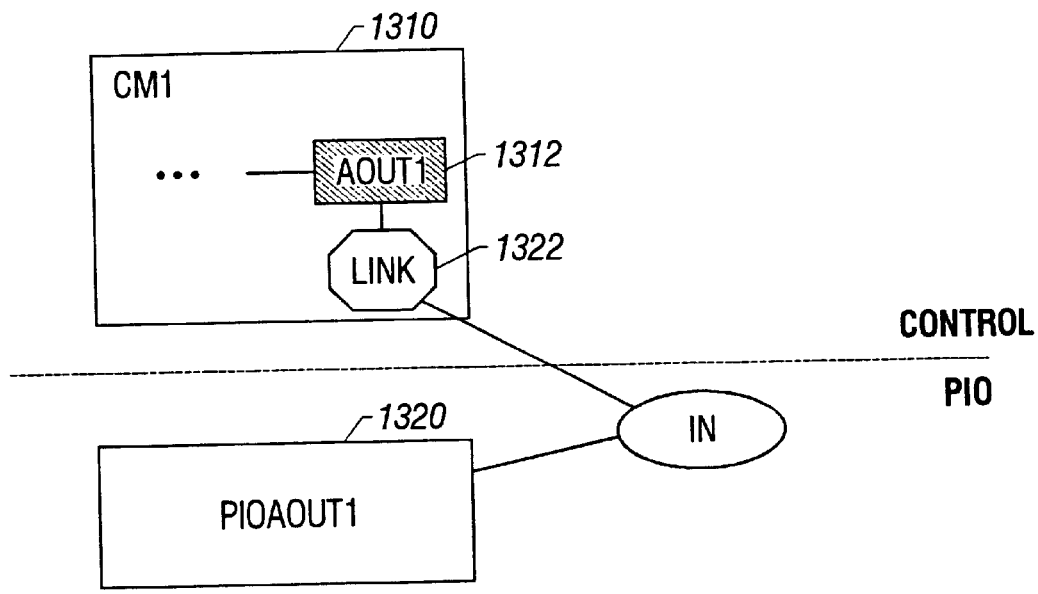
FIG. 16 is a block diagram depicting an object-oriented method for linking a control module output attribute to a PIO attribute.

Referring to FIG. 16, a block diagram illustrates an object-oriented method for linking a control module output attribute (AOUT) 1312 attribute to a PIO output attribute (PIOAOUT) 1320. A control module 1310 is previously installed and the control module output attribute (AOUT) 1312 is installed within the control module 1310. The user specifies that the control module output attribute (AOUT) 1312 is connected to the a PIO output attribute (PIOAOUT) 1320. The link is made as the run-time implementation of the control module 1310 is sent a message to form the connection, the control module 1310 finds the AOUT attribute, requests location of the PIOAOUT attribute 1320, creates a link 1322 and connects the AOUT attribute 1312 and the PIOAOUT attribute 1320 to the link 1322.

Figure 17:
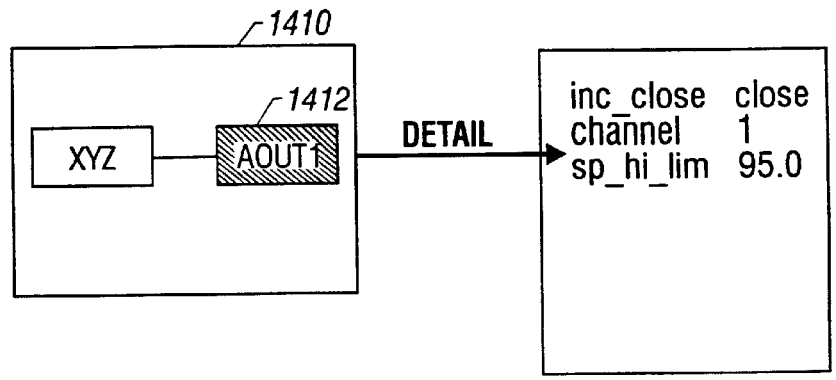
FIG. 17 is a block diagram depicting an object-oriented method for reading values of contained PIO attributes.

Referring to FIG. 17, a block diagram illustrates an object-oriented method for reading values of contained PIO attributes. A PIO block 1410 is previously installed and an output attribute (AOUT) 1412 is previously installed within the PIO block 1410. A user requests a detailed view of the block in which all attribute values are displayed. The detailed display includes one or more sets of display groups, also called view definitions, associated with the PIO block 1410. A proxy is previously established for the PIO Block 1410. A user requests detail for the output attribute (AOUT) 1412. Attribute names and values for the AOUT block are presented by an application program requesting a proxy client routine to access a view, an AOUT proxy client setting a return view definition and creating an attribute proxy object, and the application program requesting the AOUT proxy client to read out values for attributes named with granted privileges. The application program formats and displays the data. Display group parameters are part of an I/O block definition and are, therefore, not configurable. Display groups are defined for attributes and information is advantageously updated while a PIO block is not linked since display groups and view groups control updating of non-linked PIO attributes associated with a block.

The process control environment 100 implements an overall strategy as if all connected devices are Fieldbus devices not only by the usage of a function block as a fundamental building block for control structures but also by implementing an I/O architecture that treats Fieldbus and nonFieldbus devices in the same manner. The fundamental character of the I/O architecture is based on instrument signal tags (ISTs) that furnish user-configurable names for all I/O signals including Fieldbus and nonFieldbus I/O signals. From the perspective of a user, an IST binds a user-defined name to a signal type, to a specific signal in the I/O subsystem, to a signal path including an attribute and to a set of signal property settings.

ISTs are not installed in the same manner as other system objects are installed. Instead, signal properties inherent to the IST tag are combined with I/O port and I/O device properties that are made available when an I/O card is installed. The combination of IST, I/O port and I/O device properties furnish information for creating a PIO function block in the run-time system. The signal path from ISTs is included in the script that defines I/O Function Blocks during installation of a module.

To communicate throughout the process control environment 100, an I/O type function block uses an I/O reference definition. An IST satisfies the specification for an I/O reference. Conventional I/O devices, such as MTL devices supplied by Measurement Technologies Limited of the United Kingdom, have an IST for each channel. Hart and Fieldbus I/O devices may include an IST for each distinct 110 signal on a port or in a field device. IST names have system-wide scope and share the name space of modules, devices, and areas. In large systems, ISTs typically correspond to instrument signal names on instrumentation drawings. In small systems, formal instrument drawings may not exist so that no obvious IST names are inferred. Typically, ISTs are automatically generated as cards are configured based on a device hierarchy path representing a controller node, I/O subsystem, card and port so that arbitrary IST names are avoided. For multiple-signal I/O devices, an IST is automatically created for only a single primary signal. In addition to automatic IST creation, a user may also create ISTs using an "Assign . . . " menu available from the Explorer Node/IOsubsys/Port/Device tree with a Port or Device selected or using a "New . . . " menu available from the Explorer IST tree.

ISTs have a signal type property to ensure compatibility between the I/O signal and the I/O function block or blocks that accesses the I/O signal. Signal type is one of: AIN, AOUT, DIN, DOUT, PCIN, PCOUT. ISTs have a set of signal-related attributes specific to the signal type (e.g., EU0 and EU100 for a MOMENTARY, AIN or LATCHED for a DOUT, etc.). All signal sources with the same signal type have the same set of signal attributes. All other properties of the I/O subsystem objects are held-in card, port, or device attributes.

Fully configured ISTs have a fully qualified path to a corresponding signal in the I/O system, e.g., "CON1/IO1/S01/C01/FIELD_VAL." An IST may be created without a defined path defined so that module configuration may be completed before I/O structure details are fully defined. Modules with I/O function blocks using ISTs with no defined path may be configured and installed, but the run-time system must deal appropriately with missing I/O paths of missing ISTs on I/O function blocks. A signal source has no more than one IST and attempts to configure more than one IST with the same path are rejected.

A user may delete an IST, thereby deleting associated signal properties and possibly leaving some unresolvable IST references in I/O function blocks. A deleted IST does not affect card/port/device properties with a normal display of the IST on the Port/Device in the Explorer tree indicating no associated IST.

I/O-interface function blocks have at least one IST-Reference property. An IST-Reference property is either left blank to indicate that the function block does not connect to a IST, or is designated with a valid IST name. An IST-Reference property in an I/O function block is compatible with exactly one IST signal type. For example, the IST-Reference in the AI function block has an IST with a signal type "AIN" only. Several I/O function blocks are compatible with the same IST signal type.

For compatibility with Fieldbus I/O function block definitions, Fieldbus I/O function blocks have attributes such as XD_SCALE and OUT_SCALE, which overlap with some of the signal properties in ISTs. When a valid IST-Reference is made, the configured values of these overlapped function block attributes are ignored in the run-time system and the corresponding properties from the IST are used instead. An engineer configuring Fieldbus I/O function blocks uses an indication of ignored attributes when a IST reference is in place. Such an indication is typically presented on a display as grayed out and non-editable text with values copied from the IST. The I/O function block holds a private setting for the ignored attributes, which are typically downloaded and promptly overridden. If the IST-Reference is removed, the setting for these attributes retains utility.

I/O cards, ports and devices are incorporated into a configuration by a user operating a user interface, either the Explorer™ or the Module Definition Editor. The channels on conventional I/O cards are called ports and are treated as I/O ports so that special case terminology for conventional I/O is avoided. The user interface also allows a user to delete I/O cards, ports or devices. Multiple I/O card types are supported including, for example, 8-chan MTL AI, 8-chan MTL AO, 8-chan MTL DI, 8-chan MTL DO, 4-chan MTL Thermocouple/RTD, 8-chan HART input, 8-chan HART output, and 4-chanSolenoid. Some I/O card types have a combination of I/O port types on the same I/O card. Deletion of an I/O card deletes all subordinate ports. Deletion of an I/O port deletes all subordinate devices. Deletion of I/O ports or I/O devices does not delete related instrument signal tags (ISTs), but the path of the IST path to the associated I/O signal no longer is operable. If another I/O port or I/O device is created which has the same path, the IST automatically rebinds to the I/O port or I/O device, so long as the signal type is compatible. A user can initiate the Install of an I/O subsystem, which installs or reinstalls all I/O cards defined in the Subsystem. The user can initiate the install of a single I/O card, which installs the card properties and all properties for subordinate I/O ports and I/O devices.

The Explorer™ and the Module Definition Editor configure the I/O subsystem by accessing current signal values, status, and selected properties that are directly addressable as attributes in the I/O subsystem. The user displays a graphic indicative of the current status of cards, ports, devices, and signal values and status by accessing the respective cards, ports, devices and signal values and status using device hierarchy attribute path addressing (for example, "CON1/IO1/C01/P01/FIELD_VAL").

I/O subsystem attributes are communicated using the physical device path (for example, CON1/IO1/C01/P01/D01/FIELD_VAL) for addressing in communications between devices. Communication of I/O subsystem attributes is advantageously used to transmit attributes from a controller/multiplexer 110 to one or more of the workstations 102, 104, 106 for display and from a first to a second controller/multiplexer 110 for virtual I/O handling.

Figure 18:
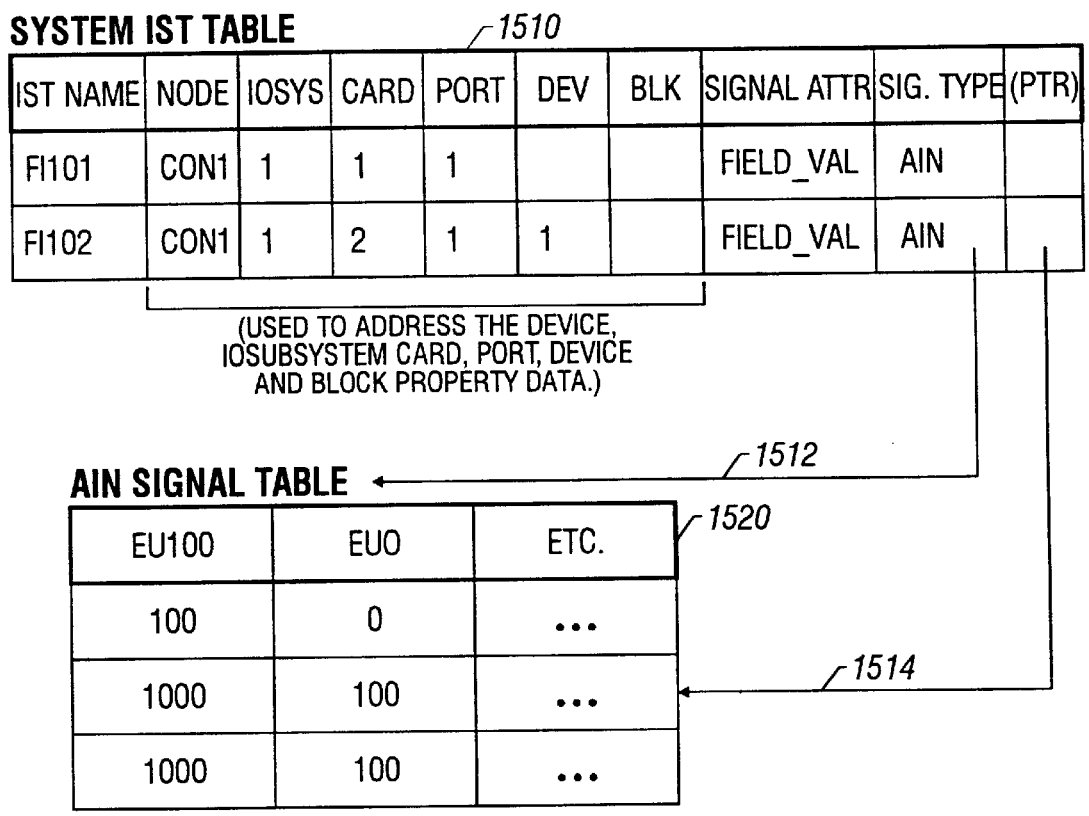
FIG. 18 is a block diagram illustrating an organization of information for an instrument signal tag.

Referring to FIG. 18, a block diagram illustrates an organization of information for an instrument signal tag. A system IST table 1510 contains information relating to an IST including path information and pointers to a system object. A first pointer 1512 designates a signal type which points to an attribute signal table 1520 and a second pointer 1514 designates an entry in the attribute signal table 1520. Accessing information using device hierarchy attribute addressing advantageously allows system diagnostic displays to be designed and built for system integration checkout before control module work is complete. Device hierarchy attribute addressing also supports direct addressing of I/O signals from modules, bypassing the use of I/O function blocks and avoiding I/O function block behavior. I/O card, I/O port and I/O device identifiers are generally defined automatically according to slot position information and the like.

Figure 19:
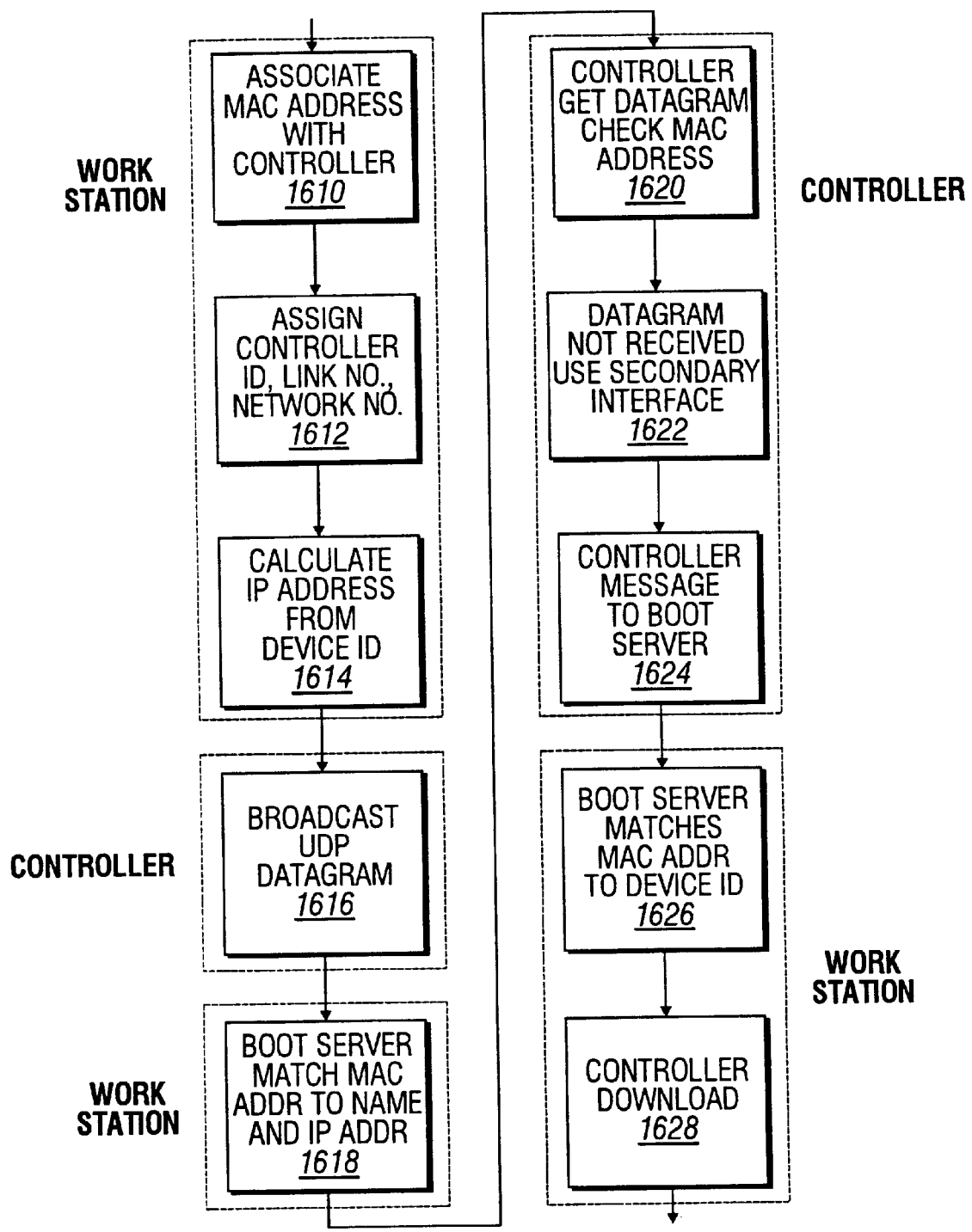
FIG. 19 is a flow diagram illustrating a method for bootstrap loading a control system throughout a network in a process control environment.

Referring to FIG. 19, a flow diagram illustrates a method for bootstrap loading a control system throughout a network in the process control environment 100, including the operations of assigning the controller/multiplexers 110 to a set of IP addresses, a node name and other startup information that is not stored in flash ROMs of the controller/multiplexer 110. A process 1600 for assigning internet protocol (IP) addresses to a controller upon its initial bootup includes the step of associating a MAC address in a Boot server, a Windows NT™ workstation, with a controller/multiplexer name 1610. The MAC address alone designates the controller/multiplexer identity. In step 1612, the name of the controller/multiplexer is assigned an arbitrary device ID, and an ACN link number and a PCN network number that are determined by the cable attached to the controller/multiplexer. In step 1614, an IP address of a device is calculated from the device ID, the ACN link number and the PCN network number. In step 1616, a UDP datagram, which designates default primary and secondary IP addresses that are reserved for booting nodes and includes the controller/multiplexer MAC address in the UDP user data, is broadcast to a special UDP reserved boot port using the default primary IP address for the source address on the primary interface. In step 1618, the boot server matches the MAC address with the assigned name and IP addresses, and broadcasts the assigned name and IP addresses with an echo of the MAC address to the UDP boot port. By broadcasting, the problem of doing any routing or ARP static entry manipulation is avoided. In step 1620, the controller/multiplexer receives the datagram, checks the MAC address, and if the MAC address matches, sets the IP addresses and saves the node name and device ID. If the datagram is not received, the procedure is repeated using the secondary interface through the operation of branch step 1622. In step 1624, the controller/multiplexer, using the new address, sends a message to the boot server saying indicating that the controller/multiplexer is operational.

In step 1626, a user enters a device name, the device MAC address, the ACN link number and the PCN network number. The device ID can be automatically assigned by configuration software. The communications subsystem calculates the three IP addresses of the device from the configured ACN link number, the PCN network number and the assigned device ID. In step 1628, controller/multiplexer or I/O card software is flash downloaded over the ACN network by passing messages and S-Record files between devices on the ACN.

Figure 20:
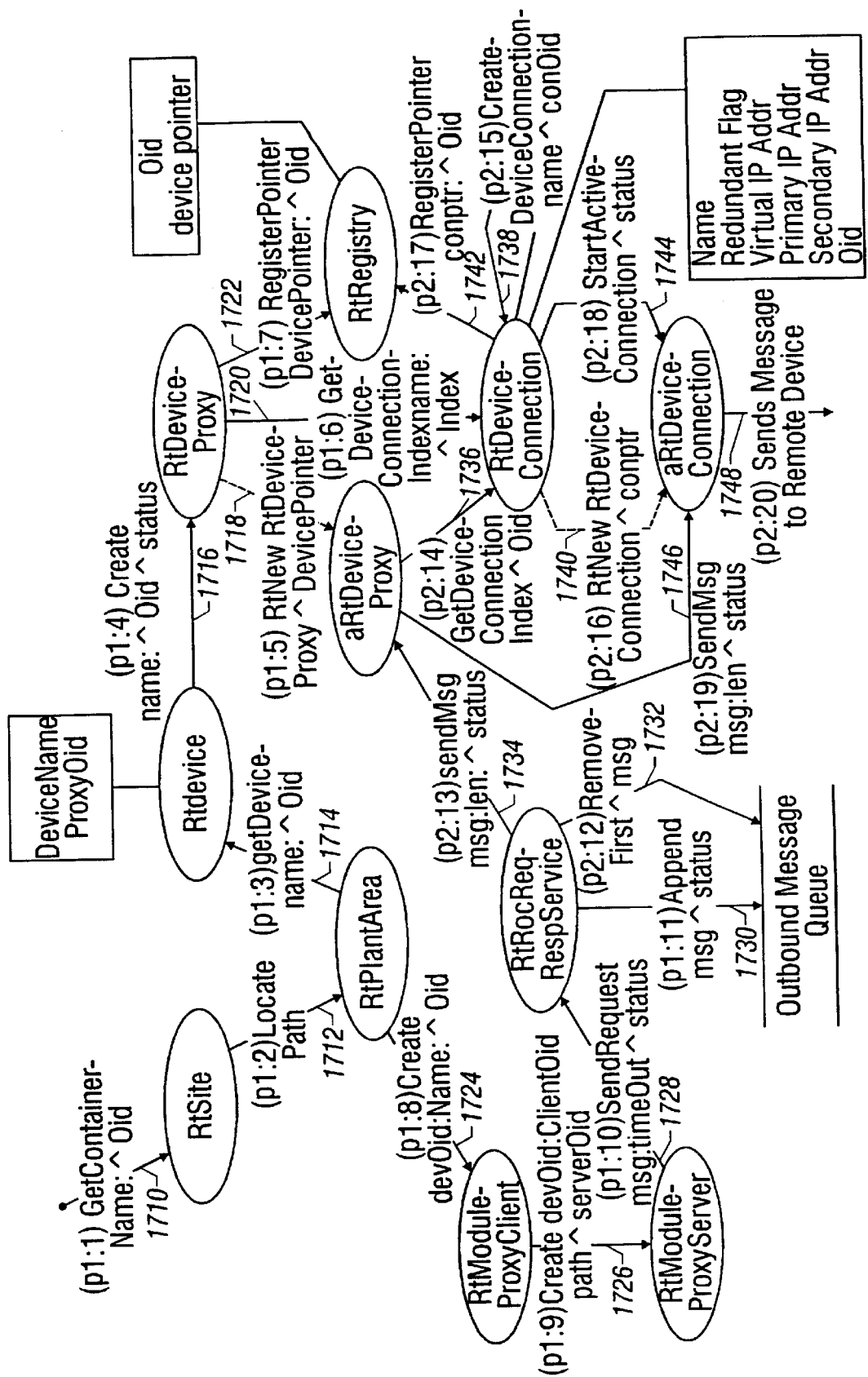
FIG. 20 is an object communication diagram illustrating a technique for creating a device connection for an active, originating side of the connection.

Referring to FIG. 20, an object communication diagram illustrates a method for creating a device connection for the active, originating side of a connection. An application program in either a workstation or a controller/multiplexer requests access to an attribute which is contained in another device. A UDP communications connection to the other device is established by the communication services so that the attribute can be accessed. Creation of a device connection spans two separate application programs. The application program initiates the connection by requesting data located in another device and the remote object communications (ROC) services application program that actually sends the messages to the other device. If no connection exists when the ROC services process is ready to send a message to a device, the ROC services create a connection to that device.

Prior to creating the device connection, a device to be connected has a valid device table containing the source device, is operating and includes an object RtDeviceConnection which monitors messages on the device connection port. After the device connection is created, a connection is established between the two devices and an RtDeviceConnection instance is created in the active device to handle the connection.

In step 1710, an application program sends a message getContainer to object RtSite, which returns the object ID of the module found or created. In step 1712, object RtSite sends a Locate message to an object RtPlantArea, which locates the module and returns its object ID. In step 1714, the object RtSite sends a GetDevice message to an object RtDevice which returns the object ID of the device containing the module. In step 1716, assuming that a proxy for the remote device does not exist, the object RtDevice sends a Create message to an object a RtDeviceProxy. In step 1718, the object RtDeviceProxy creates an instance of an object of a RtDeviceProxy using a template RtNew. In step 1720, the object RtDeviceProxy asks an object RtDeviceConnection to GetDeviceConnectionIndex, which returns the index of the device name in the device connection table managed by an object RtDeviceConnection. In step 1722, the object RtDeviceProxy registers the pointer to the RtDeviceProxy instance for the connected device by sending a RegisterPointer message to an object RtRegistry and returns the device proxy object ID to the object RtDevice. In step 1724, an object RtPlantArea sends a Create message to an object RtModuleProxyClient to create a proxy client for the remote module. In step 1726, the object RtModuleProxyClient sends a Create message to an object RtModuleProxyServer to create a proxy server for the module in the remote device. In step 1728, the object RtModuleProxyServer builds a create proxy server message and asks an object RtRocReqRespService to SendRequest to the remote device. In step 1730, the object RtRocReqRespService appends the message to the outbound message queue for the ROC communications services process to send to the remote device. In step 1732, the object RtRocReqRespService in the ROC comm services process issues a RemoveFirst command to the outbound message queue and gets the create proxy server message. In step 1734, the RtRocReqRespService object sends the message by issuing a sendMsg command to a aRtDeviceProxy instance for the destination device. In step 1736, the aRtDeviceProxy instance issues a GetDeviceConnection command to the RtDeviceConnection to get the object ID for the RtDeviceConnection instance for the destination device. Assuming that a device connection does not already exist, in step 1738, the object RtDeviceConnection performs a createDeviceConnection. In step 1740, the object RtDeviceConnection creates an instance of RtDeviceConnection using template RtNew. In step 1742, the object RtDeviceConnection registers the pointer to the RtDeviceConnection instance by sending a RegisterPointer message to the object RtRegistry and returns the device connection object ID to the object RtDeviceConnection. In step 1744, the object RtDeviceConnection sends a startActiveConnection message to the aRtDeviceConnection instance and the aRtDeviceConnection instance performs the necessary steps to establish the connection to the other device. In step 1746, the RtDeviceProxy instance issues a sendMsg to the aRtDeviceConnection instance to send the create server message to the remote device. In step 1748, the aRtDeviceConnection instance sends the message to the remote device over the newly created connection.

Figure 21:
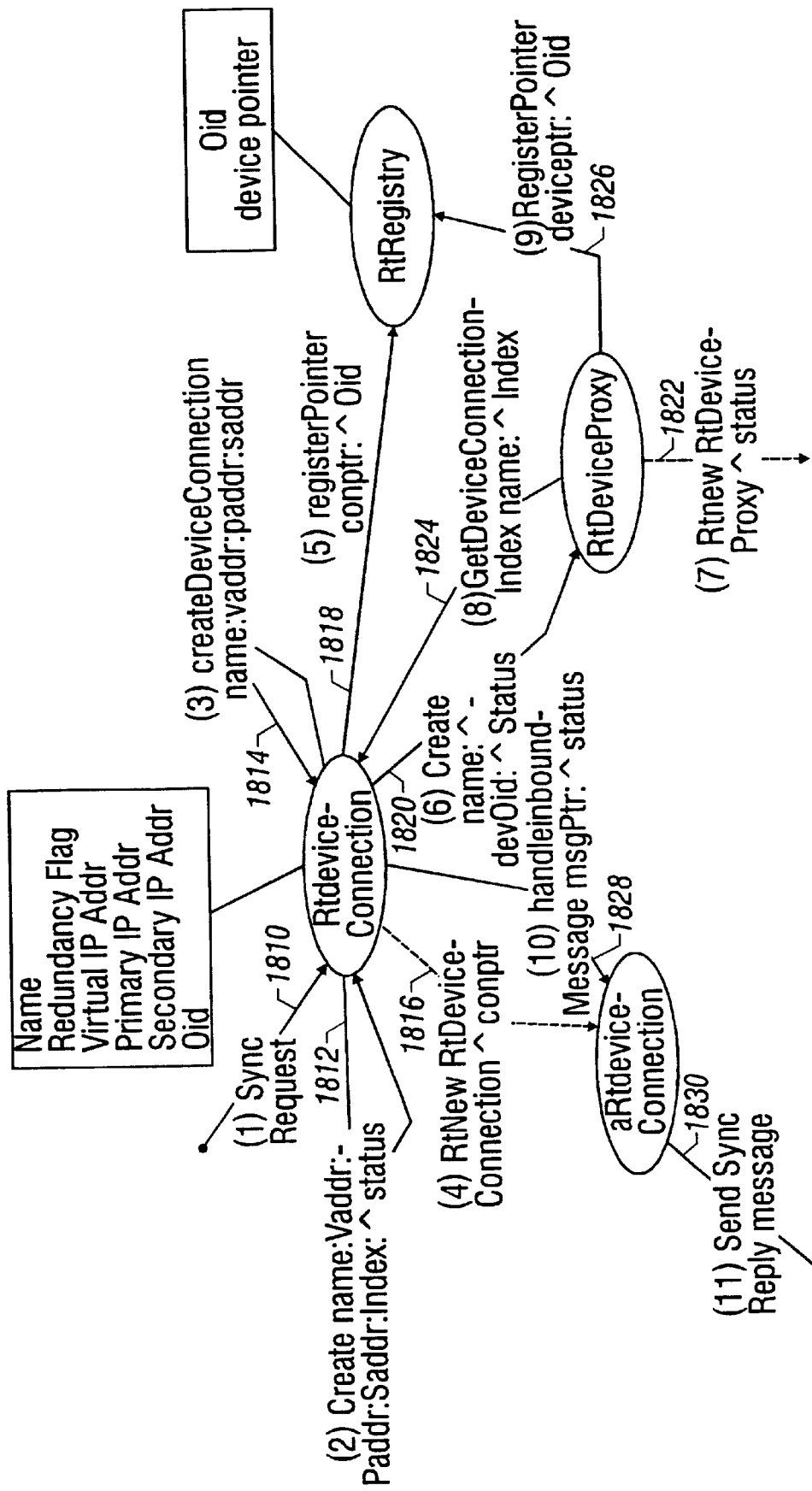
FIG. 21 is an object communication diagram illustrating a technique for creating a device connection for a passive, listening side of the connection.

Referring to FIG. 21, an object communication diagram illustrates a method for creating a device connection for the passive, listening side of a connection. A request to establish a device connection is received from another workstation or controller/multiplexer. The communications services establishes a UDP communications connection with the requesting device.

Previous to creation of the connection, a device to be connected to is operating and contains an object aRtDeviceConnection which is ready to establish a connection. The object RtDevice Connection exists in the device and is listening for input messages in the form of a sync request. After the connection is created, a connection is established between the two devices and an RtDeviceConnection instance is created in the passive device to handle the connection.

In step 1810, the object RtDeviceConnection receives a sync request message from a remote device and in step 1812, the object RtDeviceConnection sends a Create message to the object RtDeviceConnection to create a connection to the requesting device. Assuming that a device connection does not already exist, the object RtDeviceConnection performs a createDeviceConnection in step 1814. In step 1816, the object RtDeviceConnection creates an instance of RtDeviceConnection using the template RtNew. In step 1818, the object RtDeviceConnection registers the pointer to the RtDeviceConnection instance by sending a RegisterPointer message to the RtRegistry and returns the device connection object ID to the object RtDeviceConnection. In step 1820, the object RtDeviceConnection sends a Create the message to object RtDeviceProxy to create a device proxy for the requesting device. In step 1822, the object RtDeviceProxy creates an instance of RtDeviceProxy using the template RtNew. In step 1824, the object RtDeviceProxy sends a GetDeviceConnectionIndex message to the object RtDeviceConnection to have the index of the device in the device connection table managed by RtDeviceConnection for later use. In step 1826, the object RtDeviceProxy registers the pointer to the RtDeviceProxy instance by sending a RegisterPointer message to the RtRegistry and returns the device proxy object ID to RtDeviceConnection. In step 1828, the object RtDeviceConnection passes the sync request message to the aRtDeviceConnection instance for processing via the handleInboundMessage method and in step 1830, the object aRtDeviceConnection sends a sync response message back to the remote device to indicate successful completion of the Device Connection creation.

Figure 22:
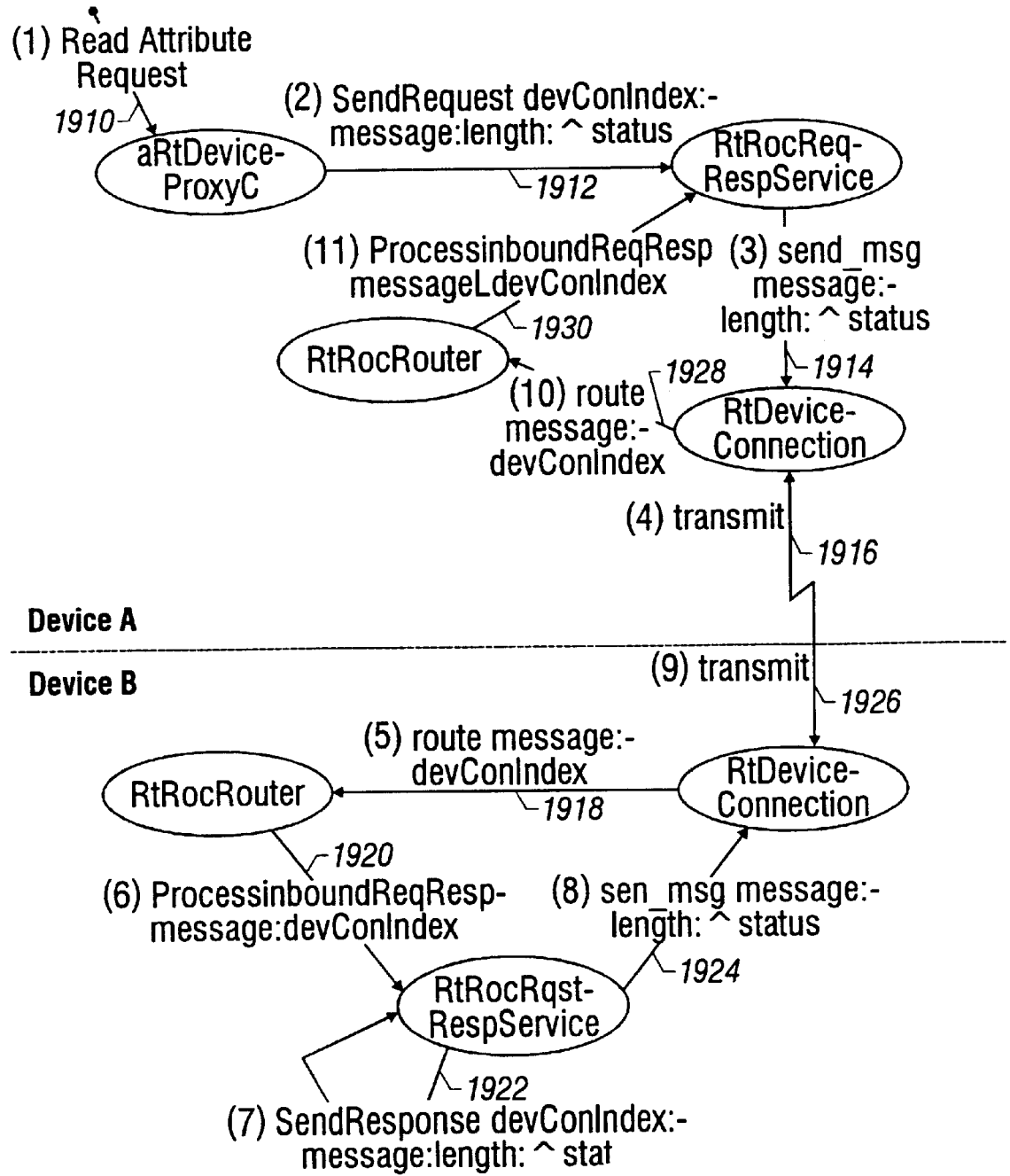
FIG. 22 is an object communication diagram illustrating a technique for sending request/response messages between devices.

Referring to FIG. 22, an object communication diagram illustrates a method for sending request/response messages between devices. The remote object communications (ROC) service in one device sends a request message to the ROC service in another device. The request message is processed and a response message is sent back to the originating device. Prior to sending messages, a UDP device connection is established between devices. Following the sending of request/response messages between devices, a response message from a remote device has been received and is ready for processing by ROC services.

In step 1910, a read attribute request is issued by an application program to an aRtDeviceProxy instance associated with a remote device. In step 1912, the aRtDeviceProxy instance builds a request message to be sent to the remote device to read the attribute value and asks the RtRocReqRespService to send the message using the SendRequest method. In step 1914, the object RtRocReqRespService sends the message to the instance of RtDeviceConnection associated with the connection to the remote device using the send_msg method. In step 1916, the instance of RtDeviceConnection then transmits the message to the remote device over the device connection. In step 1918, the instance of RtDeviceConnection in the remote device receives the message and requests the RtRocRouter class to route the message to the correct inbound message service. In step 1920, the object RtRocRouter determines that the message is a request/response message and requests object RtRocReqRespService to ProcessInboundReqResp. After the message is processed by the ROC services and the message consumer a response message is built, in step 1922 the object RtRocRqstRespService sends the response message to the originating device using the SendResponse method. In step 1924, the outbound message queue processing of RtRocReqRespService sends the response message to the instance of RtDeviceConnection associated with the connection to the source device using the send_msg method. In step 1926, the instance of RtDeviceConnection then transmits the response message back to the original device. In step 1928, the instance of RtDeviceConnection in the original device receives the message and requests the RtRocRouter class to route the message to the correct inbound message service. In step 1930, the object RtRocRouter determines that the message is a request/response message and requests RtRocReqRespService to ProcessInboundReqResp.

Figure 23:
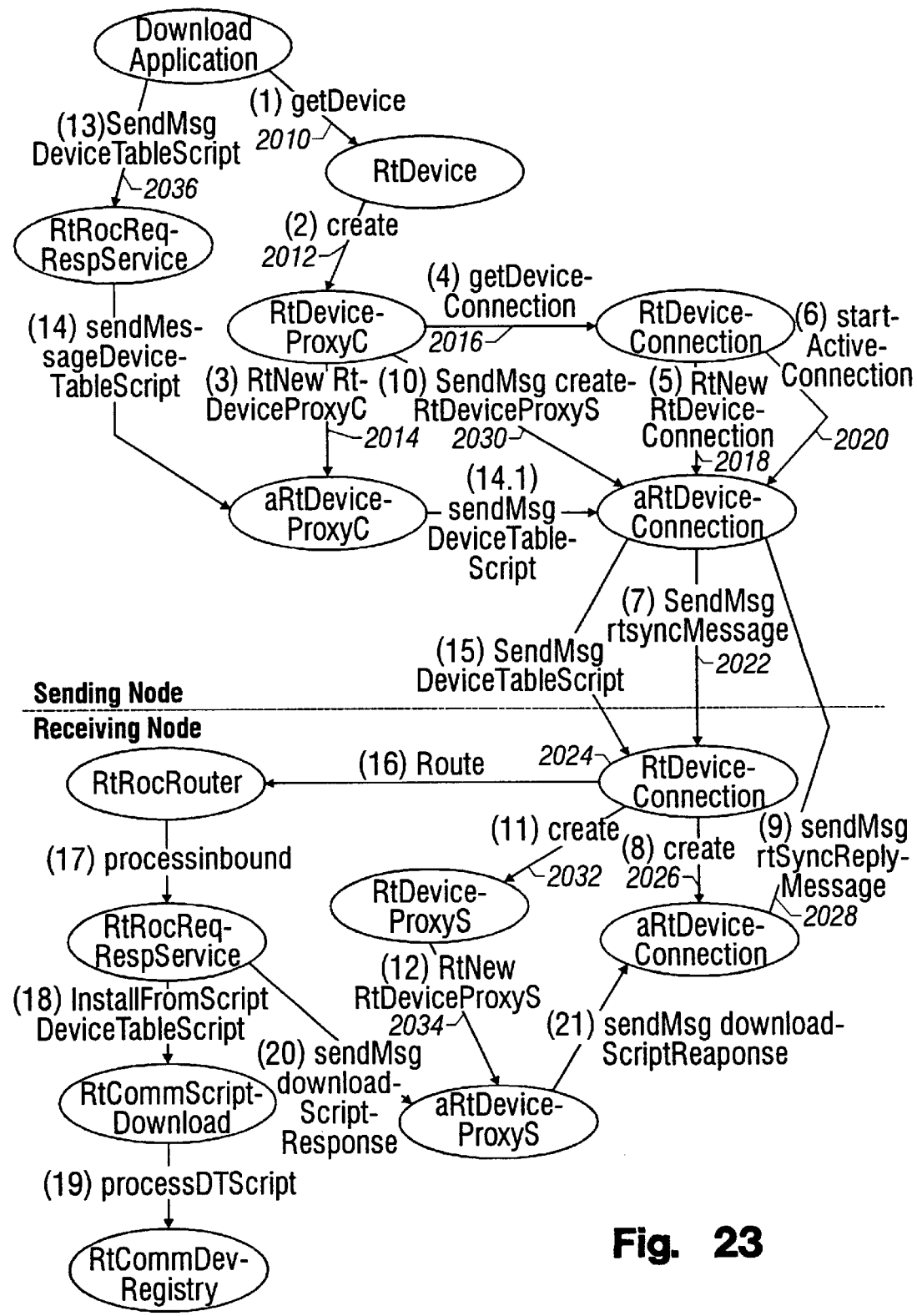
FIG. 23 is an object communication diagram illustrating a technique for downloading a network configuration.

Referring to FIG. 23, an object communication diagram illustrates a method downloading a network configuration. A user, following completion of the device configuration for a system, initiates a download to a controller/multiplexer. A device table configuration script is built by the configuration application. Using communications services, the configuration application establishes a device connection with the controller multiplexer to receive the download and sends a download script to the controller device. The controller/multiplexer receives the download script messages and processes the device table. In step 2010, a configuration download application program builds ROC script download messages containing the device table download script. In step 2012, the download application issues a GetDevice message to RtDevice to get the Object ID for the RtDeviceProxy of the remote device. In step 2014, the RtDeviceProxy does not yet exist and, as a result, a create message is sent to RtDeviceProxyC to create the necessary device proxy object. In step 2016, RtDeviceProxyC sends a GetDeviceConnIndex message to RtDeviceConnection to get the index of the device connection for the remote device in the device connection table. In step 2018, the device connection does not yet exist so aRtDeviceConnection object is created to manage the connection to the remote device. A lookup is performed in the database to find the remote device entry. The device communications data (for example, ID and IP Addresses) is retrieved from the database and a new entry is added to the configuration devices connection table. This connection is marked permanent in the connection table because the device initiated the connection. In step 2020, a startActiveConnection message is sent to the aRtDeviceConnection object to establish a connection to the remote device. In step 2022, the aRtDeviceConnection sends an RtSyncMessage to the remote device. In step 2024, the remote device receives the RtSyncMessage and attempts to find an entry in the device connection table for the sending device. In step 2026, no entry is found so a new entry is added to the device connection table for the sending device and aRtDeviceConnection object is created to handle the connection in the receiving device. In step 2028, a RtSyncReplyMessage is created and sent back to the sending device containing the device connection index from the device table. The device connection is now established and ready to send and receive messages. In step 2030, the RtDeviceProxyC sends a create RtDeviceProxyS message to the remote device. In step 2032, the RtDeviceProxyS is created in the remote device. In step 2034, the download application sends the download scripts to the remote device via RtRocReqRespServices using the SendMsg call. In step 2036, RtCommScriptDownload receives the Device Table script and processes each device table item and stores the data in a database Registry used to hold configuration data. For the controller/multiplexers this processing is used to create RtDeviceConnection objects and add the objects to the device connection table, allowing the memory to be acquired on download rather than subsequently.

Figure 24:
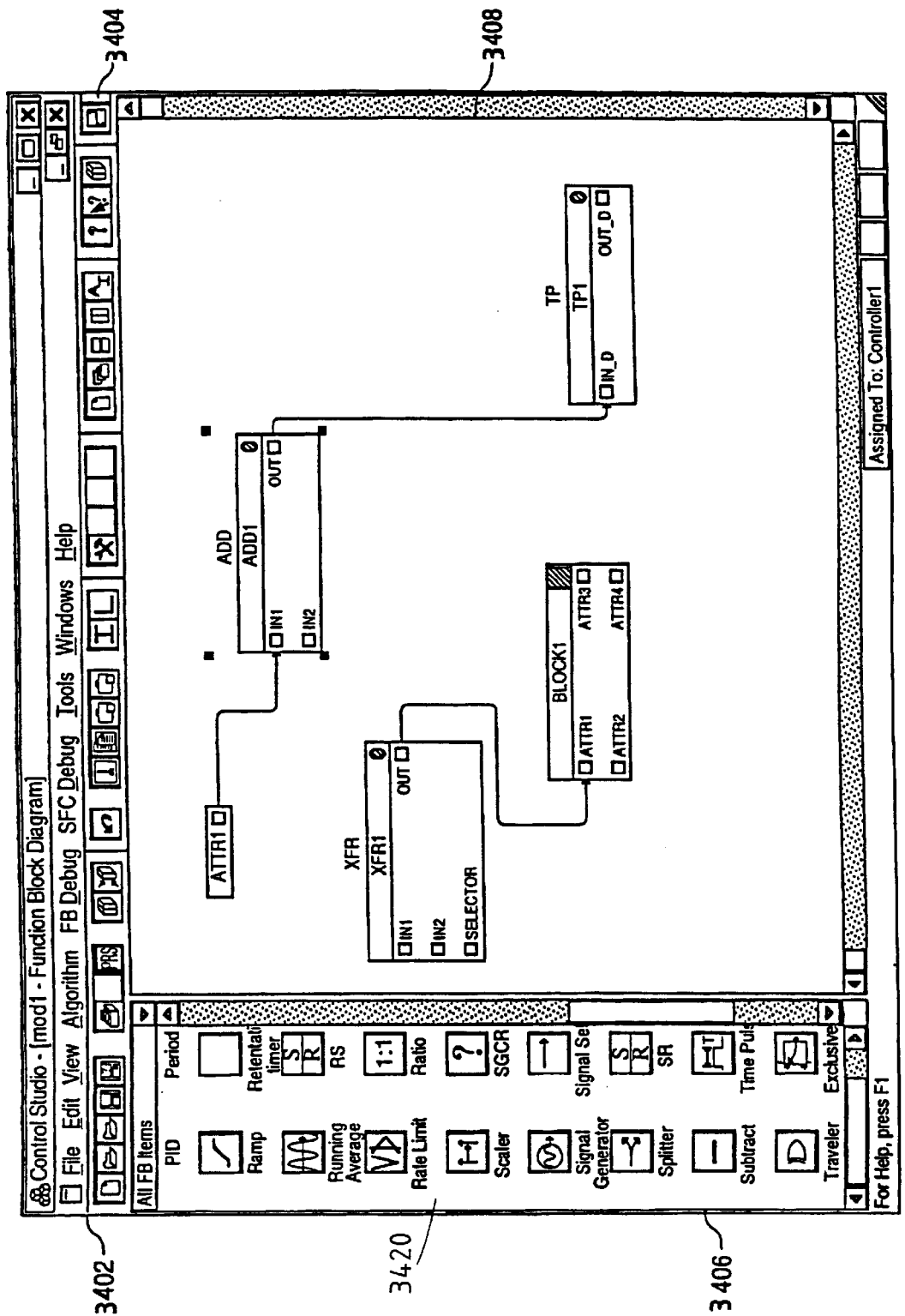
FIG. 24 is a screen presentation of a control studio object system.

The control studio object system 130 enables a user to add objects to diagrams, drag and drop objects between diagrams and third party applications, cut and paste objects between diagrams and other applications and install process control environments depicted by the diagrams having the objects to the process control environment. Referring to FIG. 24, the main control window of the control studio object system 130 includes textual pull down menus 3402, pictographic menu 3404, a stencil portion presentation 3406 and a diagram portion screen presentation 3408. Stencil items 3420 are displayed within the stencil portion presentation 3406. The user's diagram of the process control environment design is presented in the diagram portion screen presentation. This diagram of the process control design environment is referred to as the process control environment view. Each of the presentations in the main window is re-sizable and relocatable by the user in accordance with known windowing techniques. The control studio object system 130 tracks the location and size of the panes of the main window by maintaining persistent object data including coordinates within the two-dimensional display, as well as style and other information.

When designing a process control environment, a user simply actuates a stencil item from the stencil portion presentation 3406, drags the actuated stencil item to a desired location within the diagram portion screen presentation 3408 and drops the actuated stencil item in a desired location. Control studio object system 130 then creates a diagram item that allows the diagram to create an object with all of the information necessary for configuring a process control environment. Because the stencil items are objects which include all of the necessary information for the diagram to configure a process control environment, when the process control environment design is completed within the diagram portion, this design may be directly downloaded to the appropriate portions of the process control environment.

Figure 25A:
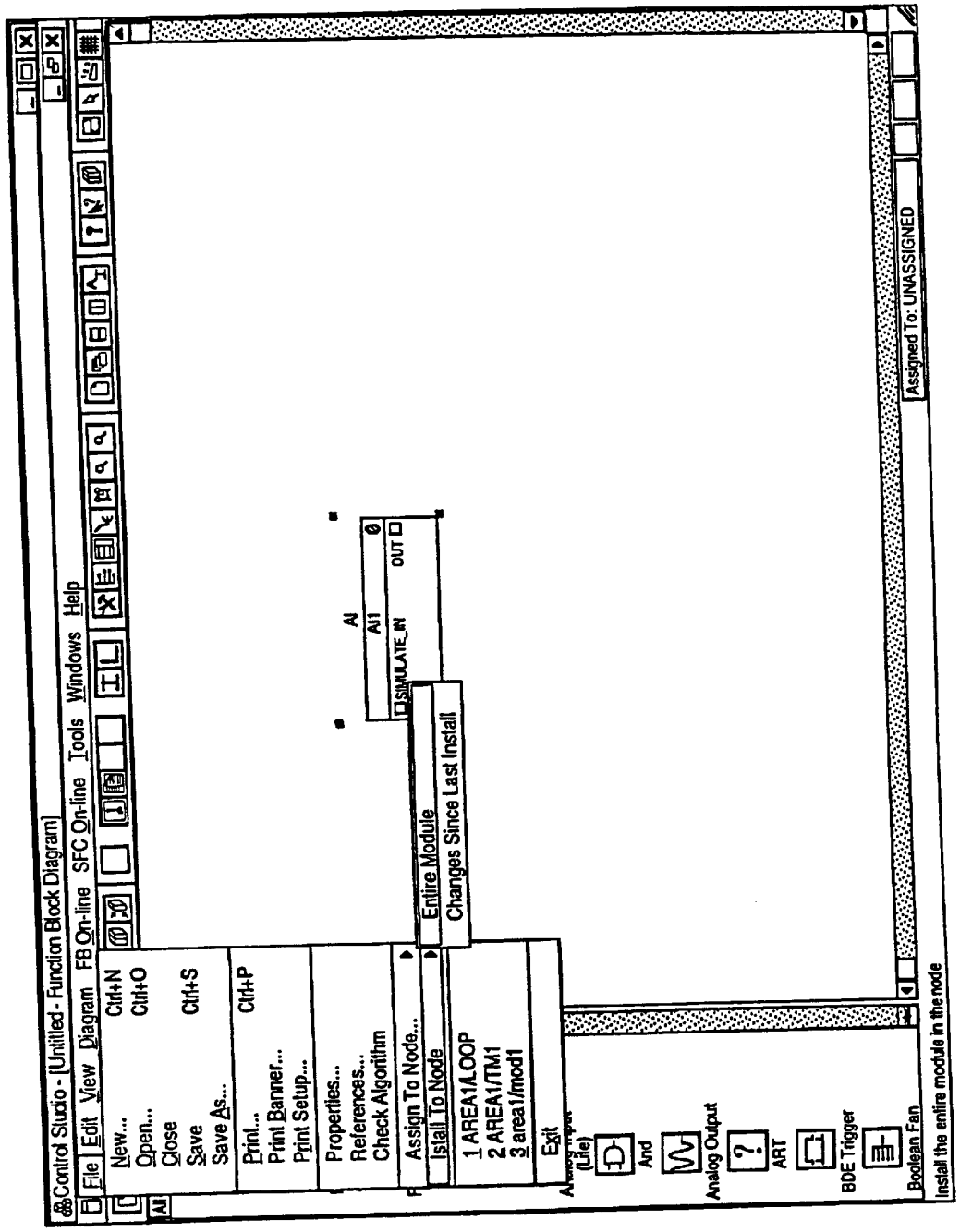
FIGS. 25A–25F are screen presentations representing the illustration of a completed process control diagram to a node of a process control environment.
Figure 25B:
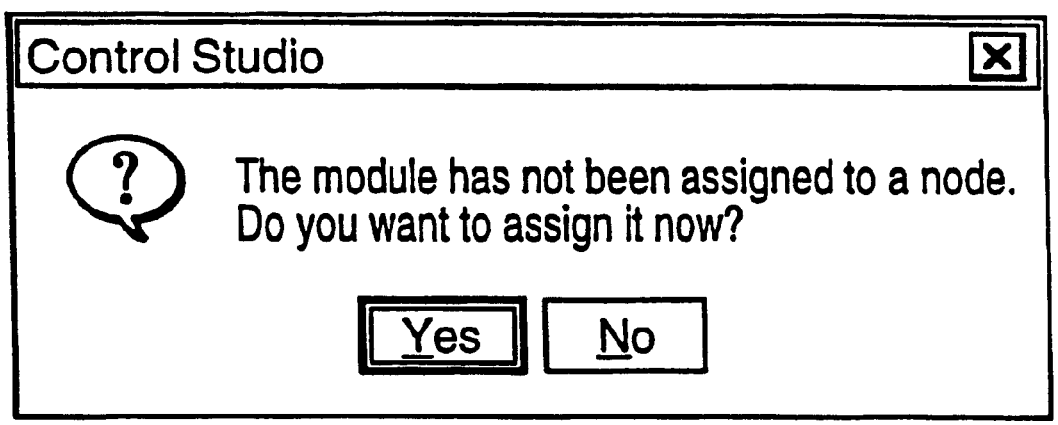
Figure 25C:
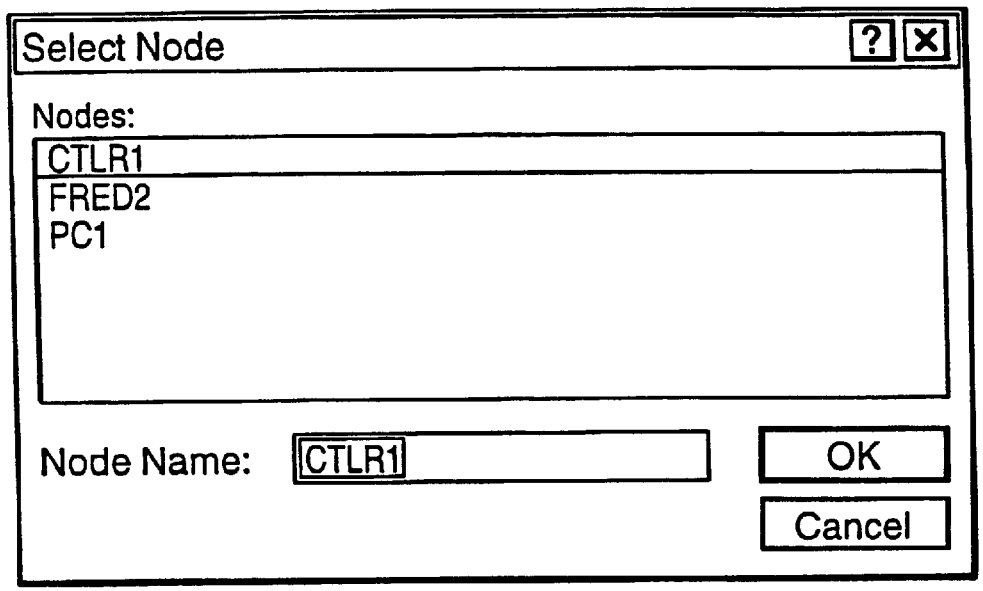
Figure 25D:
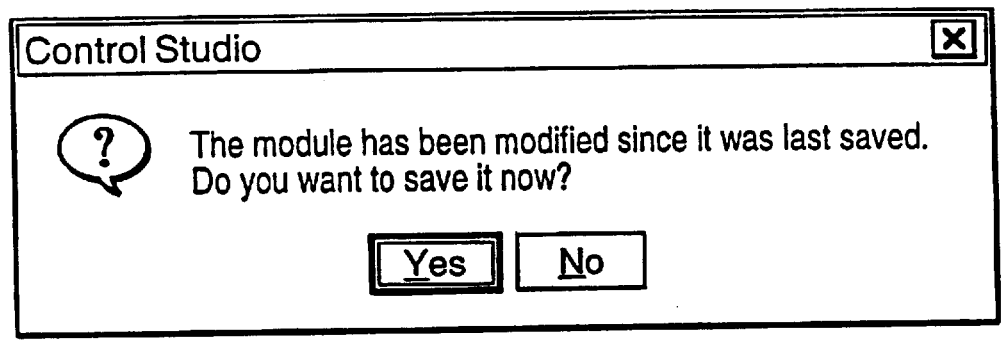
Figure 25E:
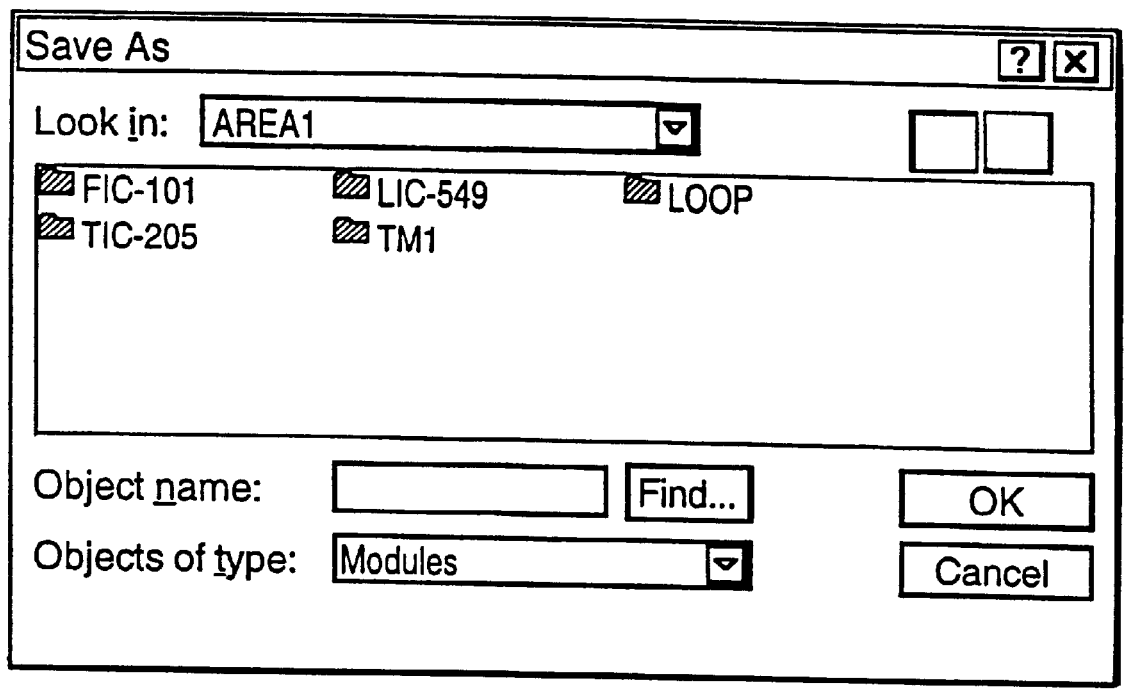
Figure 25F:
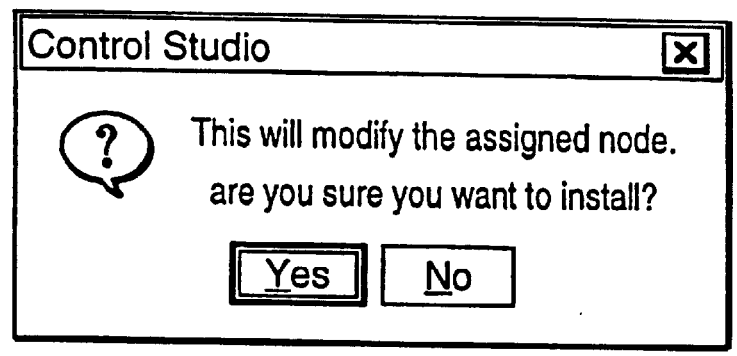

Referring to FIGS. 25A–25F, the process of installing a completed process control diagram to a node is shown. More specifically, as shown in FIG. 25A, when a user wishes to install a process control diagram to a node, the user selects the Install to Node item from the File menu as illustrated. The choices presented to the user are whether to install the entire module or just the changes since the last install operation was performed. When the user selects install Entire Module, a window is presented that informs the user that the module has not been assigned to a node and asks whether the user wishes to install the module to a node (see FIG. 25B). Next the user is presented with a list of nodes from which the user selects the appropriate node for configuring (see FIG. 25C). After the user selects the node for configuring, the user is presented with a window asking whether the user wishes to update the module (see FIG. 25D). The user is then requested to name the module (see FIG. 25E). After the user selects or generates a name, the user is asked whether the user is sure that the user wishes to perform the install procedure (see FIG. 25F). By answering yes, the control studio object system 130 automatically performs the install to the selected module.

Figure 26:
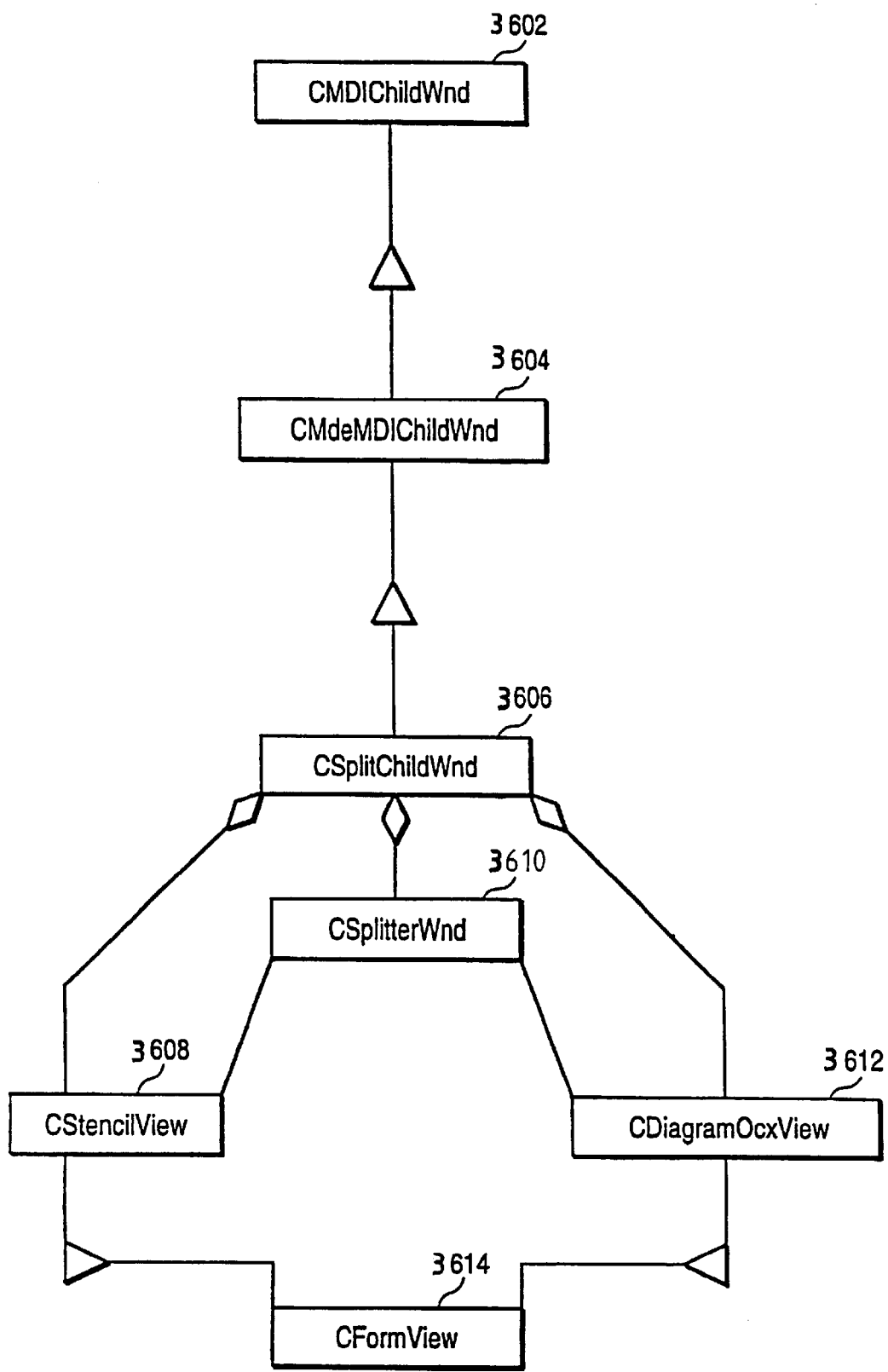
FIG. 26 is a block diagram illustrating the class hierarchy of control studio object system diagram view classes.

The control studio object system 130 may be implemented using the Foundation classes version 4.0 of the Microsoft developers kit for Visual C++ for Windows NT version 3.51. FIGS. 26–31 show the classes of control studio object system and how these classes descend from various Foundation classes. Referring to FIG. 26, control studio object system 130 (of FIG. 3) includes a plurality of classes which descend from and are related to the foundation class CMDIChildWnd 3602. Class CMdeMDIChildWnd 3604 descends from class CMDIChildWnd 3602. Class CSplitChildWnd 3606 descends from class CMDIChildWnd 3604. Classes CStencilView 3608, CSplitterWnd 3610 and CDiagramOcxView 3612 are aggregated with class CSplitChildWnd 3606. Classes CStencil View 3608 and CDiargramOCXView 3612 descend from foundation class CFormView 3614.

Class CMDIChildWnd 3602 is a frame window for a child window of a multiple document interface application. Class CMdeMDIChildWnd 3604 removes the title text from the screen presentation. Class CSplitChildWnd 3606 provides management of its children in a split window fashion as is known in the art. Class CStencilView 3608 maintains a CList stencil control and manages the stencil user interface of the stencil portion. Class CDiagramOcxView 3612 manages the diagram user interface of the diagram portion and contains an instance of a diagram old custom control (OCX). Class CSplitterWnd 3610 is a foundation class which controls splitting panes as is well known in the art. Class CFormView 3614 is a foundation class for containing control classes.

Figure 27:
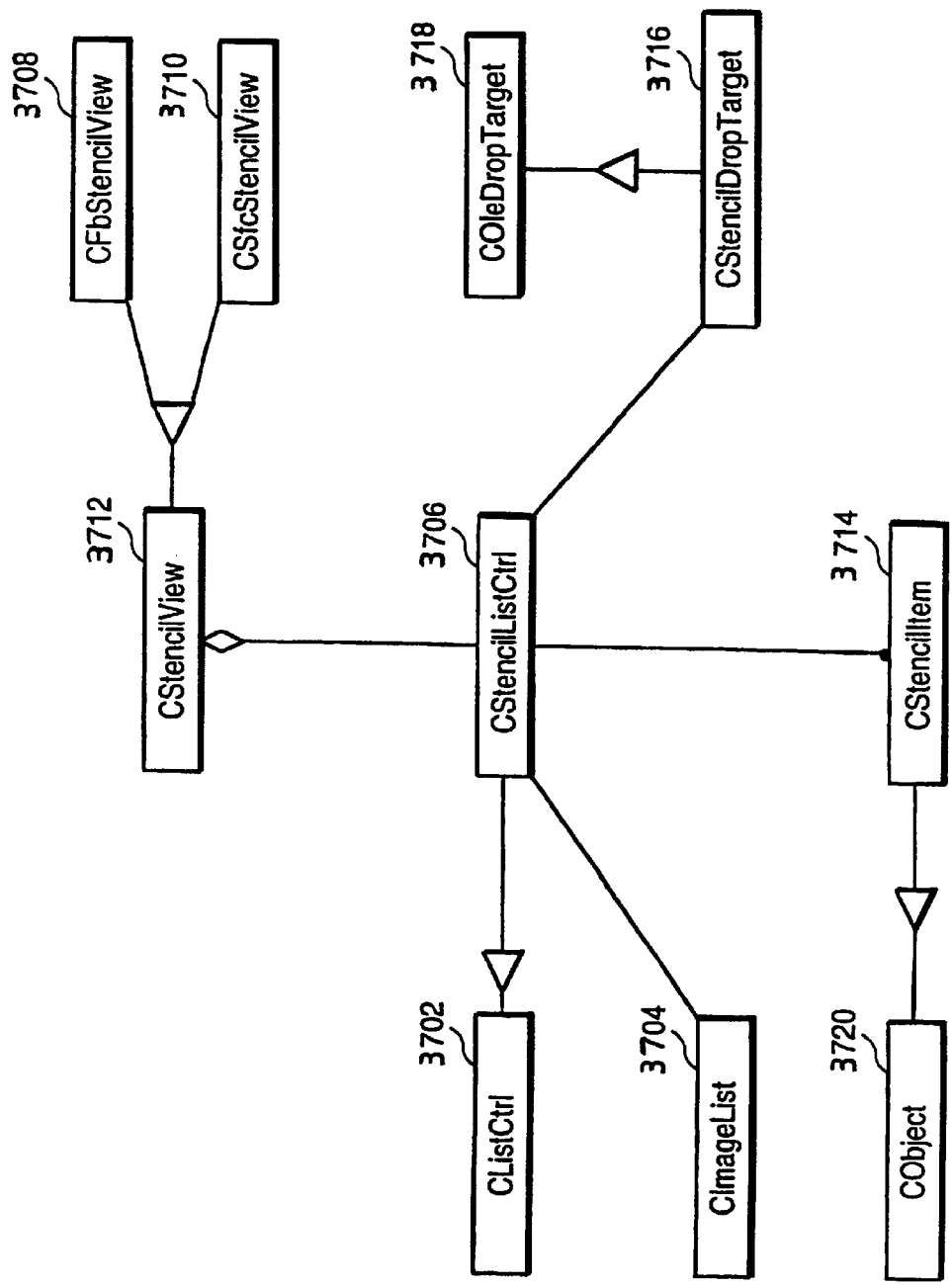
FIG. 27 is a block diagram illustrating the class hierarchy of control studio object system stencil classes.

Referring to FIG. 27, control studio object system 130 (of FIG. 3) includes a plurality of classes which descend from and are related to the foundation classes class CListCtrl 3702 and CImageList 3704. More specifically, class CStencilListCtrl 3706 descends from class CListCtrl 3702. Class CStencilView 3712 is aggregated with CStencilListCtrl 3706. Classes CFbStencilView 3708 and CSfcStencilView 3710 descend from class CStencilView 3712. Foundation class CImageList 3704, class CStencilItem 3714 and class CStencilDropTarget 3716 are associated with Class CStencilListCtrl 3706. Class CStencilDropTarget 3716 descends from class COleDropTarget 3718. Class CStencilItem 3714 descends from foundation class CObject 3720.

Class CListCtrl 3702 is a foundation class that encapsulates the functionality of a list view control. Class CImageLst 3704 is a foundation class that encapsulates the functionality of an image list. Class CStencilListCtrl 3706 manages stencil items, provides a view of the stencil items and provides the drag source capability. Class CFBStencil View 3708 controls the stencil or stencils used for creating function block diagrams. Class CSfcStencilView 3710 controls the stencil or stencils used for creating SFC diagrams. CStencilItem 3714 contains the drag/drop information for a single item in the stencil list control. CStencilDropTarget 3716 controls drag and drop notification messages for class CStencilListCtrl 3706. COleDropTarget 3718 is a foundation class which encapsulates the functionality of dropping in a drag/drop operation.

Figure 28A:
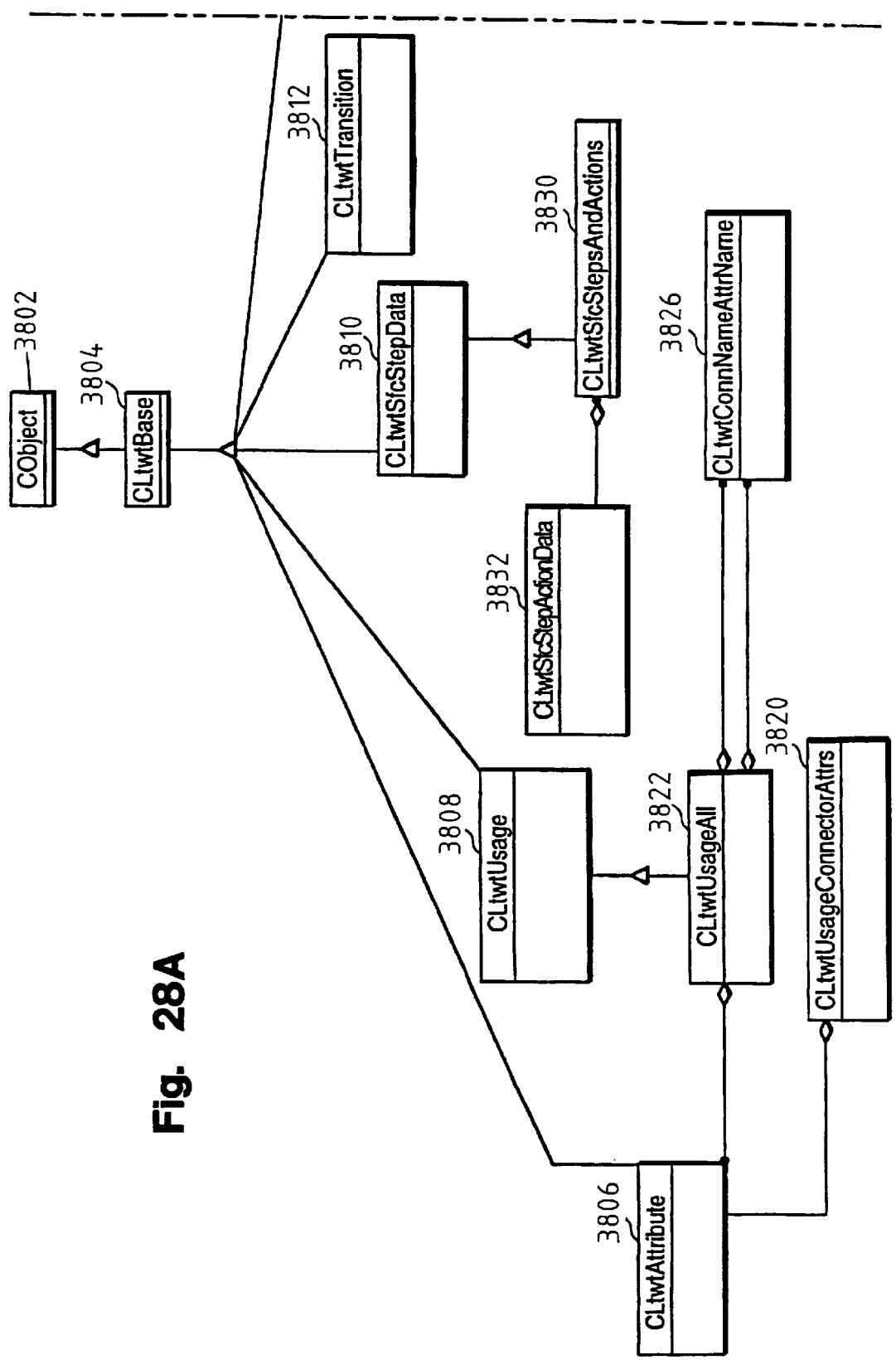

Referring to FIGS. 28A and 28B, control studio object system 130 (of FIG. 3) includes a plurality of classes which descend from the foundation class CObject 3802. More specifically, classes CItwtBase 3804 descends from class CObject 3802. Classes CItwtAttribute 3806, CItwtUsage 3808, CLtwtSfcStepData 3810, CLtwtSFCTransistionData 3812 and CLtwtGraphic 3814 descends from class CItwtBase 3804. Each of these classes represent different types of diagram items that may be used in a drag and drop operation. Class GLtwtUsageAll 3822 descend from class CLtwtUsage 3808. Classes CLtwtUsageConnectorAttrs 3820 and GLtwtUsageAll 3822 are also aggregated with class CLtwtAttribute 3806. Class CLtwtConnNameAttrName 3826 is aggregated with class CLtwtUsageAll 3822. Class CLtwtSfcStepsAndActions 3830 descends from class CLtwtSfcStepData 3810. Class CLtwtSfcStepActionData 3832 is aggregated with class CLtwtSfcStepsAnd Actions 3830. Classes CLtwtComment 3840 and CLtwtBox 3842 descend from class CLtwtGraphic 3814.

Class CLtwtAttribute 3806 stores data from the database or written into the database about attributes. Class CLtwtUsage 3808 is a light weight data holder for usage information which is used to transfer data between the database and applications; this class is primarily used by function block diagrams, but sequential function chart algorithms use this class in a limited manner. Class CLtwtUsageAll 3822 is a subclass of CLtwtUsage class 3808 and contains additional information, including a list of input and output CLtwtConnNameAttrName objects and a list of CLtwtAttributes objects; this class is used in drag and drop to set any attribute or connection overrides that a user may have made to a specific usage. Class CLtwtSfcStepData 3810 is a light weight data holder which represents a step in a sequential function chart algorithm. Class CLtwtGraphic 3814 implements behavior common to all graphic objects, such as boxes and comments. Class CLtwtSfcStepActionData 3832 is a representation of a single sequential function chart action. Class CLtwtStepsAll 3830 is a specific representation of a step that contains actions used for drag and drop. Class CLtwtBox 3842 is a subclass of CLtwtGraphic 3814 which represents a database object, which in turn represents a box or a rectangle on an algorithm. Class CLtwtComment 3840 is a subclass of CLtwtGraphic 3814 which represents a database object, which in turn represents text a user has entered on an algorithm. Class CLtwtBase 3804 is an abstract base class which provides a way to manage a representation of those database objects which can appear on a diagram. Class CLtwtSFCTransistionData 3812 is a representation of a transition object in an SFC algorithm. Class CLtwtConnNameAddrName 3826 is a representation of an attribute and the name of the connector associated with the attribute; only certain attributes have connectors associated with them.

Figure 29:
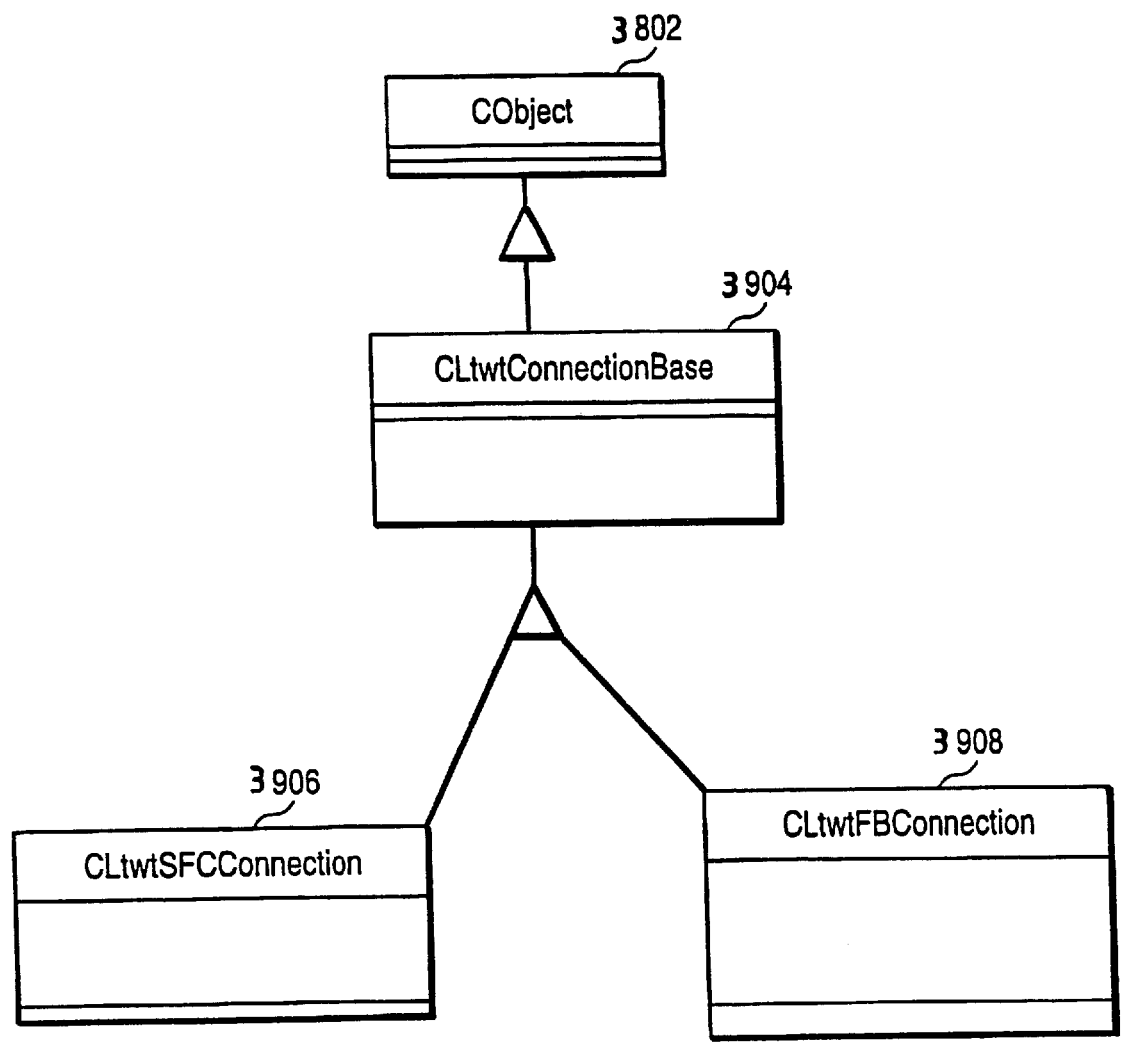
FIG. 29 is a block diagram illustrating the class hierarchy of control studio object system connection classes that descend from class CObject.

Referring to FIG. 29, control studio object system 130 (of FIG. 3) includes a plurality of classes which also descend from the foundation class CObject 3802 and which relate to connecting other items. More specifically, class CLtwtConnectionBase 3904 descends from class CObject 3802. Classes CLtwtSFCConnection 3906 and CLtwtFBCConnection 3908 descend from class CLtwtConnectionBase 3904.

Figure 30:
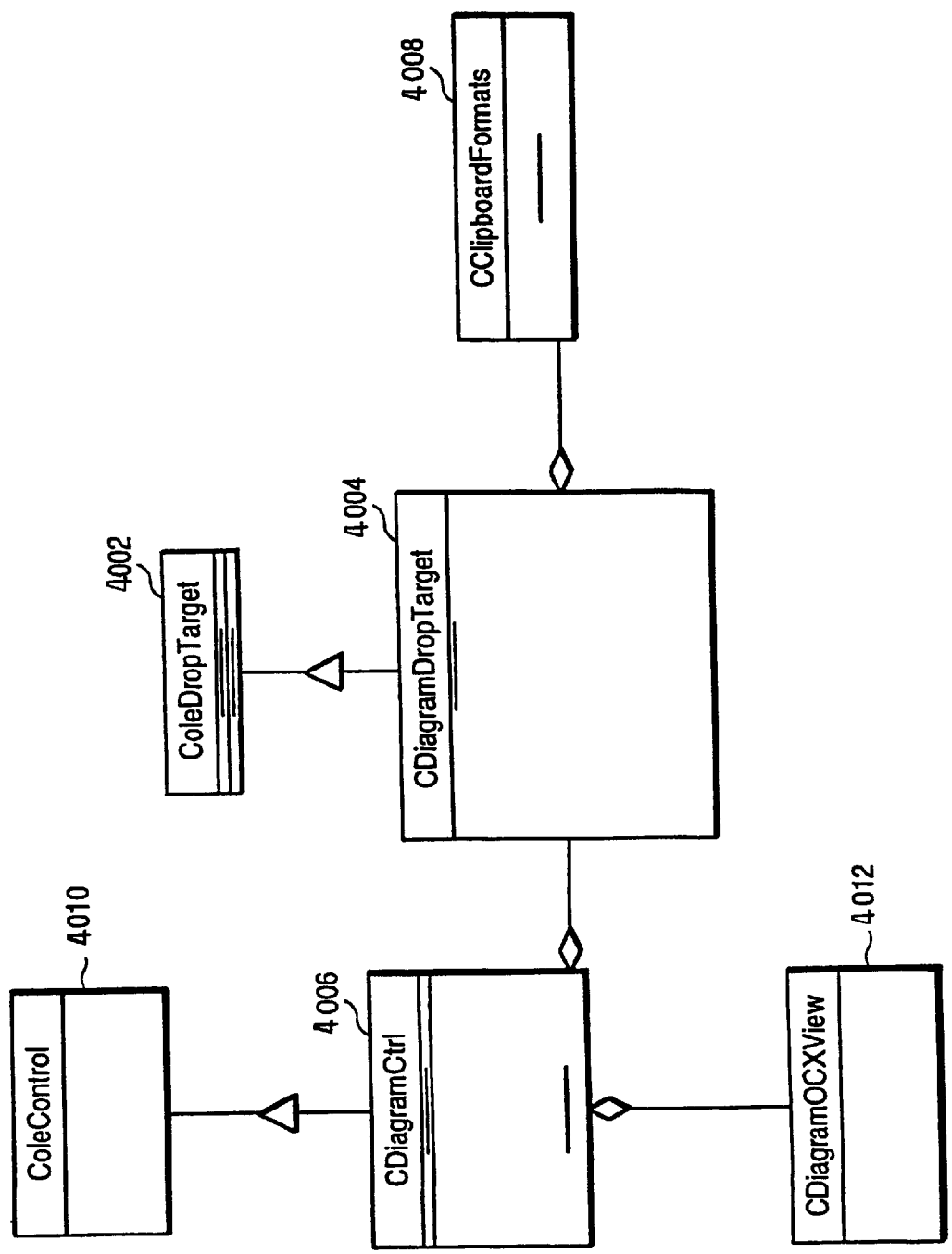
FIG. 30 is a block diagram illustrating the class hierarchy of a diagram portion of the control studio object system drag and drop classes.

Class CLtwtConnectionBase 3904 is a representation of a connection object. In the preferred embodiment, the two types of connection objects are function block or sequential function chart connections. CLtwtSFCConnection 3906 provides a representation of a connection on a sequence function chart algorithm in the database. Class CLtwtFBConnection 3908 provides a representation of a connection on a function block algorithm in the database. Referring to FIG. 30, control studio object system 130 (of FIG. 3) includes a class which descends from the foundation class COleDropTarget 4002. More specifically, class CDiagramDropTarget 4004 descends from foundation class COleDropTarget 4002. Classes CDiagramCtrl 4006 and CClipboardFormats 4008 are aggregated with class CDiagramDropTarget 4004. Class CDiagramCtrl 4006 descends from class COleControl 4010. CDiargramCtrl 4006 is aggregated with class CDiagramOcxView 4012. Class CDiagramCtrl 4006 provides a graphical representation and a means of manipulation of objects for the function block and sequential function chart algorithm; this class is an OLE control class. Class CDiagramDropTarget 4004 represents the target window of a diagram drag and drop operation; this class determines whether to accept any data dropped onto it and invokes the OnDrop method of the CDiagramCtrl object (which in turn fires the OnDrop event to the container which actually creates the dropped object in the database). Class CClipboardFormats 4008 holds an array of registered formats supported for a drop by OCX. Class COleControl 4010 is a foundation class for developing OLE controls. Class CDiagrmOcxView 4012 is discussed with respect to FIG. 26.

Figure 31:
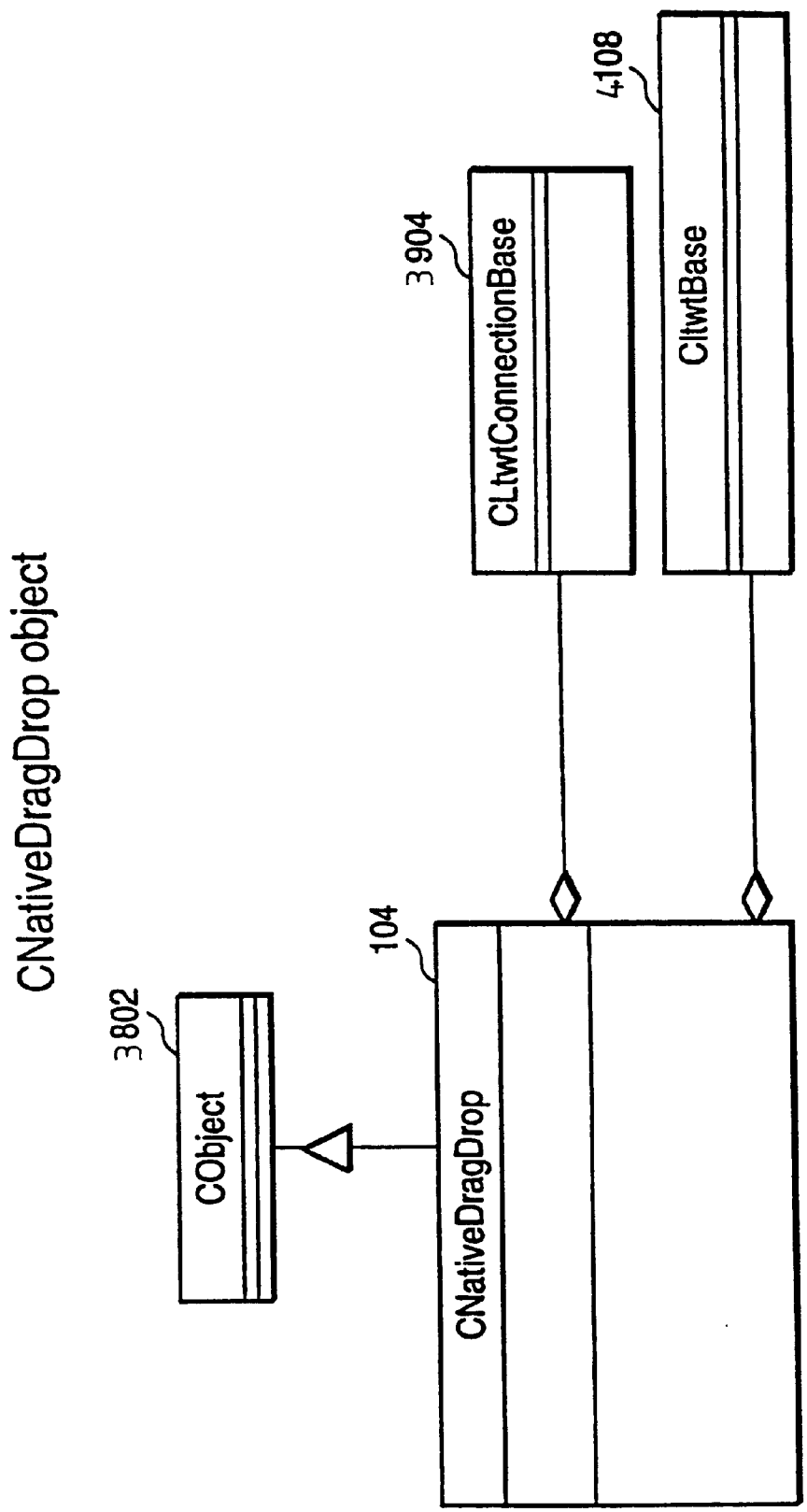
FIG. 31 is a block diagram illustrating the class hierarchy of control studio object system native drag and drop object classes.

Referring to FIG. 31, control studio object system 130 (of FIG. 3) also includes a class which descends from class CObject 3802 and which relates to the function of dragging and dropping items or cutting and pasting items that already exist in the diagram. Class CNativeDragDrop 4104 descends from class CObject 3802. Classes CLtwtConnectionBase 3904 and CItwtBase 4108 are aggregated with class CNativeDragDrop 4104.

Class CNativeDragDrop 4104 is a collection class that holds a list of CLtwtBase and CLtwtConnectionBase objects that currently exist on the diagram and that are to be dragged and dropped, or cut/copied and pasted; this object also stores a position offset which aids in setting the appropriate location during the paste/drop operation. A class CNativeDragDrop 4104 object provides methods to serialize itself to and from a shared file and to set and get data from the COleDataSource and COleDataObject objects. Class CLtwtBase 4108 is an abstract base class for objects that represent data objects in the database. Class CLtwtConnectionBase 3904 is discussed above with reference to FIG. 29.

The control studio object system 130 includes a plurality of modes of operation for adding objects to the diagram portion of object system 130. These modes of operation include adding an object to the diagram portion and adding an object to a stencil portion.

When adding a stencil object from the stencil portion to the diagram portion, the user positions a cursor (not shown) over a stencil object in the source stencil window, i.e., the stencil portion, and actuates a pointing device such as a mouse. The stencil object in the stencil window is highlighted to indicate selection. With the cursor over the selected stencil object, the user holds down the left mouse button and begins dragging the cursor by moving the mouse. The workstation responds by displaying a drag image of the stencil that moves with the cursor. The user next positions the cursor over the diagram portion. As the user continues to drag the cursor across the diagram window, the object system 130 causes the cursor to be updated to show that it is above a drop target by representing a cursor arrow with a rectangle coupled thereto. If the user moves the cursor outside the edge of the diagram portion window, the system represents the cursor with a circle with a diagonal line through it to indicate that it is not above a drop target. When the user has moved the cursor to the position at which the new object is to be added to the diagram, the user releases the left mouse button. In response, the system removes the displayed drag image, redisplays the cursor as normal, and creates and displays a corresponding diagram object in the diagram window. If instead of releasing the mouse button, the user presses the escape key on the keyboard, the system cancels the drag and drop. If the user releases the mouse button while still in the stencil portion window, the system responds by moving the selected stencil object to the new location in the stencil portion window, and resetting the cursor to normal. The classes used to implement this functionality are CStencilListCtrl, CImageList, CDiagramDropTarget, CStencilDropTarget, CStencilItem and CDiagramCtrl, CDiagramOcxView, CNativeDragDrop.

Figure 32A:
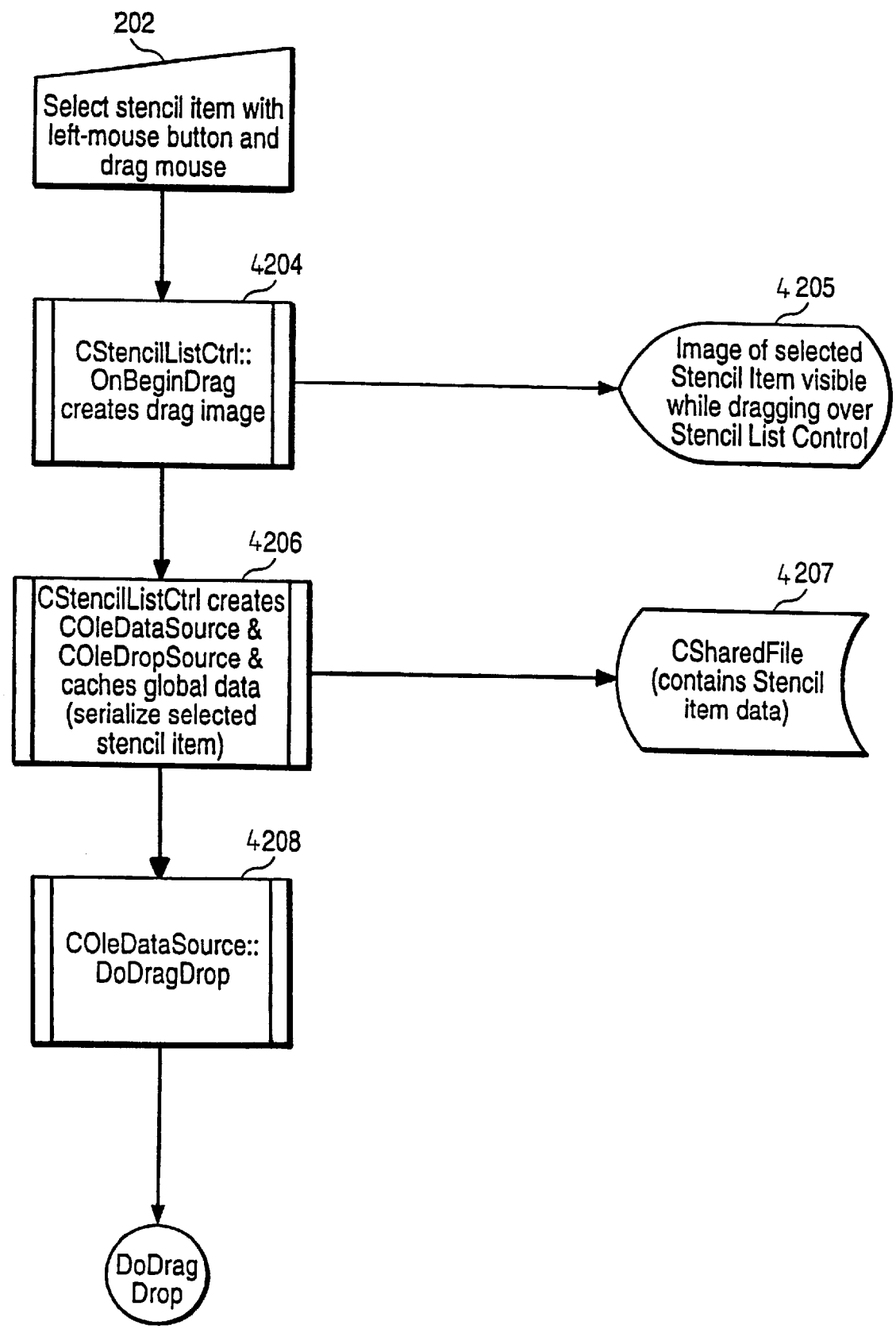
FIGS. 32A–32E are flow diagrams illustrating a stencil drag and drop operation of a control studio object system.

Referring to FIG. 32A, the operation of control studio object system 130 during a stencil drag/drop operation is illustrated. A drag/drop operation starts at step 4202 when the user selects a stencil object with the left mouse button and begins to drag the stencil object. Control then transitions to processing step 4204 during which the OnBeginDrag method of class CStencilListCtrl 3706 is invoked. Method OnBeginDrag creates a drag image of the stencil object 4205. On completion of step 4204, control transitions to processing step 4206 during which the method CStencilListCtrl creates COleDataSource and COleDropSource objects. Step 4206 then caches the data from the selected stencil object into a CSharedFile 4207. From step 4206, control transitions to step 4208 during which the DoDragDrop method of the ColeDataSource object is invoked. Control then transitions to decision step 4210.

Figure 32B:
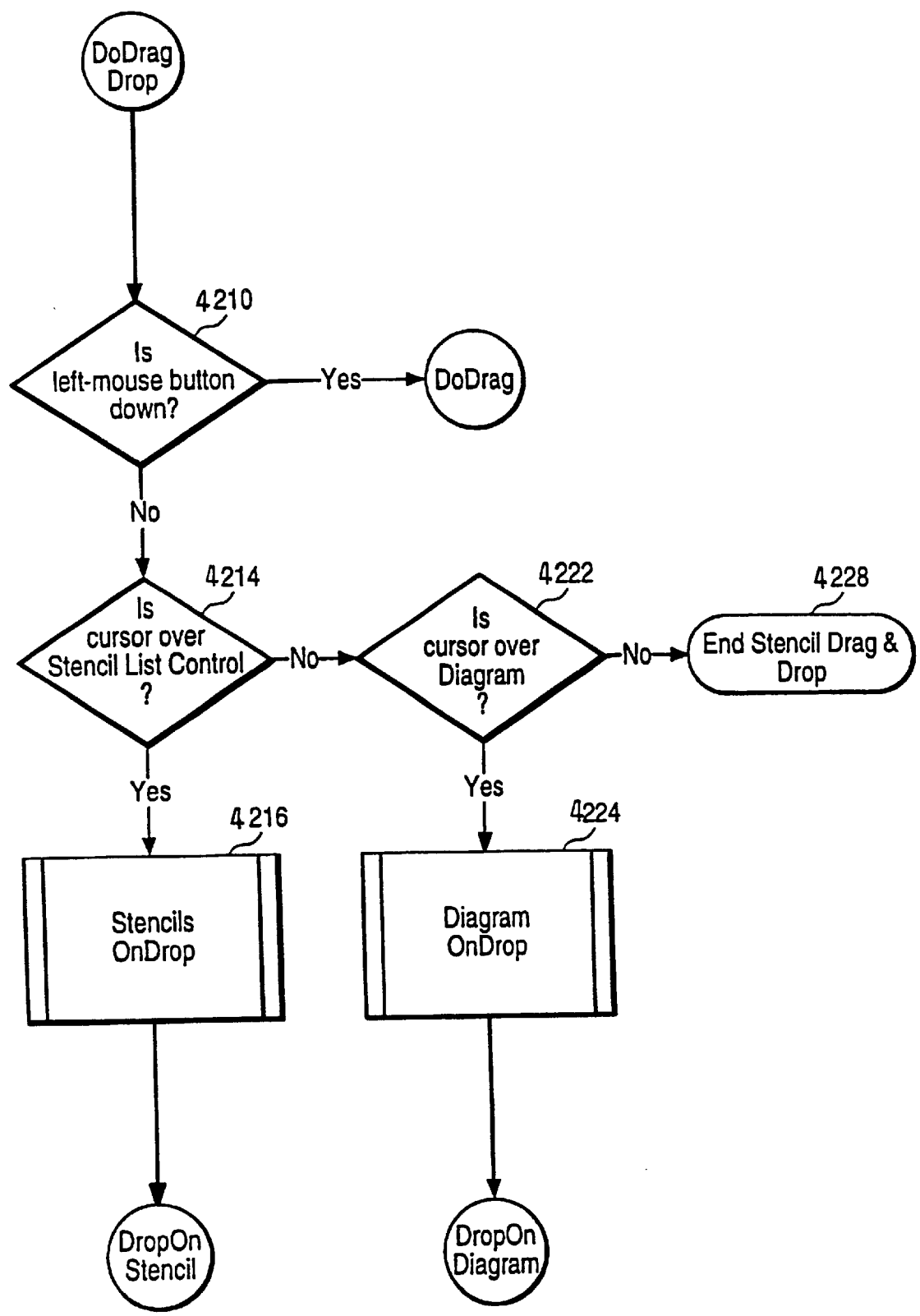

Referring to FIG. 32B, during decision step 4210, control studio object system 130 determines whether the left mouse button is still actuated by the user. If the mouse button is actuated, the control transitions to decision step 4212 (see FIG. 32C). If the mouse button is not actuated, then control studio object system 130 transitions to decision step 4214. During decision step 4214, control studio object system 130 determines whether the cursor is positioned over the stencil portion, which functions as a Stencil List Control. If the cursor is positioned over the stencil portion, then control transitions to processing step 4216 during which the Stencils OnDrop event is activated. After the Stencils OnDrop event is activated, control transitions to decision step 4220 (see FIG. 32E).

If the cursor is not positioned over Stencil List Control, then control transitions to decision step 4222. During decision step 4222, control studio object system 130 determines whether the cursor is over a diagram portion. If the cursor is over a diagram portion, the control transitions to processing step 4224 and the Diagram OnDrop event is activated. After the Diagram OnDrop event is activated, control transitions to step 4226 (see FIG. 32D). If the cursor is not over a diagram at decision step 4222, then control transitions to termination step 4228 and the drag and drop operation is ended.

Figure 32C:
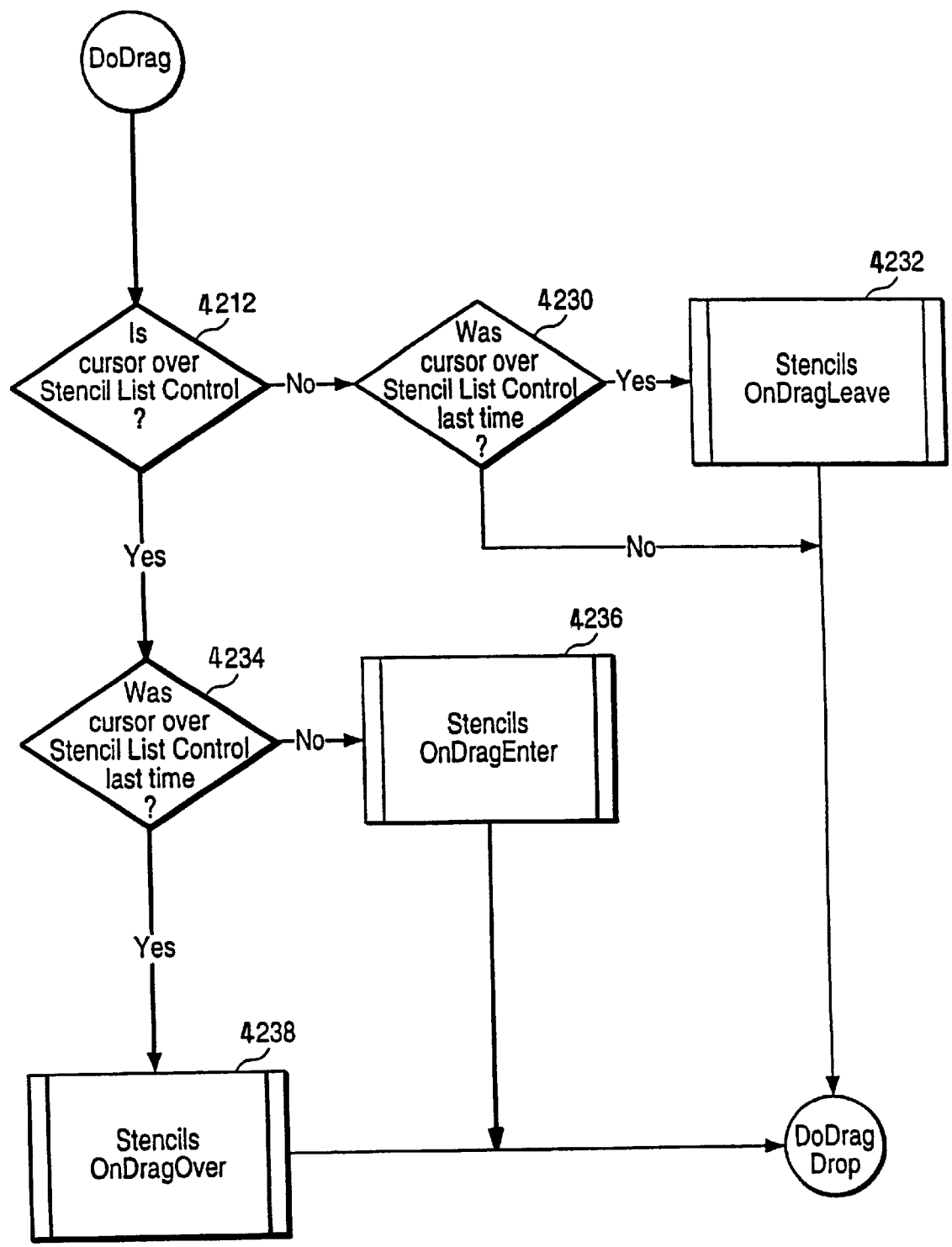

Referring to FIG. 32C, during decision step 4212, control studio object system 130 determines whether the cursor is positioned over the Stencil List Control. If the cursor it is not positioned over the Stencil List Control, then control transitions to decision step 4230. During decision step 4230, control studio object system 130 determines whether the cursor was positioned over the Stencil List Control the last time the cursor position was checked. If the cursor was not positioned over Stencil Control List, then control transitions to decision step 4210 (see FIG. 32D). If the cursor was positioned over Stencil Control List the last time that the cursor position was checked then control transitions to step 4232. During step 4232, control studio object system 130 activates the OnDragLeave event to indicate that the cursor has left the stencil list control view. After the OnDragLeave event is activated, control transitions to decision step 4210.

If during decision step 4212, the cursor is positioned over Stencil List Control, control transitions to decision step 4234. During decision step 4234, control studio object system 130 determines whether the cursor was positioned over Stencil Control List the last time that object system 130 checked cursor position. If the cursor was not over Stencil Control List the last time that the cursor position was checked, then control transitions to processing step 4236. During processing step 4236, the OnDragEnter stencil event is activated; OnDragEnter indicates to the system that the cursor has entered the stencil list control window. If the cursor was positioned over Stencil Control List the last time that the cursor position was checked, then control transitions to processing step 4238. During processing step 4238, object system 130 activates the OnDragOver event; OnDragOver is used by object system 130 to determine the drop effect. Control transitions to decision step 4210 from both processing step 4236 and processing step 4238 after their respective events are activated.

Figure 32D:
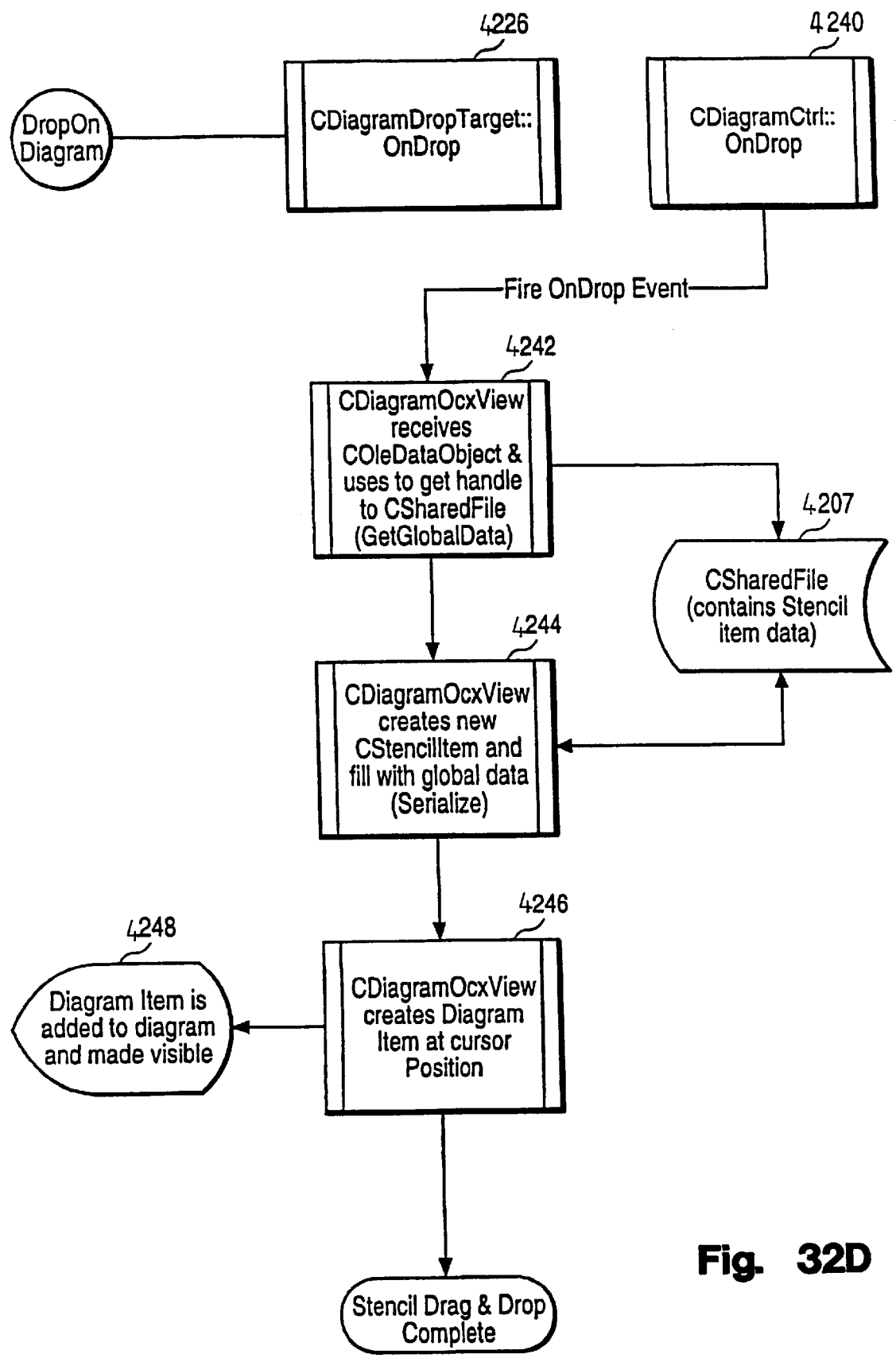

Referring to FIG. 32D, during processing step 4226, the OnDrop event for CDiagramDropTarget 4104 is activated. After the OnDrop event is activated, control transitions to processing step 4240, during which step the OnDrop event for CDiagramCtrl is activated. Upon activation of the OnDrop event, control transitions to processing step 4242. During processing step 4242, the method CDiagramOcxView is invoked with COleDataObject as a parameter. Control studio object system 130 then obtains a handle to CSharedFile 4207 and transitions to processing step 4244. During processing step 4244, the method CdiagramOcxView creates a new CStencilItem object and fills it with the data from CSharedFile 4207. On completion of step 4244, control transitions to processing step 4246. During processing step 4246, CDiagramOcxView creates a diagram item 4248 located at the cursor position. After the diagram item is created, the drag and drop operation of the stencil object is complete.

Figure 32E:
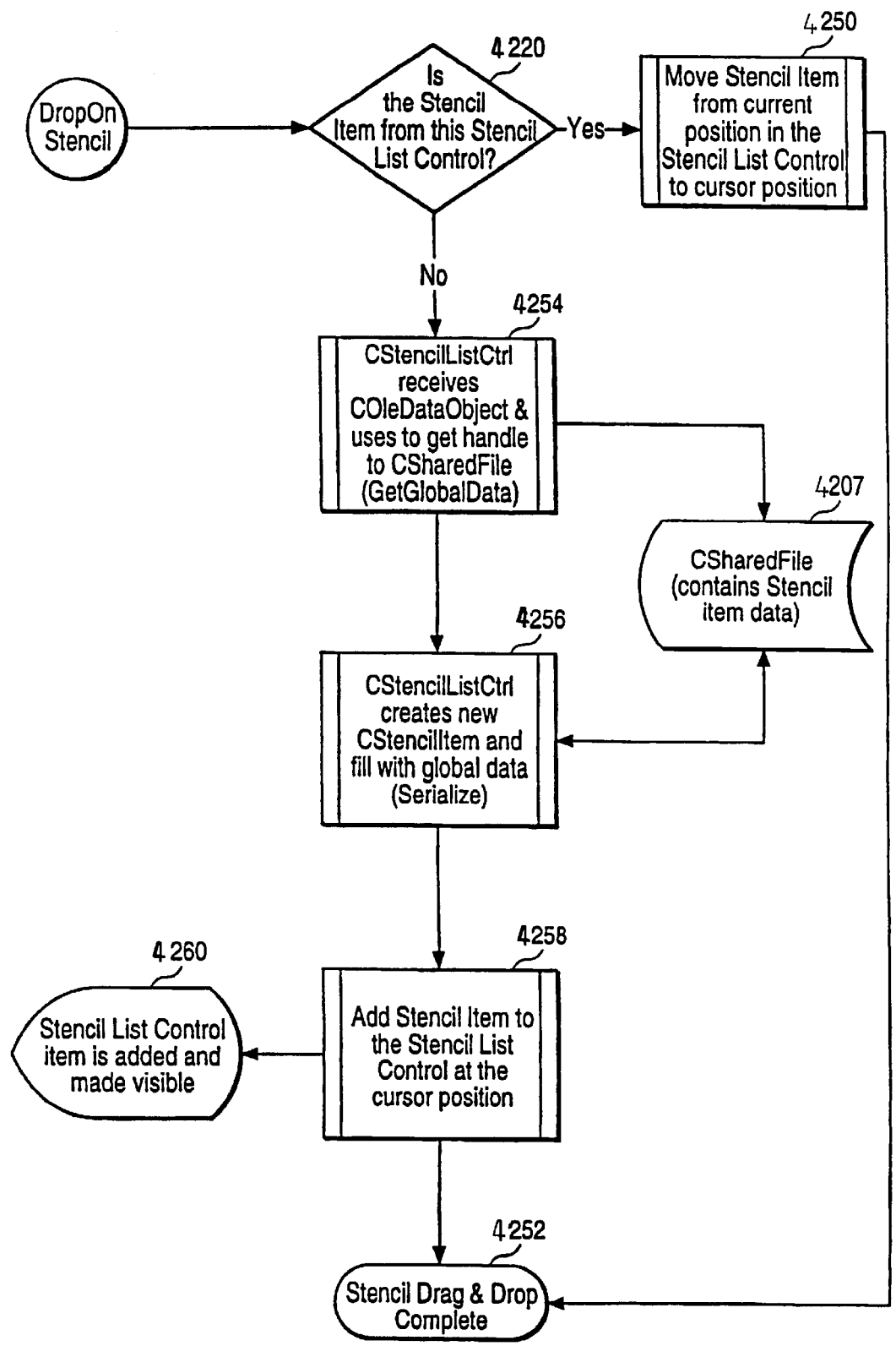

Referring to FIG. 32E, during decision step 4220, control studio object system 130 determines whether the Stencil object is from this Stencil List Control which indicates whether the stencil item originated from the CStencilListCtrl over which the cursor is position. If the stencil object is from this Stencil List Control, then control transitions to processing step 4250. During processing step 4250, object system 130 moves the stencil object from its current position in the Stencil List Control to the cursor position. After the move of the stencil object is complete, control transitions to completion step 4252 and the drag and drop operation is complete. If the stencil object is not from this Stencil List Control, then control transitions to processing step 4254. During processing step 4254, the method CStencilListCtrl is invoked with the COleDataObject, which is used to obtain a handle to CSharedFile 4207. After the handle is obtained, control transitions to processing step 4256. During processing step 4256, the method CStencilListCtrl creates a new CStencilItem object and fills the object with the stencil object data form CSharedFile 4207. Control then transitions to processing step 4258. During processing step 4258, the stencil object is added to the Stencil List Control 4260 at the cursor position. Control then transitions to completion step 4252.

Figure 33A:
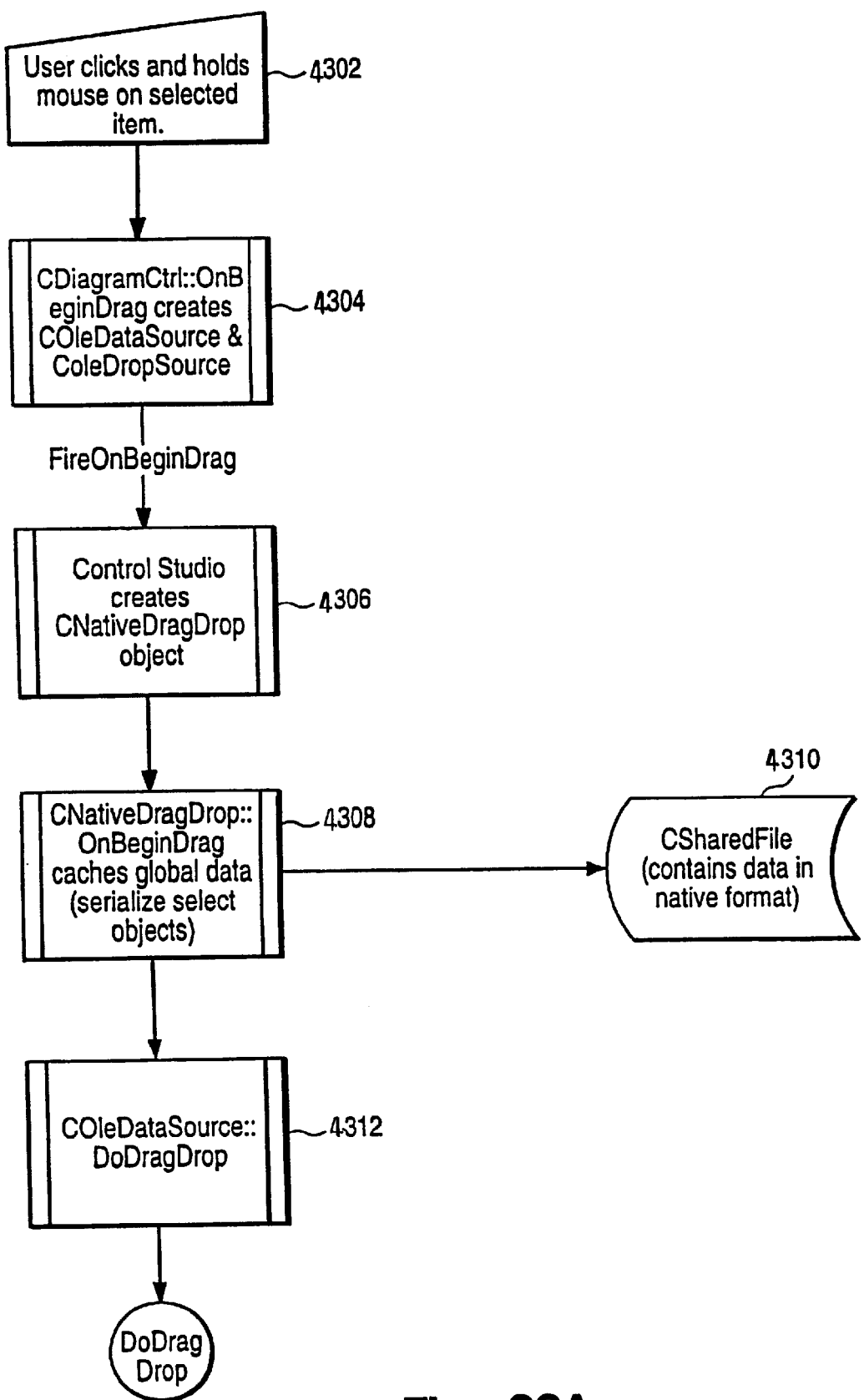
FIGS. 33A–33D are flow diagrams illustrating a native drag and drop to a diagram portion of a control studio object system.

Referring now to FIG. 33A, the operation of dragging and dropping one or more selected items within or between diagrams is shown. More specifically, a dragging and dropping operation is initiated at step 4302 by the user actuating and holding the mouse on a selected item. Control then transitions to processing step 4304. During processing step 4304, the OnBeginDrag.event of the CDiagramCtrl class is activated. Activation of this event creates COleDataSource and COleDropSource objects and activates the OnBeginDrag event. Upon activation of the OnBeginDrag event, control transitions to processing step 4306. During processing step 4306, control studio object system 130 creates a CNativeDragDrop object and invokes the OnBeginDrag method of the CNativeDragDrop object. Control then transitions to processing step 4308. During processing step 4308, the invoked OnBeginDrag method saves the data of all the selected objects into the shared memory file CSharedFile 4310. Control then transitions to processing step 4312, during which the CDiagramCtrl event invokes the DoDragDrop method of the COleDataSource object. Control then transitions to decision step 4320 (see FIG. 33B).

Figure 33B:
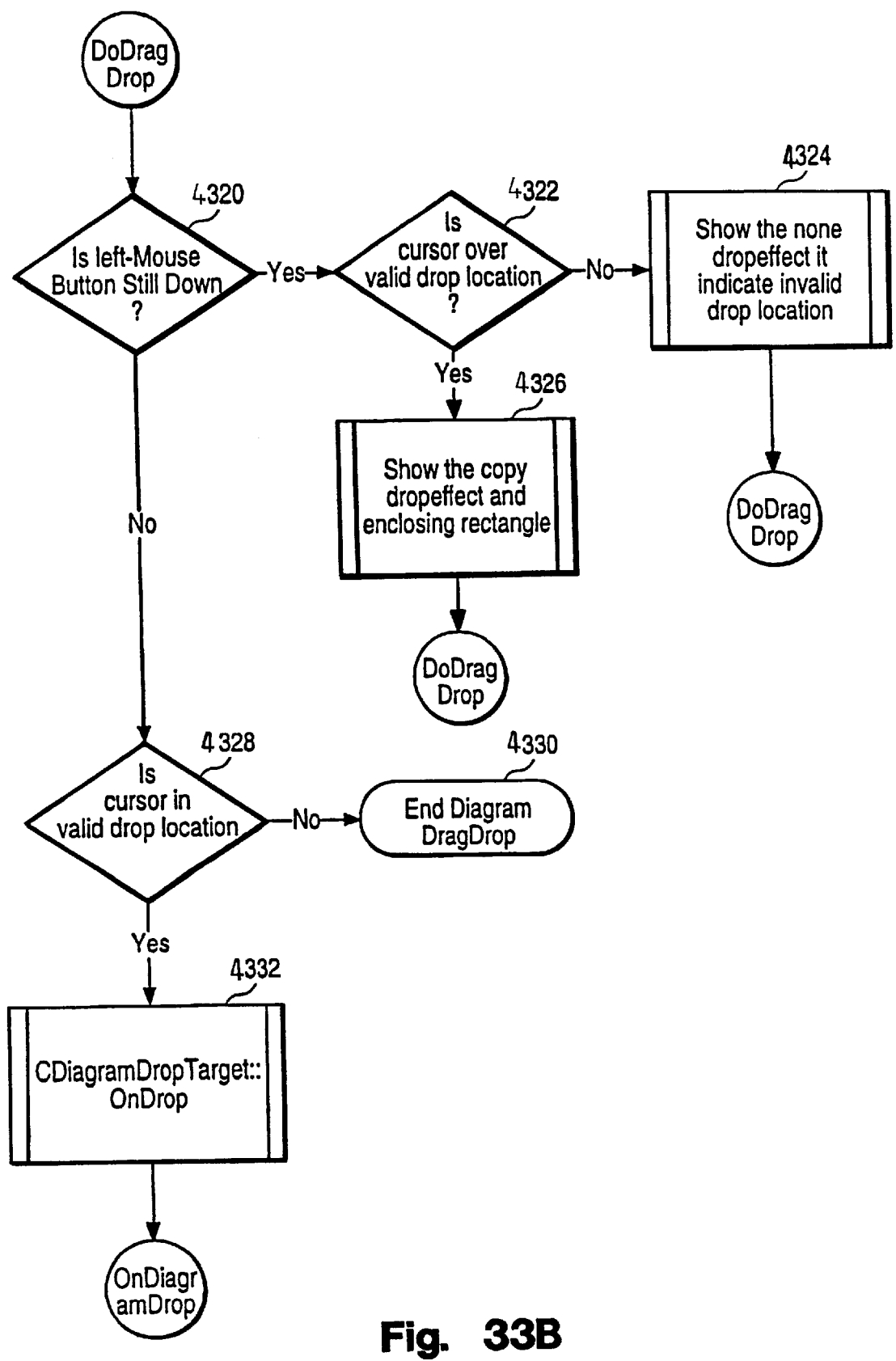

Referring to FIG. 33B, during decision step 4320, control studio object system 130 determines whether the mouse button is still actuated. If the mouse button is still actuated, then control transitions to decision step 4322. During decision step 4322, object system 130 determines whether the cursor is positioned over a valid drop location. If the cursor is not positioned over a valid drop location, then control transfers to processing step 4324. During processing step 4324, CDiagramCtrl 4006 updates the cursor to show that a drag and drop operation is occurring and also displays an enclosing outlined rectangle. Control then transitions back to decision step 4320.

If during decision step 4322, object system 130 determines that the cursor is positioned over a valid drop location, then control transitions to processing step 4326. During processing step 4326, object system 130 updates the cursor to indicate that it is not over a valid drop location. Control then transitions back to decision step 4320.

If during decision step 4320, class CDiagramCtrl 1006 determines that the mouse button has been released, control transitions to decision step 4328. During decision step 4328, object system 130 determines whether the cursor is positioned over a valid drop location. If the cursor is not positioned over a valid drop location, then control transitions to termination symbol 4330 and the drag and drop operation is terminated. If the cursor is positioned over a valid drop location, then control transitions to processing step 4332. During processing step 4332, the OnDrop method of CDiagramDropTarget is invoked. The CDiagramDropTarget OnDrop method calls the CDiagramCtrl OnDrop method at step 4342 which fires the OnDrop event (see FIG. 33C).

Figure 33C:
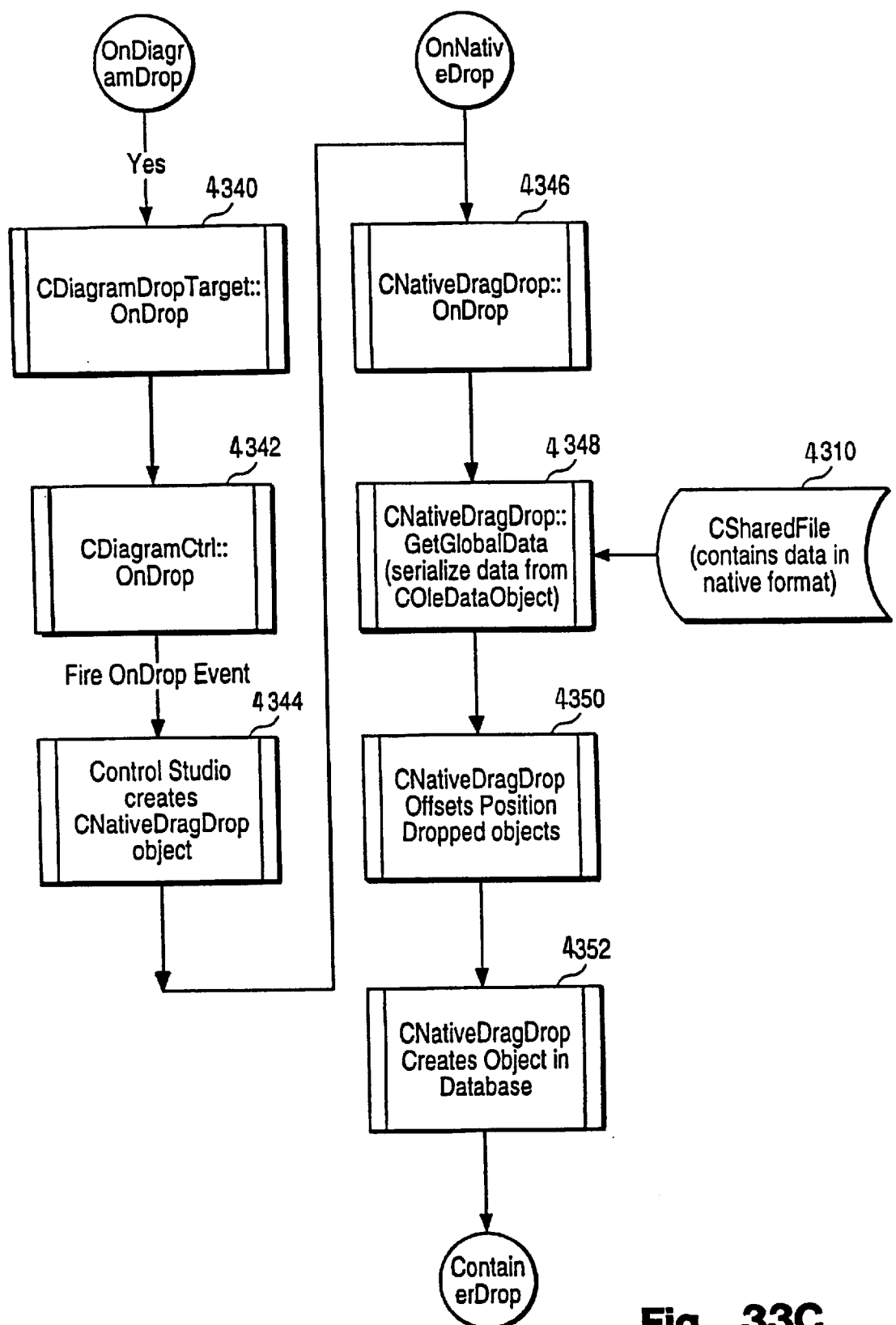

Referring to FIG. 33C, during processing step 4340, object system 130 invokes the OnDrop method of the CDiagramCtrl class. After the OnDrop method is invoked, control transitions to processing step 4342. During processing step 4342, object system 130 fires the OnDrop event.

After the OnDrop event is activated, control transitions to processing step 4344. During processing step 4344, object system 130 creates a CNativeDragDrop object and transitions to processing step 4346. During processing step 4346, object system 130 invokes the OnDrop method of the CNativeDragDrop object. Control then transitions to processing step 4348. During processing step 4348, the OnDrop method reads the data previously serialized to a shared file 4310. Control then transitions to processing step 4350. During processing step 4350, the method CNativeDragDrop offsets the positions of the dropped objects. Control then transitions to processing step 4352. During processing step 4352, object system 130 creates the new object in the database. Control then transitions to decision step 4360 (see FIG. 33D).

Figure 33D:
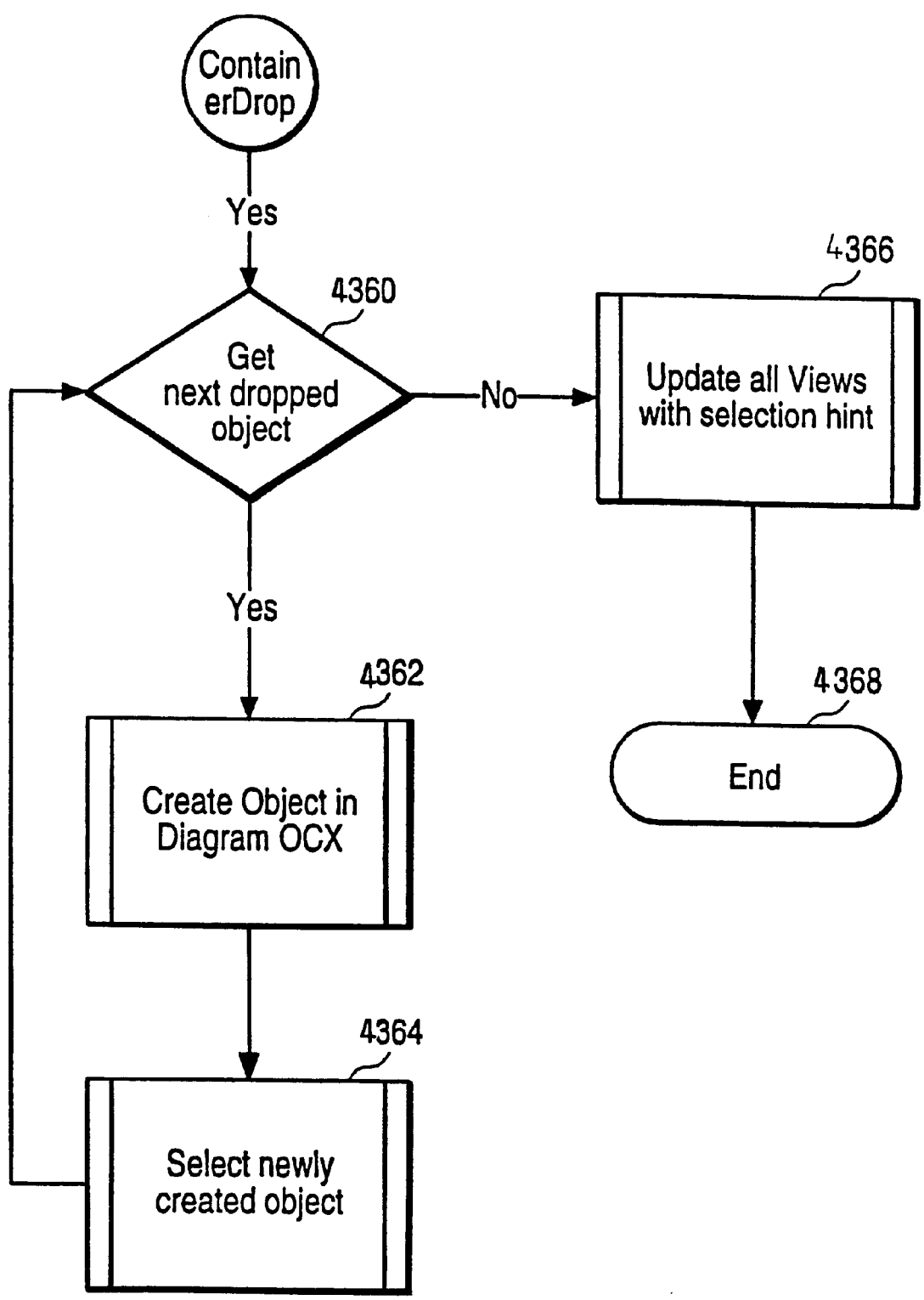

Referring to FIG. 33D, during decision step 4360, the object system determines whether there is another dropped object. If there is another dropped object, then control transitions to processing step 4362. During processing step 4362, object system 130 creates the dropped object in the diagram portion. Control then transitions to processing step 4364. During processing step 4364, object system 130 selects the newly created diagram object and transitions to decision step 4360 to determine whether there is another dropped object. If there are no more dropped objects, then control transitions to processing step 4366. During processing step 4366, object system 130 updates all visible windows to reflect the changes made in the diagram. Control then transitions to termination symbol 4368 and the drag and drop operation is completed.

Referring now to FIGS. 34A–34D, the operation of the cut, copy and paste of one or more objects from the diagram is shown. More specifically, during a cut operation, a user selects the cut command as shown at step 4402. After the cut command is selected, control transitions to decision step 4404. During decision step 4404, object system 130 determines whether all selected types are supported by the cut operation. If all of the selected types are not supported by the cut operation then control transitions to processing step 4406. During processing step 4406, object system 130 warns the user and asks whether the user wishes to continue. Control then transitions to decision step 4408. During decision step 4408, object system 130 determines whether the user wishes to continue. If the user chooses not to continue, then control transitions to termination step 1409 and the cut operation is abandoned. If the user chooses to continue, or if all of the selected object types were supported by the cut operation as determined by decision step 4404, then control transitions to processing step 4410 (see FIG. 34B).

Figure 34A:
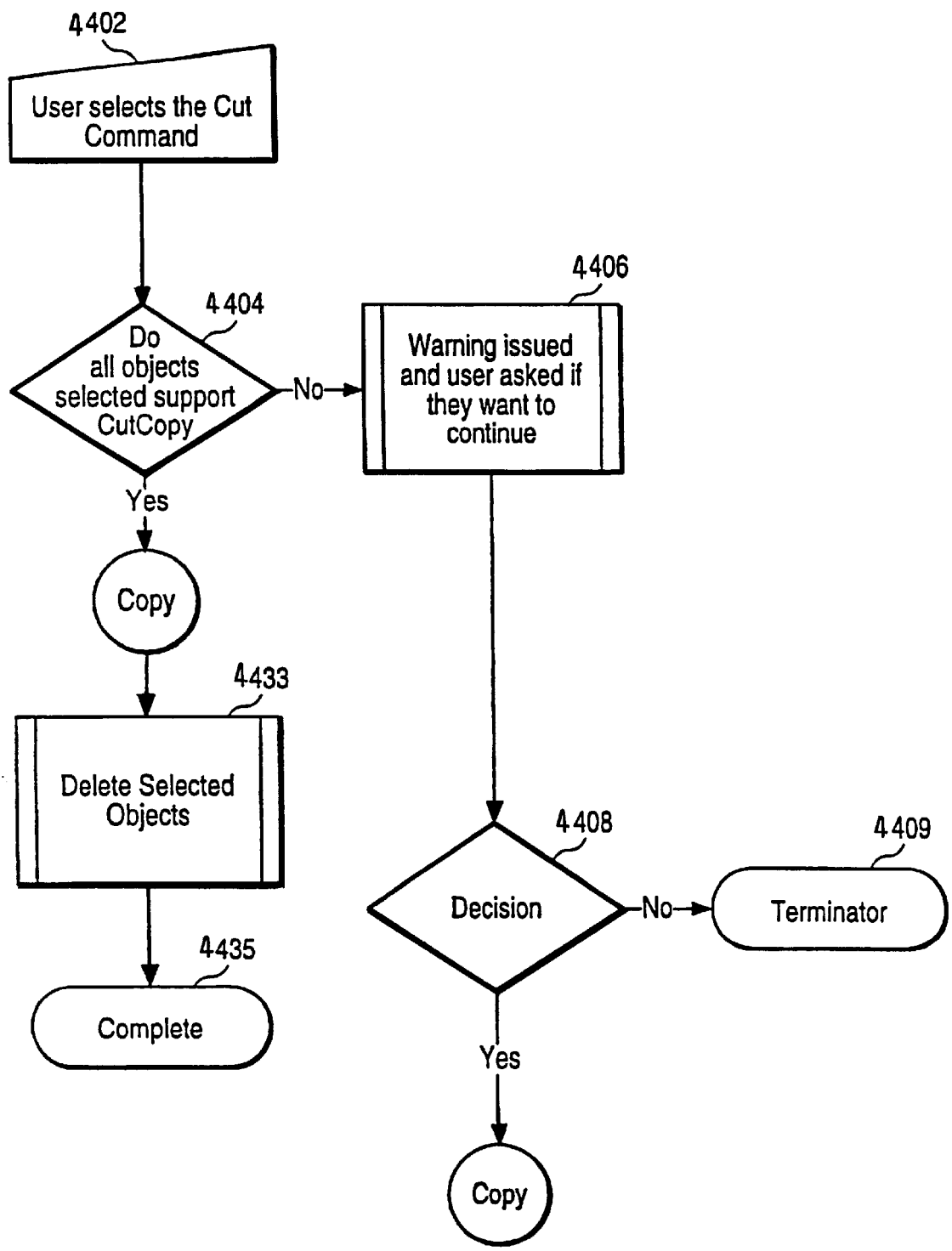
FIGS. 34A–34D are flow diagrams illustrating native cut, copy and paste operations in a diagram portion of a control studio object system.
Figure 34B:
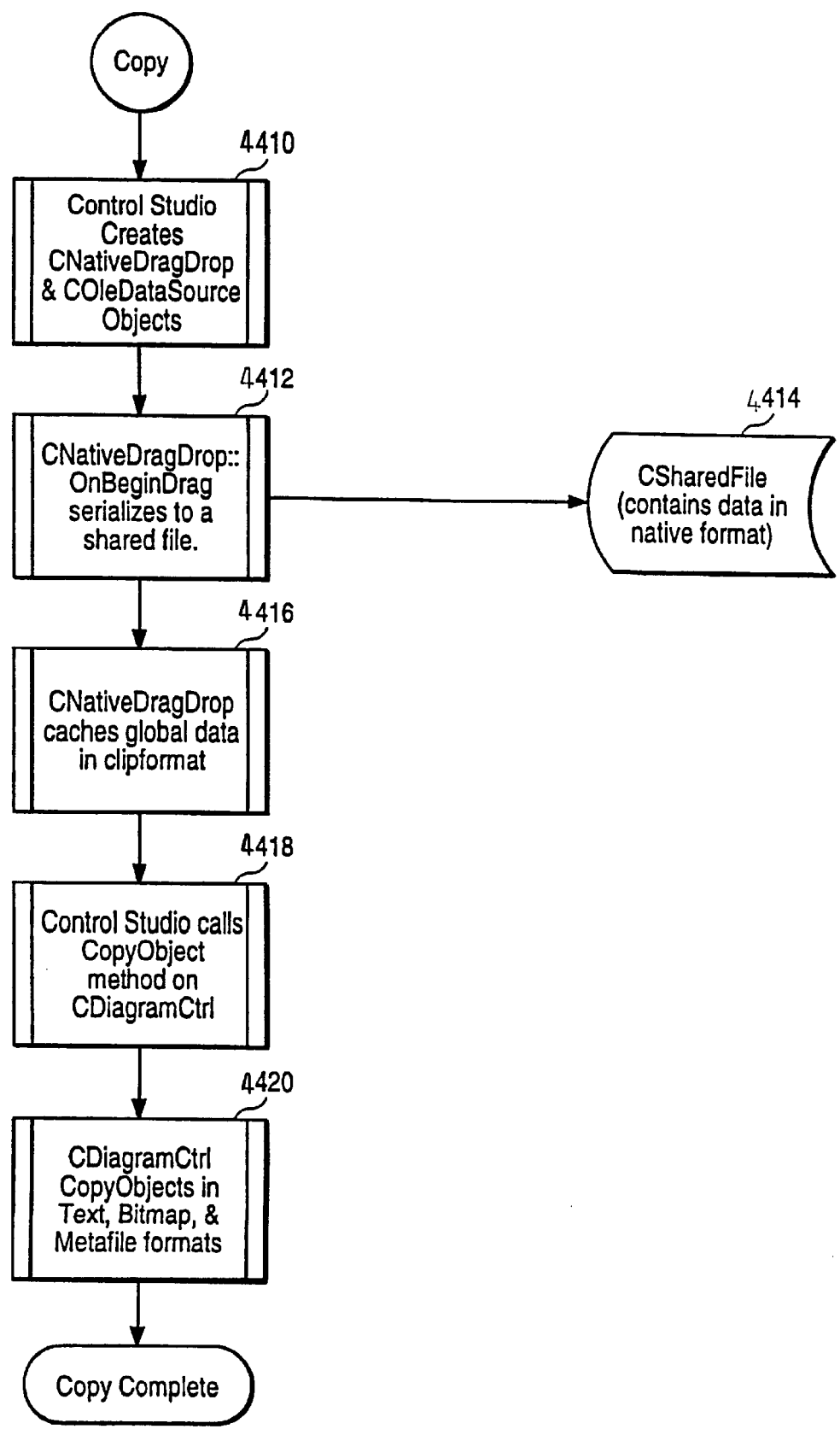
Figure 34:
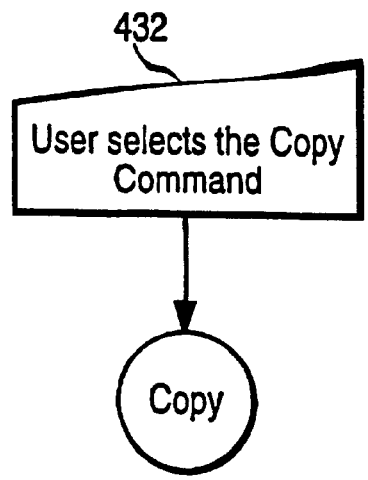

Referring to FIG. 34B, during processing step 4410, object system 130 creates CNativeDragDrop and COleDataSource objects and invokes the OnBeginDrag method of the CNativeDragDrop object. Control then transitions to processing step 4412. During processing step 4412, the OnBeginDrag method serializes the data of the selected objects to a shared file 4414. Control then transitions to processing step 4416. During processing step 4416, the OnBeginDrag method caches the data to the COleDataSource. Control then transitions to processing step 4418. During processing step 4418, the CopyObject method of CDiagramCtrl object is invoked. Control then transitions to processing step 4420. During processing step 4420, the method CopyObject copies the objects in various formats to the clipboard. On completion, object system 130 transitions to the calling function and the copy is complete. Control studio object system 130 then transitions to processing step 4433 which deletes all selected objects and transitions to completion step 4435, whereupon the cut is complete.

Referring to FIG. 34C, during a copy operation, a user selects the copy command as shown at step 4432. After the copy command is selected, control transitions to processing step 4410, which is described above (see FIG. 34B).

Figure 34D:
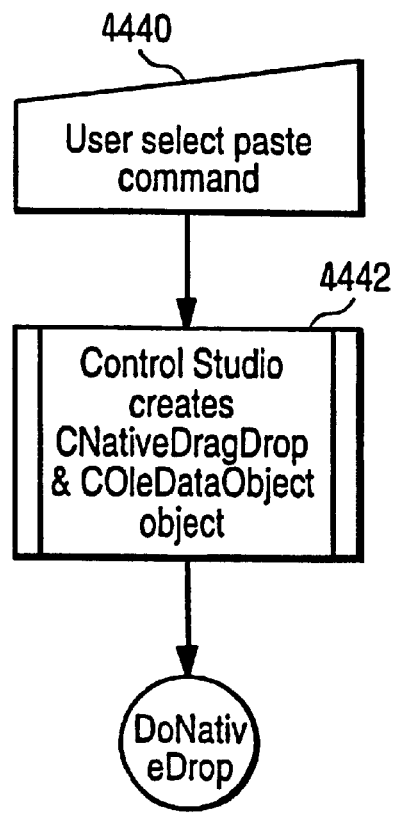

Referring to FIG. 34D, during a paste operation, a user selects the paste command as shown at step 4440. After the paste command is selected, control transitions to processing step 4442. During processing step 4442, object system 130 creates CNativeDragDrop and COleDataObject objects. Control then transitions to processing step 4346 (see FIG. 33C).

Figure 35:
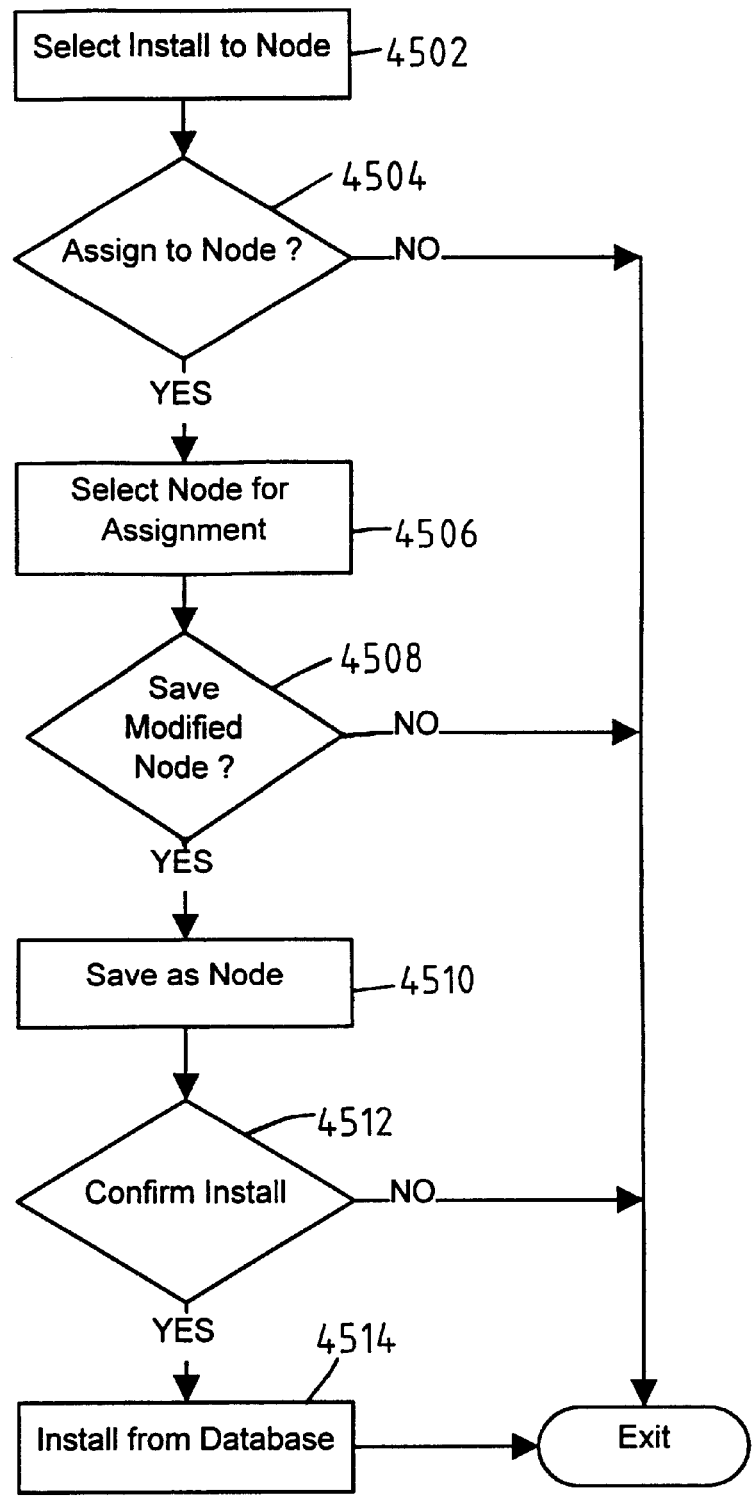
FIG. 35 is a flow diagram illustrating the operation of installing a diagram to a node.

Referring to FIG. 35, the operation of control studio object system 130 is illustrated. More specifically, when a user wishes to install a process control diagram to a node, the user selects the Install to Node item from the File menu. Based upon user input, object system 130 then determines whether to install the entire module or just the changes since the last install operation was performed. When the user selects install entire module and the module has not yet been assigned to a node 4502, object system 130 informs the user that the module has not been assigned to a node and asks whether the user wishes to install the module to a node 4504. Object system 130 then presents the user with a list of nodes from which the user may select the appropriate node for configuring 4506. After the user selects the node for configuring, object system 130 presents the user with a window confirming whether the user wishes to update the module 4508. Object system 130 then requests the user to name the module 4510. After the user selects or generates a name, object system 130 asks the user whether the user is sure that the user wishes to perform the install procedure 4512. By answering yes, the control studio object system 130 automatically performs the install operation by downloading the information stored within the database to the selected module 4514.

Other embodiments are within the following claims. More specifically, while particular embodiments of the present invention have been shown and described, it will be obvious to those skilled in the art that changes and modifications may be made without departing from this invention in its broader aspects and, therefore, the appended claims are to encompass within their scope all such changes and modifications that fall within the true spirit and scope of this invention, including but not limited to implementations in other programming languages. Additionally, while the preferred embodiment is disclosed as a software implementation, it will be appreciated that hardware implementations such as application specific integrated circuit implementations are also within the scope of the following claims.

What is claimed is:

1. A programmable apparatus for performing a plurality of user-selectable control functions, the apparatus comprising:
   a. a database for storing a plurality of items associated with each of the control functions, the items including, for each function:
      i. at least one procedure for performing a plurality of actions associated with the control function;
      ii. a specification of at least one state associated with each procedure;
   b. means facilitating selection of a procedure in the database;
   c. means responsive to the selection for accessing the database and causing performance of the selected procedure to achieve the states specified therein; and
   d. means for monitoring at least one resource associated with the actions of the procedure and, based thereon, determining whether the specified states have been achieved.

2. The apparatus of claim 1 wherein the performance means is responsive to executable instructions causing it to respond, in causing performance of the action, to the state determined by the monitoring means.

3. The apparatus of claim 1 wherein the items further include a list of resources associated with the action, the performance means being configured to establish control connections to the listed action resources to perform the action.

4. The apparatus of claim 1 wherein the items further include a list of resources associated with the state, the monitoring means being configured to establish monitoring connections to the listed state resources to determine the state.

5. The apparatus of claim 4 comprising:
   a. an input/output module for connection to at least one input/output point on a controlled machine; and
   b. a computer memory comprising a plurality of registers and flags for containing data associated associated with the action, the state resources including the at least one input/output point and the registers and flags.

6. The apparatus of claim 1 wherein the means facilitating selection and the means responsive to the selection comprise:
   a. compiler;
   b. a series of high-level instructions including instructions invoking the at least one procedure; and
   c. a database manager, responsive to procedure-invoking instructions, for locating the at least one procedure;
   the compiler compiling the high-level instructions and the procedure into a machine-executable run-time program.

7. The apparatus of claim 6, further comprising memory means for storing the run-time program.

8. The apparatus of claim 6, wherein the run-time program accesses, during execution, at least one state item by means of the database manager.

9. The apparatus of claim 6 wherein the items further include a template specifying at least one performance characteristic, the monitoring means evaluating the resource against the at least one performance characteristic during performance of the action, the run-time program accessing, during execution, at least one performance-characteristic item by means of the database manager.

10. The apparatus of claim 6 further comprising a programming interface for accepting the high-level instructions and the items, the programming interface communicating with the database manager so as to cause storage of the items in the database.

11. A programmable apparatus for performing a plurality of user-selectable control functions the apparatus comprising:
   a. a database for storing a plurality of items associated with each of the control functions, the items including, for each function:
      i. at least one procedure for performing an action associated with the control function;
      ii. a specification of at least one state associated with the control function; and
      iii. a template specifying at least one performance characteristic, the monitoring means evaluating the resource against the at least one performance characteristic during performance of the action;
   b. means facilitating selection of an action in the database;
   c. means responsive to the selection for accessing the database and causing performance of the selected action; and d. means for monitoring a resource associated with the action and, based thereon, determining the state specified in the database.

12. The apparatus of claim 11, wherein:
   a. the performance characteristic comprises a plurality of parameter limit value ranges; and
   b. the template specifies a limit procedure associated with at one of the limit value ranges, the performance means causing performance of the limit procedure if the parameter value falls within the limit value range.

13. An apparatus having a programmable processor and a memory for performing a plurality of user-selectable control functions, the apparatus comprising:
   a. a database for storing a plurality of items associated with each of the control functions, the items including, for each function:
      i. at least one procedure for performing an action associated with the control function;
      ii. a specification of at least one state associated with the control function;
   b. a first software routine stored on the memory and adapted to be executed by the processor for facilitating selection of a procedure in the database;
   c. a second software routine stored on the memory and adapted to be executed by the processor that responds to the selection for accessing the database and causing performance of the selected procedure to achieve the state specified therein; and
   d. a third software routine stored on the memory and adapted to be executed by the processor for monitoring at least one resource associated with the action of the procedure and, based thereon, determining whether the specified state has been achieved.

14. The apparatus of claim 12 wherein the items further include historical parameter values associated with completions of the action or performances of the limit procedure.

15. The apparatus of claim 14 wherein the monitoring means is configured to dynamically update the historical parameter values upon completion of an action or performance of the limit procedure.

* * * * *

UNITED STATES PATENT AND TRADEMARK OFFICE
CERTIFICATE OF CORRECTION

PATENT NO. : 6,868,538 B1
APPLICATION NO. : 09/563212
DATED : March 15, 2005
INVENTOR(S) : Nixon et al.

It is certified that error appears in the above-identified patent and that said Letters Patent is hereby corrected as shown below:

At Column 1, line 24, please delete "versatile" and insert -- Versatile --
At Column 3, line 53, please delete "a such" and insert -- such a --
At Column 12, line 33, please delete "306" and insert -- 300--
At Column 23, line 46, please delete "supplying-this" and insert -- supplying this --
At Column 24, line 34, please delete "the"
At Column 25, line 26, please delete "110" and insert -- I/O --
At Column 26, line 35, please delete "Al" and insert --Al --
At Column 33, line 15, please delete "CltwtBase" and insert -- CltwtBase --
At Column 33, line 16, please delete "CltwtAttribute" and insert -- CltwtAttribute --
At Column 33, line 16, please delete "CltwtUsage" and insert -- CltwtUsage --
At Column 33, lines 18-19, please delete "CltwtBase" and insert -- CltwtBase --
At Column 34, line 43, please delete "CltwtBase" and insert -- CltwtBase --
At Column 36, line 3, please delete "it"
At Column 37, line 16, please delete "OnBeginDrag.event" and insert -- OnBeginDrag event --

Signed and Sealed this

Fourteenth Day of November, 2006

JON W. DUDAS
*Director of the United States Patent and Trademark Office*